United States Patent
Yoshida

(10) Patent No.: US 11,156,861 B2
(45) Date of Patent: Oct. 26, 2021

(54) DISPLAY DEVICE AND METHOD OF MANUFACTURING DISPLAY DEVICE

(71) Applicant: NLT Technologies, Ltd., Kanagawa (JP)

(72) Inventor: Hitoshi Yoshida, Kanagawa (JP)

(73) Assignee: TIANMA MICROELECTRONICS CO., LTD., Shenzhen (CN)

(*) Notice: Subject to any disclaimer, the term of this patent is extended or adjusted under 35 U.S.C. 154(b) by 104 days.

(21) Appl. No.: 15/086,664

(22) Filed: Mar. 31, 2016

(65) Prior Publication Data
US 2016/0291391 A1 Oct. 6, 2016

(30) Foreign Application Priority Data

Mar. 31, 2015 (JP) .............................. JP2015-072700
Jan. 22, 2016 (JP) .............................. JP2016-010962

(51) Int. Cl.
*G02F 1/1333* (2006.01)

(52) U.S. Cl.
CPC .... *G02F 1/133308* (2013.01); *G02F 1/13338* (2013.01); *G02F 1/133325* (2021.01); *G02F 1/133331* (2021.01); *G02F 2202/28* (2013.01)

(58) Field of Classification Search
CPC ........... G02F 1/133308; G02F 1/13338; G02F 2001/133325; G02F 2001/133314; G02F 2001/133317; B32B 2457/208
See application file for complete search history.

(56) References Cited

U.S. PATENT DOCUMENTS

| | | | |
|---|---|---|---|
| 2007/0065091 A1 | 3/2007 | Hinata et al. | |
| 2008/0007538 A1 | 1/2008 | Kotera et al. | |
| 2009/0128733 A1 | 5/2009 | Teramoto | |
| 2013/0321293 A1* | 12/2013 | Park et al. | ............. G06F 3/041 |
| 2013/0321321 A1 | 12/2013 | Hiraoka | |
| 2015/0201487 A1* | 7/2015 | Kee | ................... G02F 1/133305 361/749 |

(Continued)

FOREIGN PATENT DOCUMENTS

| | | |
|---|---|---|
| JP | 11-174417 | 7/1999 |
| JP | 2007-114737 A | 5/2007 |

(Continued)

OTHER PUBLICATIONS

Office Action issued in Japanese Patent Application No. 2016-010962 dated Sep. 24, 2019 with English translation provided.

*Primary Examiner* — Angela K Davison
(74) *Attorney, Agent, or Firm* — Nixon & Vanderhye

(57) ABSTRACT

A display panel is attached to a front plate which is disposed at a front surface side of the display panel, with an intermediate member interposed therebetween. A chassis accommodates the display panel in a state in which an opening edge of the chassis comes into contact with the front plate and an inner side surface of the chassis comes into contact with a side surface of the intermediate member. The opening edge of the chassis comes into contact with the front plate to position the display panel and the chassis in the thickness direction of the display panel. The inner side surface of the chassis comes into contact with the side surface of the intermediate member to position the display panel and the chassis in a direction along a display surface of the display panel.

32 Claims, 57 Drawing Sheets

(56) References Cited

U.S. PATENT DOCUMENTS

2015/0212362 A1\* 7/2015 Takaira ............. G02F 1/133308
2016/0313496 A1\* 10/2016 Hirayama ............ G02B 6/0036
2017/0192291 A1\* 7/2017 Shi .................... G02F 1/133308

FOREIGN PATENT DOCUMENTS

| JP | 2007-316847 A | 12/2007 |
| --- | --- | --- |
| JP | 2009-128399 | 6/2009 |
| JP | 2011-085740 A | 4/2011 |
| JP | 2011-209590 A | 10/2011 |
| JP | 2012-185814 | 9/2012 |
| JP | 2014-149418 A | 8/2014 |

\* cited by examiner

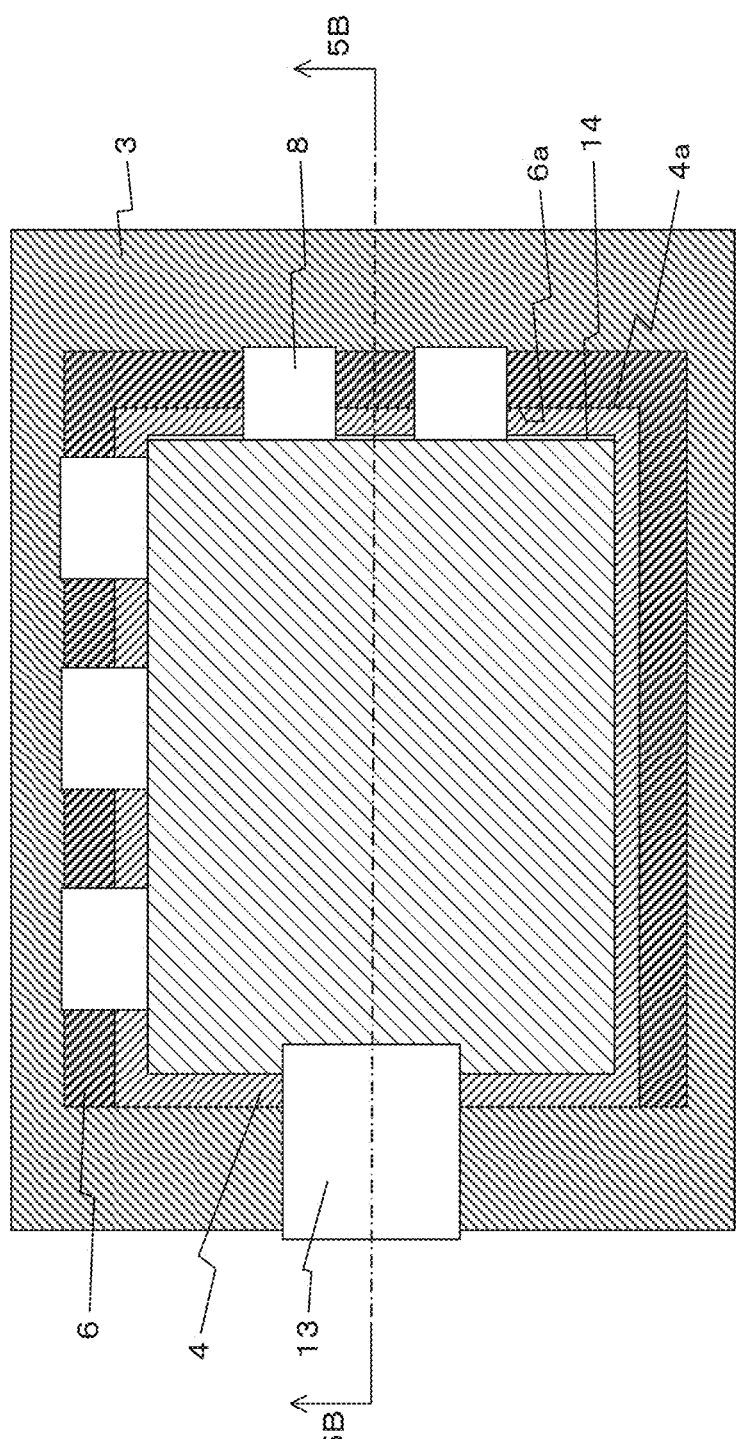
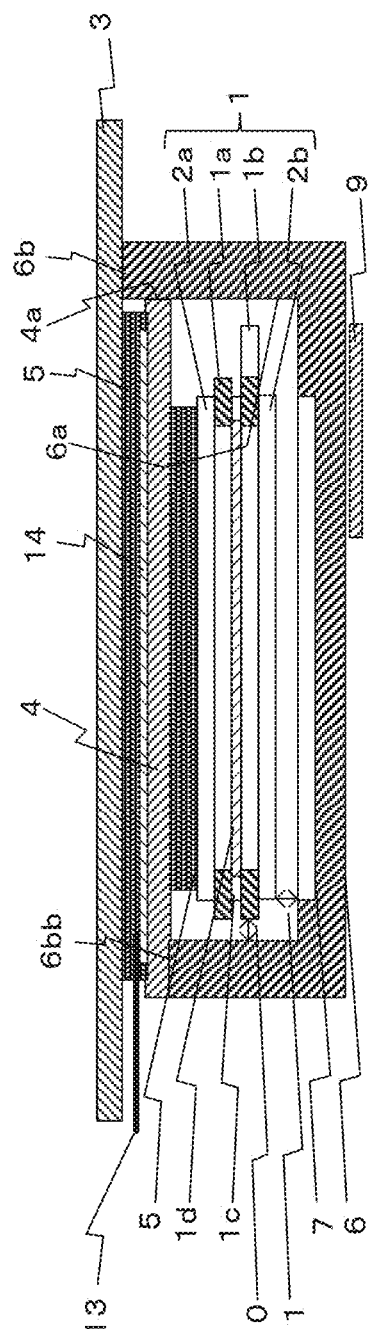
FIG. 5A
FIG. 5B

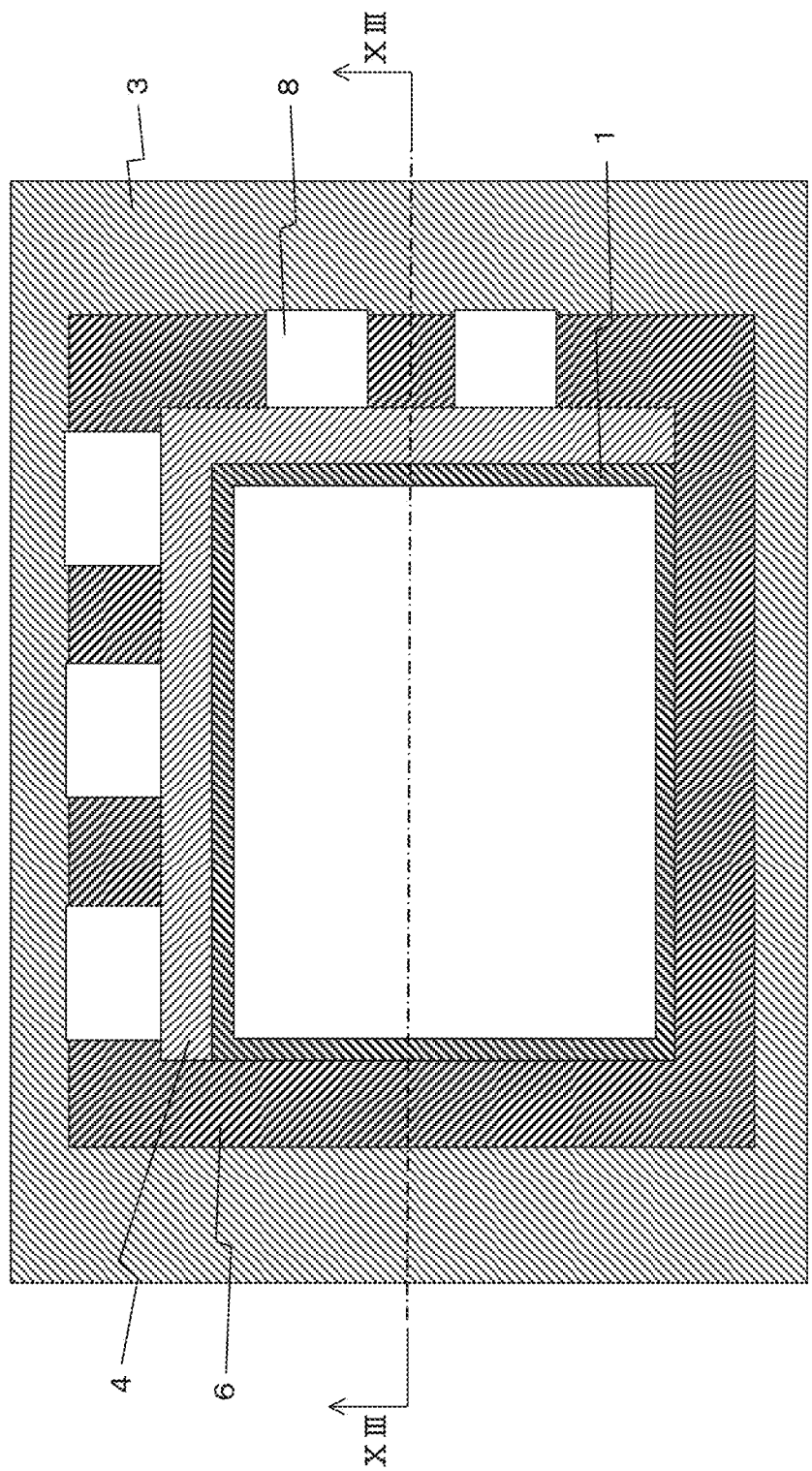

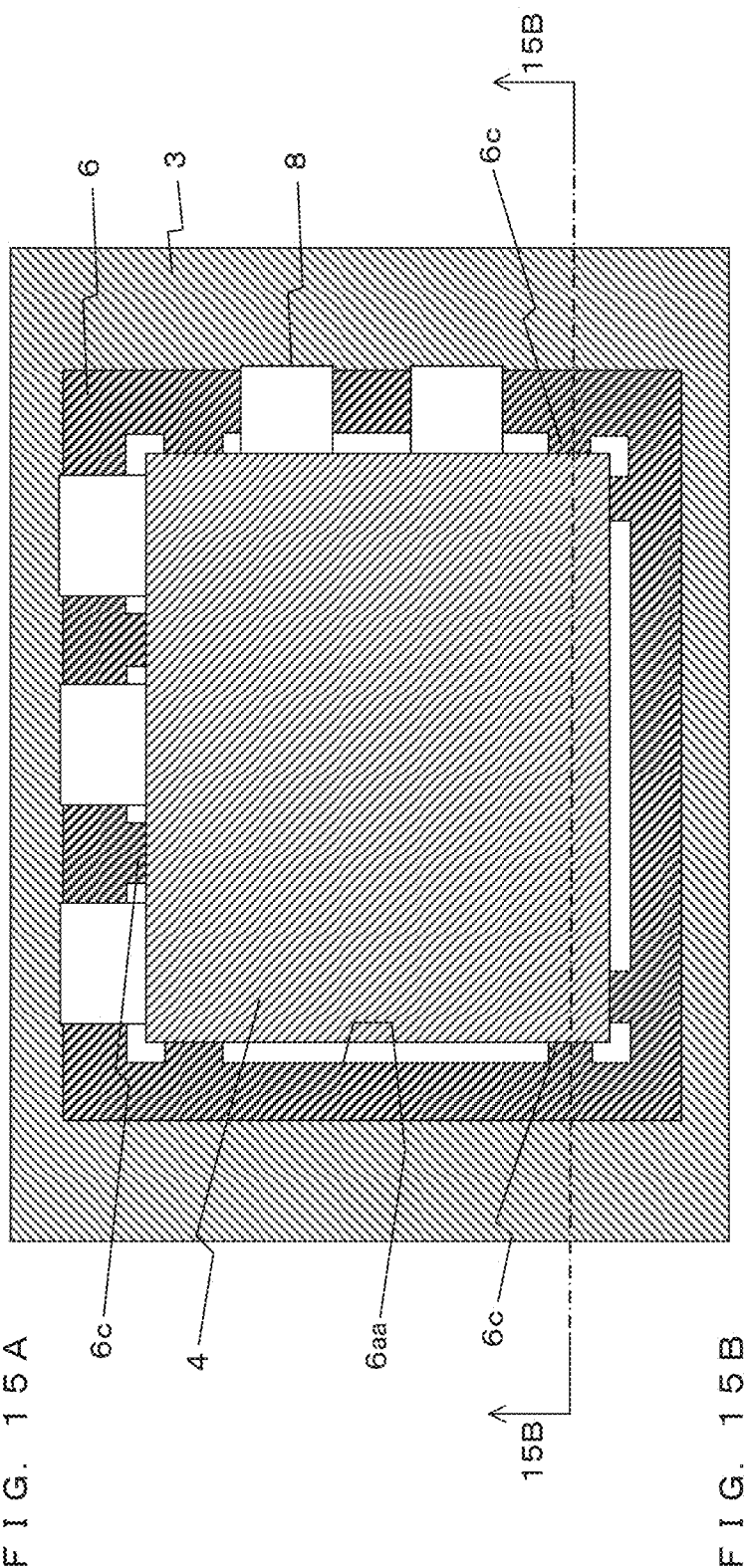

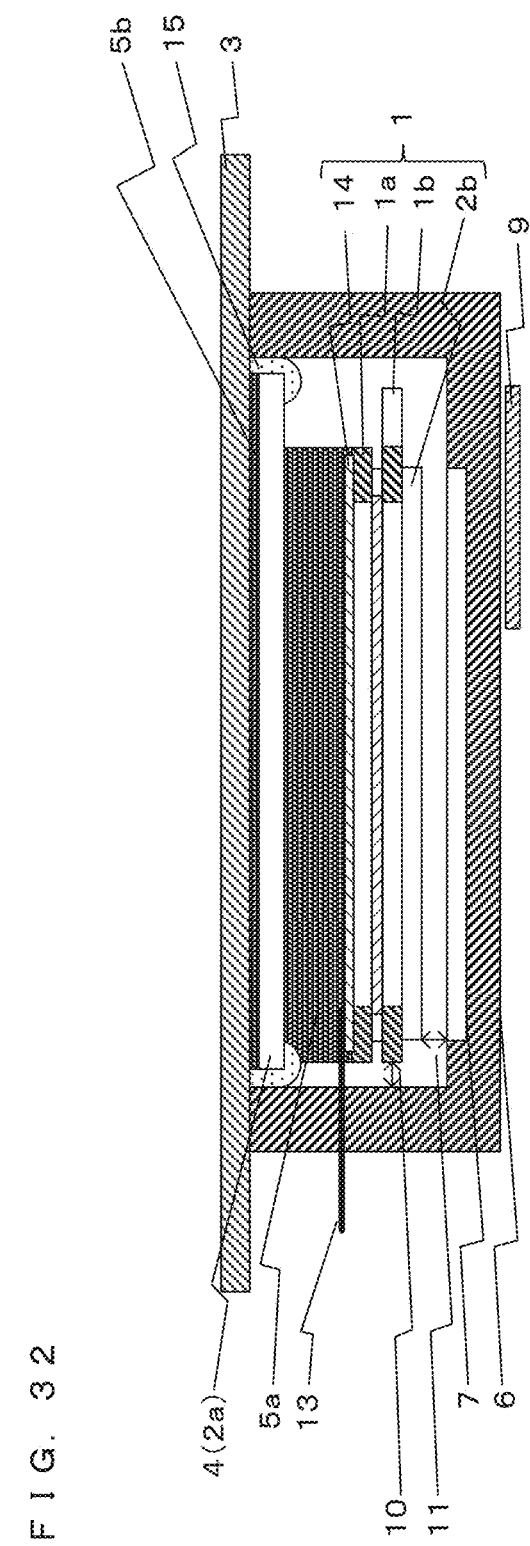
F I G. 3 2

PATTERN DAMAGE

DAMAGE DUE TO ATTACHMENT

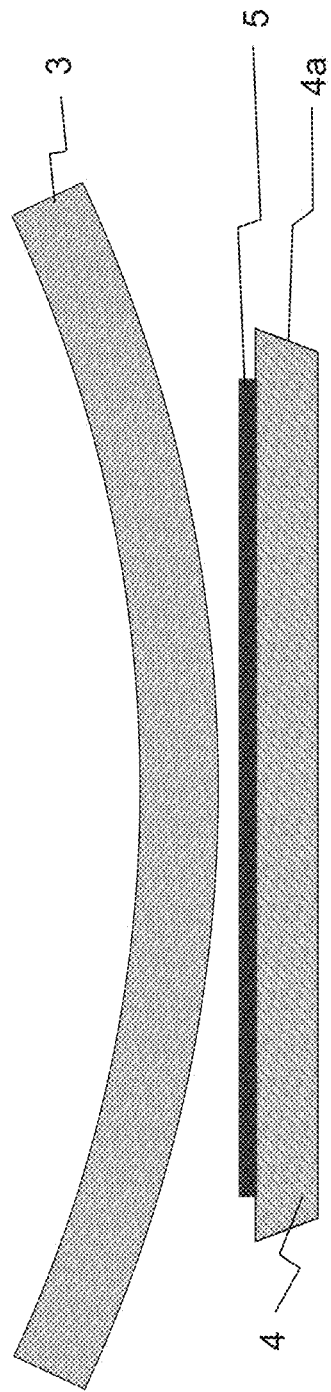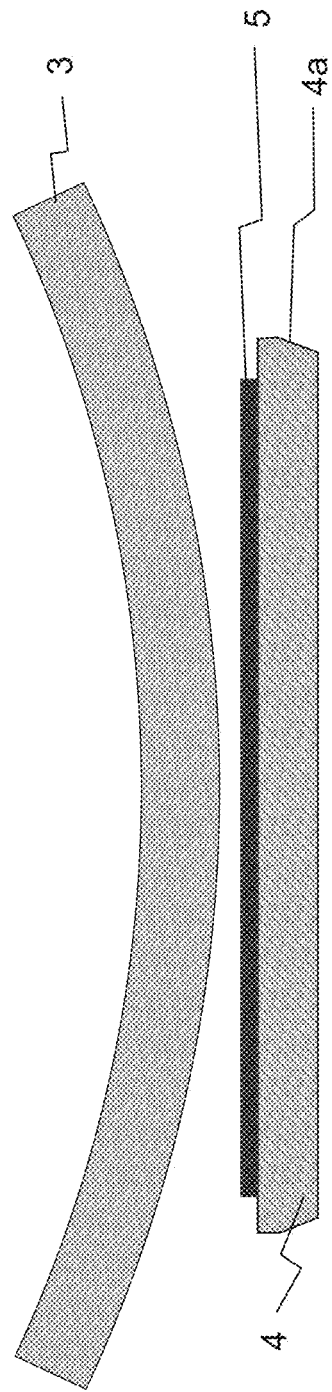

DISPLAY DEVICE AND METHOD OF MANUFACTURING DISPLAY DEVICE

CROSS-REFERENCE TO RELATED APPLICATIONS

This Non-provisional application claims priority under 35 U.S.C. § 119(a) on Patent Application No. 2015-072700 filed in Japan on Mar. 31, 2015, and Patent Application No. 2016-010962 filed in Japan on Jan. 22, 2016, the entire contents of which are hereby incorporated by reference.

FIELD

The disclosure relates to: a display device in which a front plate disposed at a front surface side of a display panel holds the display panel; and a method of manufacturing a display device.

BACKGROUND

A liquid crystal display device has been used as a display device of an electronic apparatus. The liquid crystal display device includes: a liquid crystal panel that has a display surface on which an image is displayed, at the front side; and a light source device that is disposed behind the liquid crystal panel and emits light to the liquid crystal panel. In addition, the liquid crystal display device is assembled by connecting a front housing that holds the liquid crystal panel from the front side and a rear housing that holds the light source device from the rear side. There is a liquid crystal display device having a structure in which a transparent member or a touch panel is provided at the front side of a liquid crystal panel, a front housing holds the transparent member or the touch panel, and the transparent member or the touch panel holds the liquid crystal panel.

Japanese Patent Application Laid-Open No. 811-174417 discloses a structure in which a liquid crystal panel is attached to a transparent member held by a housing, with a transparent elastic resin interposed therebetween. Japanese Patent Application Laid-Open No. 2012-185814 discloses a structure in which a liquid crystal panel is attached to a touch panel held by a housing, with a sealing member interposed therebetween. Japanese Patent Application Laid-Open No. 2009-128399 discloses a structure in which a transparent member is held by a front frame (front housing) and a frame (rear housing) that accommodate a liquid crystal panel.

SUMMARY

In the structures disclosed in Japanese Patent Application Laid-Open No. 811-174417, Japanese Patent Application Laid-Open No. 2012-185814, and Japanese Patent Application Laid-Open No. 2009-128399, it is necessary to increase the size of the chassis rather than the size of the front plate, in order to position the display panel and the chassis (housing) through the outward shape of the front plate and to ensure an appropriate gap between the display panel and the chassis.

In addition, as countermeasures against an increase in the size, when the display panel and the chassis are assembled, without positioning the front plate and the chassis, there is a problem that it is difficult to appropriately maintain the gap between the display panel and the chassis, which results in a reduction in productivity.

In addition, when the size of the display panel increases and the rigidity of the front plate is insufficient, there is a problem that display unevenness occurs due to pressing force during a touch operation.

A display device according to an aspect of the invention comprises a display panel, a front plate that is disposed at a front surface side of the display panel and holds the display panel, and a chassis that accommodates the display panel in a state of having a gap between the chassis and the display panel. The display device according to an aspect of the invention further comprises an intermediate member that is disposed between the front plate and the display panel and has smaller dimensions than the front plate. In the display device according to an aspect of the invention, an inner side surface of the chassis comes into contact with at least a portion of a side surface of the intermediate member.

A display device according to an aspect of the invention comprises a display panel, a front plate that is disposed at a front surface side of the display panel and holds the display panel, and a chassis that accommodates the display panel in a state of having a gap between the chassis and the display panel. The display device according to an aspect of the invention further comprises an intermediate member that is disposed between the front plate and the display panel and has smaller dimensions than the front plate. In the display device according to an aspect of the invention, a gap between the intermediate member and the chassis is not more than the gap between the chassis and the display panel.

According to an aspect of the invention, the size of the chassis can be smaller than the size of the front plate and it is possible to reduce the weight of a display device. In addition, it is possible to easily assemble a display device while appropriately maintaining the gap between the display panel and the chassis. It is possible to reduce display unevenness due to the interference between the display panel and the chassis.

It is to be understood that both the foregoing general description and the following detailed description are exemplary and explanatory and are not restrictive of the invention.

BRIEF DESCRIPTION OF THE DRAWINGS

FIGS. 5A and 5B are diagrams schematically illustrating a modification example of a backlight chassis;

FIG. 12 is a plan view illustrating a liquid crystal display device according to Embodiment 2;

FIGS. 15A and 15B are diagrams schematically illustrating a modification example of the backlight chassis according to Embodiment 2;

FIG. 32 is a cross-sectional view illustrating a modification example of an intermediate member;

FIGS. 41A and 41B are cross-sectional views illustrating modification examples of the intermediate member;

DETAILED DESCRIPTION

Hereinafter, a display device and a method of manufacturing the display device according to embodiments of the invention will be described in detail with reference to the drawings illustrating embodiments.

Embodiment 1

Figure 1:
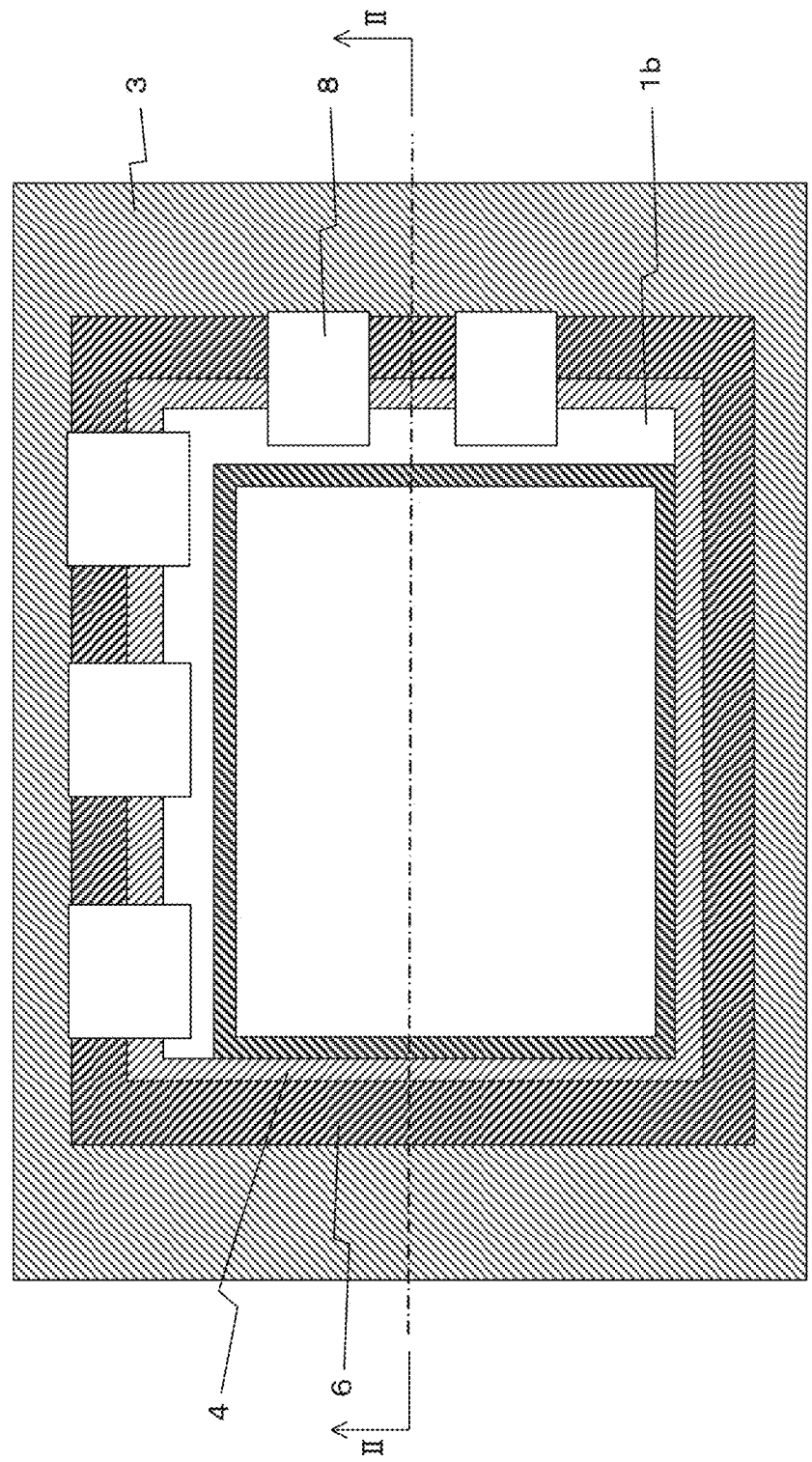
FIG. 1 is a plan view illustrating a liquid crystal display device according to Embodiment 1.
Figure 2:
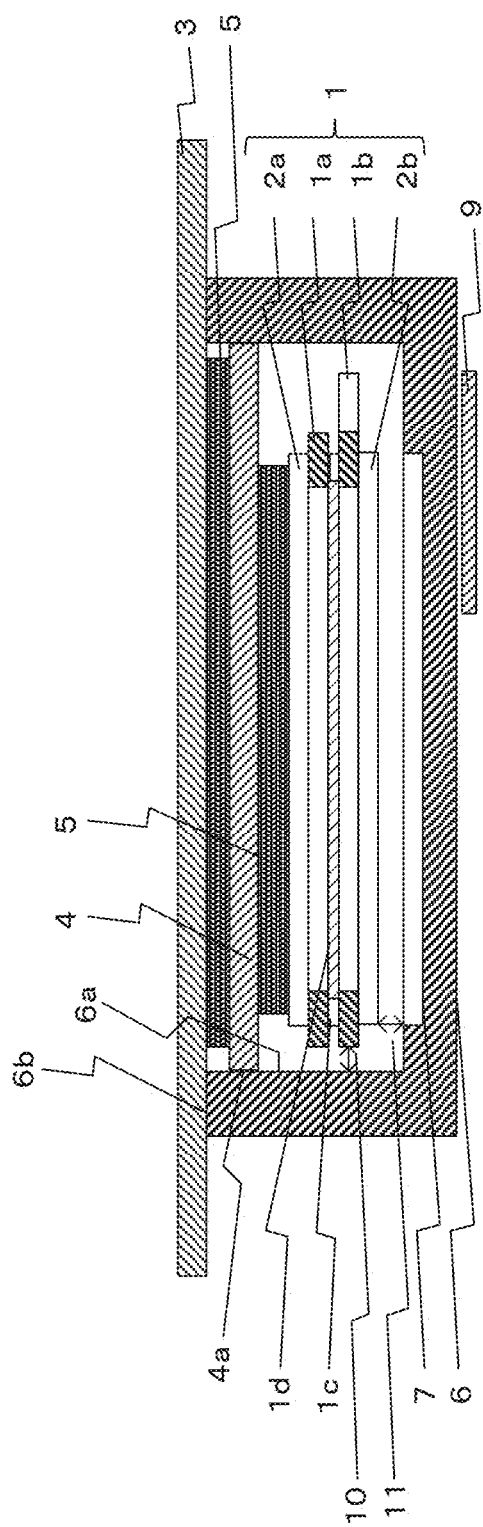
FIG. 2 is a cross-sectional view taken along the line II-II of FIG. 1.

The structure of Embodiment 1 of the invention will be described. FIG. 1 is a plan view illustrating a liquid crystal display device according to Embodiment 1. FIG. 2 is a cross-sectional view taken along the line II-II of FIG. 1. The liquid crystal display device according to Embodiment 1 is a display device in which a liquid crystal panel 1 is attached to (hanged on) a front plate 3 by a transparent adhesive 5 and gaps 10 and 11 are formed between the liquid crystal panel 1 and a backlight chassis (chassis) 6 in the horizontal direction and the vertical direction, respectively. The horizontal direction means a direction along a display surface of the liquid crystal panel 1 and the vertical direction means a thickness direction of the liquid crystal panel 1.

The liquid crystal display device according to Embodiment 1 includes the front plate 3, an intermediate member 4, the liquid crystal panel 1, a backlight 7, and the backlight chassis 6 in this order. In the following description, the side of the front plate 3 of the liquid crystal display device is referred to as a front surface or an upper surface and the side of the backlight chassis 6 is referred to as a rear surface or a lower surface.

The liquid crystal panel (display panel) 1 has a rectangular plate shape and has the display surface (display region) on which an image is displayed. Specifically, the liquid crystal panel 1 includes: a color filter substrate 1a on which, for example, R, G, and B (red, green, and blue) filters and a black matrix (BM) are formed; a TFT substrate 1b on which, for example, thin film transistor (TFT) elements are formed; a seal 1c for forming an arbitrary gap between the TFT substrate 1b and the color filter substrate 1a; a liquid crystal agent 1d which fills the gap between the TFT substrate 1b and the color filter substrate 1a; a polarizing plate/optical compensation film 2a which is attached to the color filter substrate 1a; and a polarizing plate/optical compensation film 2b which is attached to the TFT substrate 1b.

Each of the polarizing plate/optical compensation film 2a and the polarizing plate/optical compensation film 2b is a single polarizing plate, a single optical compensation film, or a complex in which the optical compensation film is bonded to one surface or both surfaces of the polarizing plate. The optical compensation film may be, for example, a film in which one or more of a phase difference film, a viewing angle improving film, a brightness improving film, a low-reflection film, an optical film, and a low-birefringence film are bonded. In addition, the polarizing plate/optical compensation film 2a which is bonded to the color filter substrate 1a may be the same as or different from the polarizing plate/optical compensation film 2b which is bonded to the TFT substrate 1b. For example, in some cases, a complex in which the polarizing plate and the optical compensation film are bonded to each other is used as the polarizing plate/optical compensation film 2a bonded to the color filter substrate 1a and a single polarizing plate is used as the polarizing plate/optical compensation film 2b bonded to the TFT substrate 1b.

A circuit board 9 which drives liquid crystal is connected to the liquid crystal panel 1 through flexible printed circuits (FPC) 8. The FPC 8 is bent and is drawn to the rear surface side of the backlight chassis 6. The circuit board 9 is arranged on the rear surface of the backlight chassis 6. In order to prevent the FPC 8 drawn to the outside of the backlight chassis 6 and the circuit board 9 from being damaged, a protective plate (not illustrated) which covers the FPC 8 and the circuit board 9 may be provided.

The front plate 3 is provided at the front surface side of the liquid crystal panel 1. The front plate 3 may be an input device such as a touch panel, a substrate made of transparent glass or tempered glass, a substrate made of plastic such as an acrylic plate or a polyethylene terephthalate (PET) plate, or a composite substrate thereof. When the liquid crystal panel 1 is bonded to the front plate 3, in the front plate 3, an outer peripheral portion other than a region corresponding to the display region of the liquid crystal panel 1 may be decoratively coated with, for example, a light-shielding ink. In addition, in some cases, when the liquid crystal display device is incorporated into an apparatus, such as a mobile communication apparatus or a smart phone, the external dimensions of the front plate 3 are greater than the external dimensions of the liquid crystal panel 1 in order to improve the feeling of unity with the apparatus and to improve the design of the apparatus.

The intermediate member 4 having a rectangular plate shape is provided between the front plate 3 and the liquid crystal panel 1. The intermediate member 4 is bonded to the front plate 3 and the liquid crystal panel 1 by the transparent adhesive 5.

The transparent adhesive 5 may be, for example, a thermosetting resin, a moisture-curable resin, a photo-curable resin, an optically clear resin (OCR) such as a hybrid curable resin which is curable by a combination of heat, humidity and light, or an optically clear adhesive (OCA) which is a sheet-shaped adhesive tape using a high-transparency adhesive. When a photo-curable OCR is used as the transparent adhesive 5, the transparent adhesive 5 is cured by an active energy line such as ultraviolet (UV) light.

The external dimensions of the intermediate member 4 are smaller than those of the front plate 3 and are greater than those of the liquid crystal panel 1. The intermediate member 4 may be a substrate made of transparent glass or tempered glass, a substrate made of plastic such as an acrylic plate or a PET plate, or a composite substrate thereof. In a case in which the front plate 3 does not have rigidity in the same way as a plastic substrate such as an acrylic plate or a PET plate, when the front plate 3 is touched, the front plate 3 and the liquid crystal panel 1 are distorted and the liquid crystal panel 1 and the backlight chassis 6 come into contact with each other. As a result, display unevenness in which, for example, a color or brightness is uneven in the display panel occurs. Therefore, in this case, it is preferable that the intermediate member 4 be made of a material which has a higher rigidity than the front plate 3, such as thick glass or tempered glass.

The backlight chassis 6 has a rectangular dish shape with a size that is substantially equal to the external dimensions of the intermediate member 4. The backlight 7 is disposed on the bottom surface of the backlight chassis 6. The backlight 7 is, for example, an LED substrate on which a plurality of light emitting diodes (LEDs) are mounted in a two-dimensional matrix shape and emits planar light. A concave portion for attaching the backlight 7 is formed on the bottom surface of the backlight chassis 6. The backlight 7 may be, for example, a cold cathode fluorescent lamp (CCFL), an external electrode fluorescent lamp (EEFL), or a hot cathode fluorescent lamp (HCFL).

The backlight chassis 6 includes an opening edge 6b (upper surface) which comes into contact with a portion of or the entire periphery of the rear surface (lower surface) of the front plate 3 and supports the front plate 3. In this case, the backlight 7 is arranged so as to face the rear surface (lower surface) of the liquid crystal panel 1 and emits light to the liquid crystal panel 1 from the lower side of the liquid crystal panel 1. The internal dimensions of the backlight chassis 6 (the distance between inner side surfaces 6a facing to each other) are substantially equal to the external dimensions of the intermediate member 4. Therefore, when the upper surface of the backlight chassis 6 comes into contact with the lower surface of the front plate 3, the inner side surface 6a of the backlight chassis 6 comes into contact with a portion of or the entire side surface 4a of the intermediate member 4 (at least a portion of the side surface 4a). Therefore, the opening edge 6b of the backlight chassis 6 comes into contact with the front plate 3 to position the liquid crystal panel 1 and the backlight chassis 6 in the thickness direction (the vertical direction or the up-down direction) of the liquid crystal panel 1. As a result, it is possible to appropriately ensure the gap 11 in the vertical direction. In addition, the inner side surface 6a of the backlight chassis 6 comes into contact with the side surface 4a of the intermediate member 4 to position the liquid crystal panel 1 and the backlight chassis 6 in a direction (horizontal direction) along the display surface of the liquid crystal panel 1. Therefore, it is possible to appropriately ensure the gap 10 in the horizontal direction.

Figure 3A:
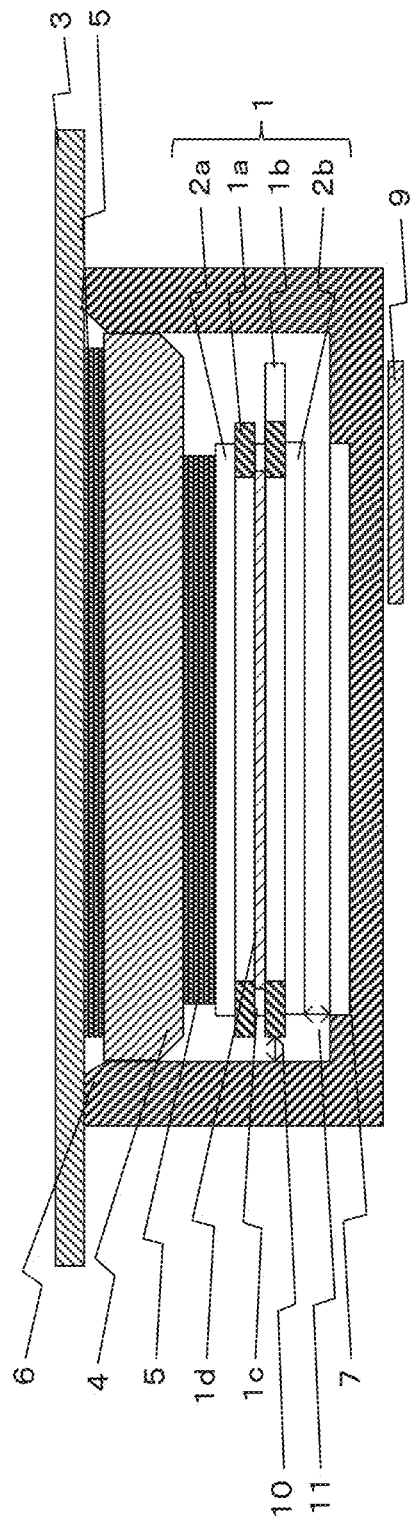
FIGS. 3A and 3B are cross-sectional views illustrating modification examples of an intermediate member.
Figure 3B:
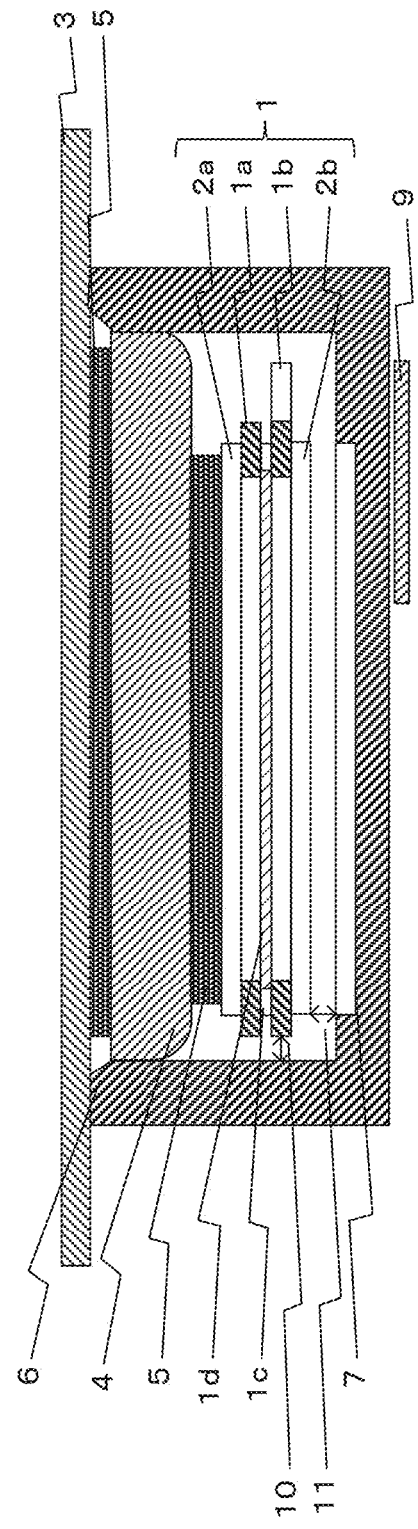

Next, a modification example of the liquid crystal display device according to Embodiment 1 will be described. FIGS. 3A and 3B are cross-sectional views illustrating modification examples of the intermediate member 4. FIGS. 3A and 3B illustrate a structure in which an intermediate member 4 that is thicker than the intermediate member 4 illustrated in FIG. 2 is used. When thick glass is used as the intermediate member 4, the contact area between the intermediate member 4 and the backlight chassis 6 increases. Therefore, when the intermediate member 4 and the backlight chassis 6 are fixed by an adhesive, it is possible to increase an adhesion area. As a result, it is possible to increase the rigidity of the liquid crystal display device.

As illustrated in FIGS. 3A and 3B, it is preferable that the peripheral edge portion of the rear surface (lower surface) of the intermediate member 4 and the inside of the opening edge 6b of the backlight chassis 6 be chamfered. FIG. 3A illustrates the intermediate member 4 which is chamfered in a tapered shape and FIG. 3B illustrates the intermediate member 4 which is chamfered in an R shape. These shapes make it possible to prevent the intermediate member 4 and the backlight chassis 6 from being chipped away due to contact when the liquid crystal panel 1 and the like are incorporated into the backlight chassis 6. Therefore, it is possible to prevent the chips of the intermediate member 4 and the backlight chassis 6 from entering into the gap between the liquid crystal panel 1 and the backlight chassis 6 and from being foreign materials in display.

Figure 4A:
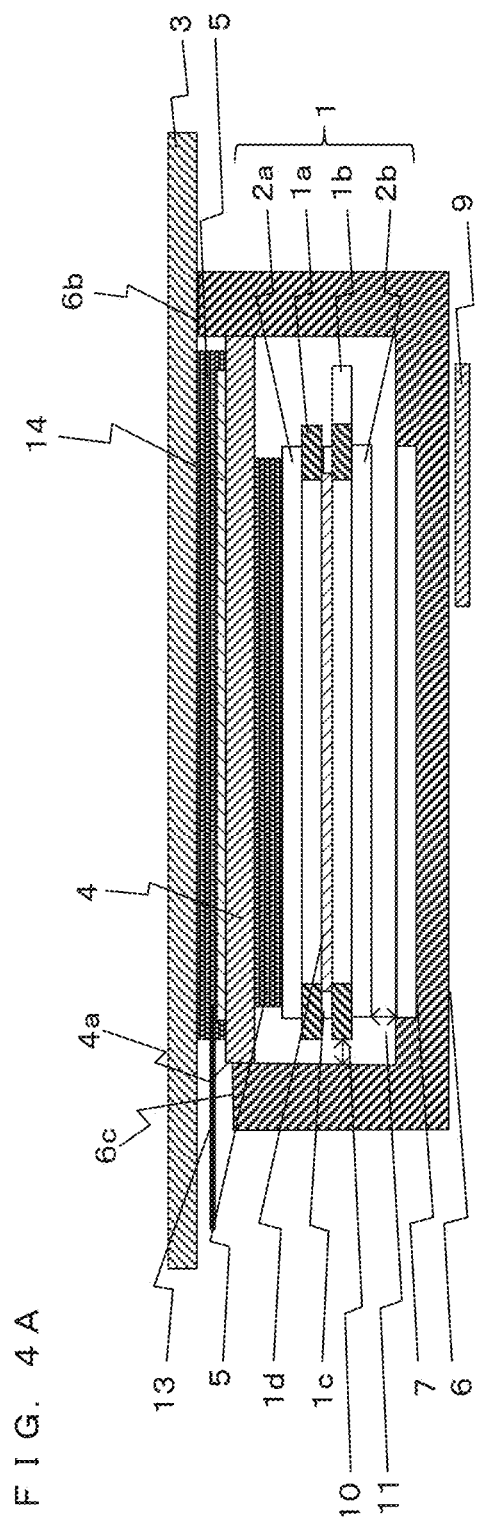
FIGS. 4A and 4B are cross-sectional views illustrating modification examples of the intermediate member.
Figure 4B:
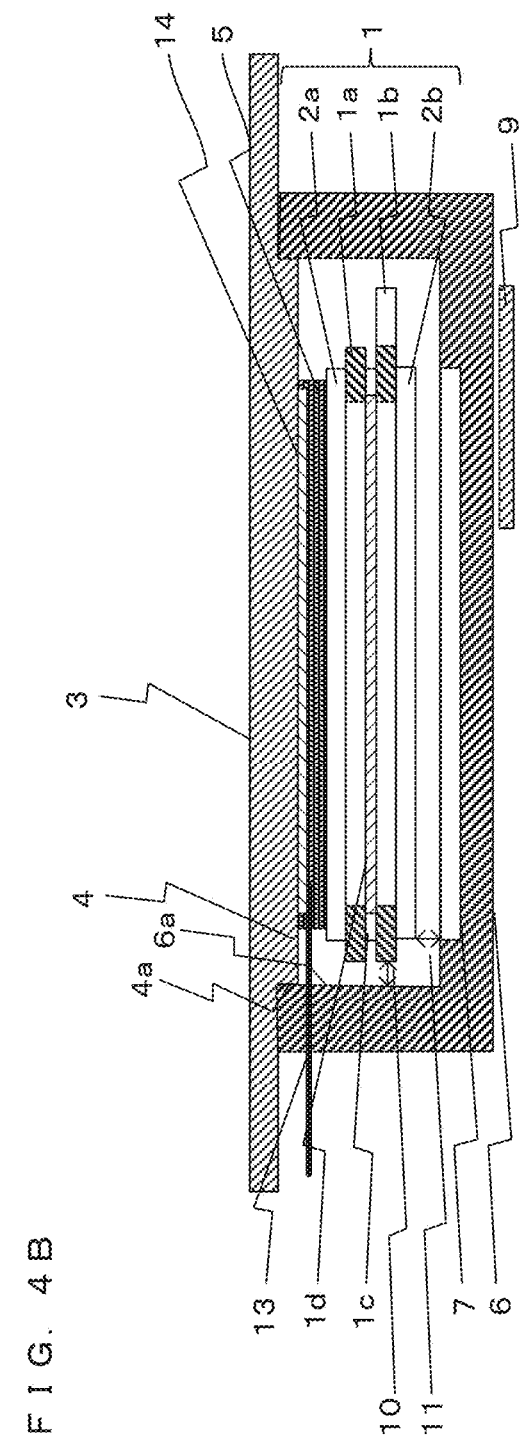

FIGS. 4A and 4B are cross-sectional views illustrating modification examples of the intermediate member 4. An intermediate member 4 illustrated in FIG. 4A is a substrate which includes a touch sensor pattern 14 and a touch panel FPC 13 to function as a touch sensor. In the example illustrated in FIG. 4A, the touch sensor pattern 14 and the touch panel FPC 13 are disposed on the upper surface (front surface) of the intermediate member 4. In addition, in the example of illustrated in FIG. 4A, a cutout portion 6c is formed in a portion of the opening edge 6b of the backlight chassis 6. The opening edge 6b of the backlight chassis 6 does not come into contact with the lower surface of the front plate 3 at the position of the cutout portion 6c and the cutout portion 6c functions as a through hole which connects the inside and outside of the backlight chassis 6. Therefore, the touch panel FPC 13 can be drawn to the outside of the backlight chassis 6 through the cutout portion 6c as a through hole.

FIG. 4B illustrates a structure in which the intermediate member 4 and the front plate 3 are integrated with each other. In the example illustrated in FIG. 4B, the intermediate member 4 is directly formed on the lower surface of the front plate 3, without the transparent adhesive 5 interposed therebetween. As illustrated in FIG. 4B, since the intermediate member 4 protrudes downward from the lower surface of the front plate 3, it is possible to bring the inner side surface 6a of the backlight chassis 6 into contact with the side surface 4a of the intermediate member 4. Therefore, similarly to Embodiment 1, it is possible to position the liquid crystal panel 1 and the backlight chassis 6 in the horizontal direction and thus to appropriately ensure the gap 10. In addition, since the intermediate member 4 does not need to be bonded to the front plate 3, it is possible to reduce the number of bonding processes or the amount of transparent adhesive 5 used and thus to reduce manufacturing costs. In addition, since the transparent adhesive 5 is not used, it is possible to reduce the thickness of the device. Even in the structure in which the intermediate member 4 and the front plate 3 are integrated with each other, it is possible to provide the function of a touch sensor. In the example illustrated in FIG. 4B, the touch sensor pattern 14 and the touch panel FPC 13 are provided on the lower surface of the intermediate member 4. In addition, in the structure illustrated in FIG. 4B, a cutout portion (not illustrated) is provided in a portion of the opening edge 6b of the backlight chassis 6 in order to draw the touch panel FPC 13 to the outside of the backlight chassis 6.

FIGS. 5A and 5B are diagrams schematically illustrating a modification example of the backlight chassis 6. FIG. 5A is a plan view illustrating a liquid crystal display device and FIG. 5B is a cross-sectional view taken along the line 5B-5B of FIG. 5A. A backlight chassis 6 illustrated in FIGS. 5A and 5B is configured such that the internal dimensions thereof (the length between the inner side surfaces 6a facing to each other) are slightly smaller than the external dimensions of the intermediate member 4. In addition, one sidewall (the left sidewall in FIG. 5B) of the backlight chassis 6 is slightly lower (shorter) than the other three sidewalls. The lower surface of the front plate 3 is supported by the protruding ends (opening edge 6b) of the three sidewalls and the lower surface of the intermediate member 4 is supported by a protruding end (opening edge) 6bb of the one short sidewall. In this case, the inner side surfaces 6a of the three sidewalls of the backlight chassis 6 come into contact with the side surfaces 4a of the intermediate member 4 each which faces to each of the inner side surfaces 6a, and are bonded thereto. In addition, the protruding end 6bb of the one short sidewall of the backlight chassis 6 comes into contact with the lower surface of the intermediate member 4. In this way, the intermediate member 4 is held by the backlight chassis 6. In this structure, since the opening edges 6b and 6bb of the backlight chassis 6 support the front plate 3 and the intermediate member 4, it is possible to position the liquid crystal panel 1 and the backlight chassis 6 in the vertical direction and thus to appropriately ensure the gap 11. In addition, since the inner side surfaces 6a of the three sidewalls of the backlight chassis 6 come into contact with the side surface 4a of the intermediate member 4, it is possible to position the liquid crystal panel 1 and the backlight chassis 6 in the horizontal direction and thus to appropriately ensure the gap 10.

In the liquid crystal display device illustrated in FIGS. 5A and 5B, a substrate having the touch sensor pattern 14 and the touch panel FPC 13 is used as the intermediate member 4 and the lower surface of a portion of the intermediate member 4 on which the touch panel FPC 13 is disposed is supported by the opening edge 6bb of the backlight chassis 6. In this case, since a space is formed between the upper surface of a portion in which the opening edge 6bb supports the intermediate member 4 and the front plate 3, the touch panel FPC 13 can be drawn to the outside of the backlight chassis 6 through the space. Therefore, it is not necessary to form the cutout portion illustrated in FIG. 4A in the backlight chassis 6. As a result, the contact area between the backlight chassis 6 and the intermediate member 4 increases and the backlight chassis 6 and the intermediate member 4 are less likely to be detached from each other.

In FIGS. 5A and 5B, since the inner side surfaces of the three sidewalls come into contact with the side surface 4a of the intermediate member 4, it is possible to position the liquid crystal panel 1 and the backlight chassis 6 in the horizontal direction. However, the shape of the backlight chassis 6 may be changed such that positioning can be performed by the inner side surfaces of two sidewalls which are perpendicular to each other.

Figure 6A:
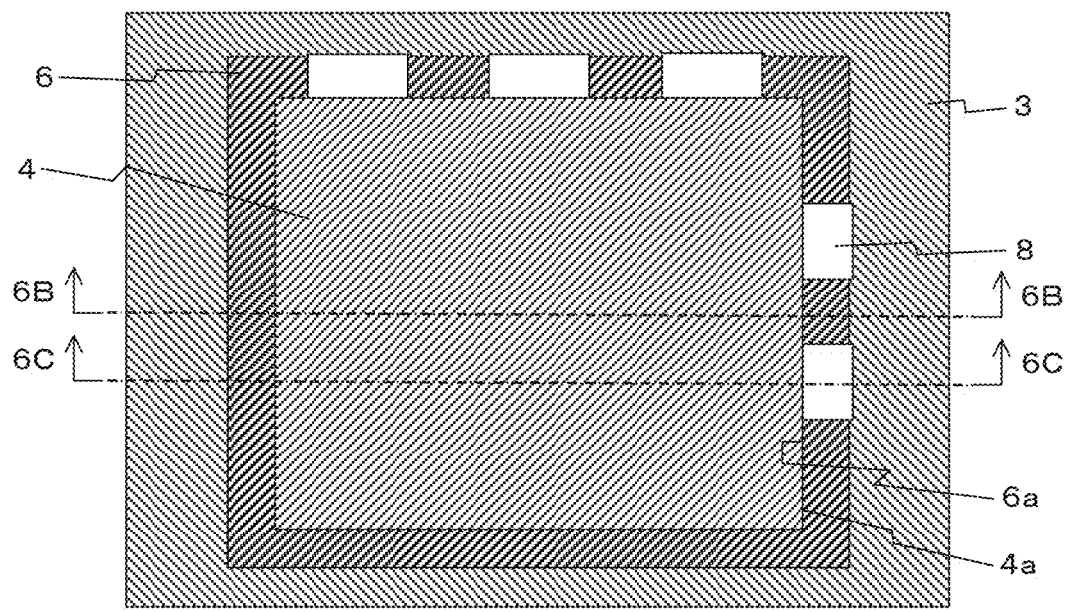
FIGS. 6A to 6C are diagrams schematically illustrating a modification example of the backlight chassis.
Figure 6B:
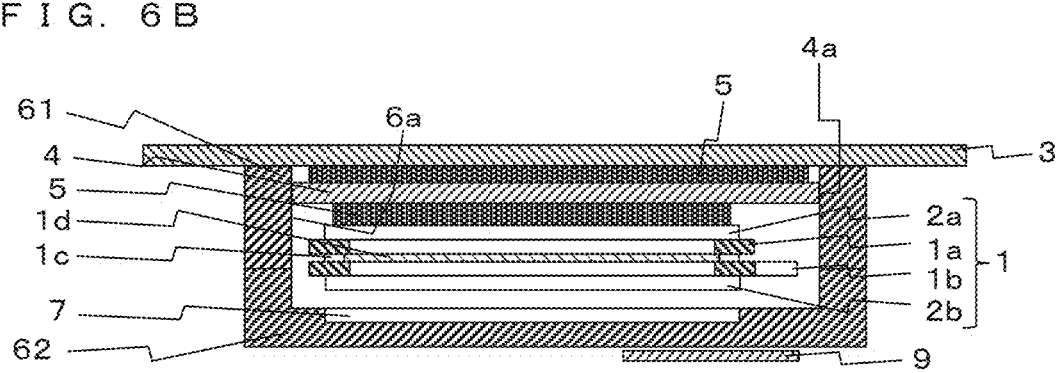
Figure 6C:
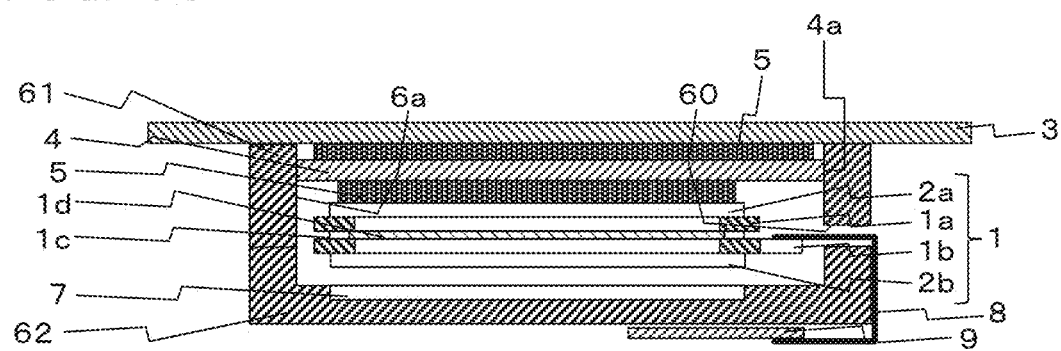

FIGS. 6A to 6C are diagrams schematically illustrating a modification example of the backlight chassis 6. FIG. 6A is a plan view illustrating a liquid crystal display device. FIG. 6B is a cross-sectional view taken along the line 6B-6B of FIG. 6A. FIG. 6C is a cross-sectional view taken along the line 6C-6C of FIG. 6A. The backlight chassis 6 illustrated in FIGS. 6A to 6C is divided into an upper chassis 61 and a lower chassis 62 in the thickness direction (vertical direction) of the liquid crystal display device (liquid crystal panel 1). In the backlight chassis 6 illustrated in FIGS. 6A to 6C, an inner side surface 6a of the upper chassis 61 comes into contact with the side surface 4a of the intermediate member 4. As illustrated in FIG. 6C, a cutout portion 60 is formed in a part of a connection portion between the upper chassis 61 and the lower chassis 62, the cutout portion 60 being a through hole passing through the backlight chassis 6 when the upper chassis 61 and the lower chassis 62 are connected to each other. In this structure, an FPC 8 which is connected to the liquid crystal panel 1 can be drawn to the outside of the backlight chassis 6 through the through hole that is formed in the side surface of the backlight chassis 6 when the upper chassis 61 and the lower chassis 62 are connected to each other. Therefore, it is easy to ensure a gap (through hole) through which the FPC 8 is drawn to the outside of the backlight chassis 6.

Figure 7:
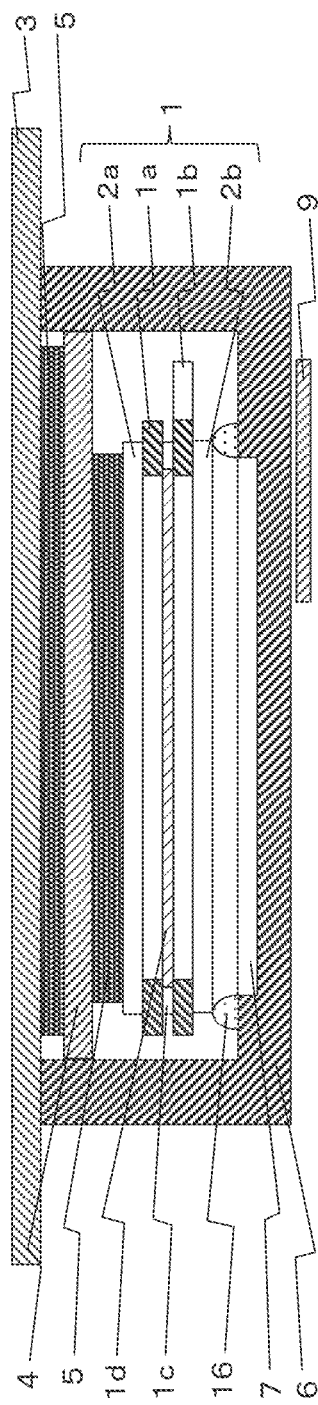
FIG. 7 is a diagram schematically illustrating a modification example of the backlight chassis.

FIG. 7 is a diagram schematically illustrating a modification example of the backlight chassis 6. As illustrated in FIG. 7, a cushion member 16 which comes into contact with the entire periphery of the lower surface of the liquid crystal panel 1 may be formed on the bottom surface of the backlight chassis 6 so as to surround the backlight 7. The cushion member 16 is used to block the gap between the periphery of the backlight 7 and the peripheral edge of the lower surface of the liquid crystal panel 1. Therefore, it is possible to prevent a foreign material from entering into the gap between the backlight 7 and the liquid crystal panel 1. The cushion member 16 can be provided by attaching a cushioned sponge tape or applying a low-elasticity resin adhesive. It is preferable that the cushion member 16 be made of a low-elasticity material which can absorb stress caused by the warpage of the liquid crystal panel 1 and has a Young's modulus of 0.5 Pa or less. When the Young's modulus of the material is about 0.1 Pa, it is possible to absorb stress caused by the warpage of the liquid crystal panel 1 and thus to reduce display unevenness.

Next, a method of manufacturing the liquid crystal display device according to Embodiment 1 will be described. FIGS. 8A to 8E are diagrams schematically illustrating the flow of a process for manufacturing the liquid crystal display device according to Embodiment 1. Hereinafter, the liquid crystal display device having a structure in which a transparent acrylic plate is used as the front plate 3 and a photo-curable OCR that is cured by UV light is used as the transparent adhesive 5 will be described.

Figure 8A:
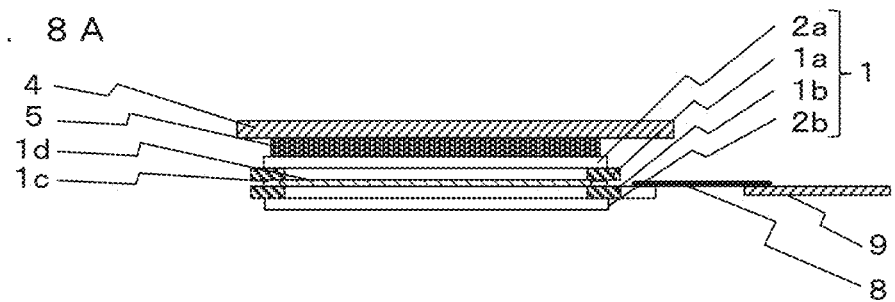
FIGS. 8A to 8E are diagrams schematically illustrating an example of the flow of a process for manufacturing the liquid crystal display device according to Embodiment 1.

First, as illustrated in FIG. 8A, the liquid crystal panel 1 and the intermediate member 4 are bonded to each other by the transparent adhesive 5. Specifically, the transparent adhesive 5 is applied onto at least one of the liquid crystal panel 1 and the intermediate member 4. Then, the liquid crystal panel 1 and the intermediate member 4 are aligned and bonded by the transparent adhesive 5 which has not been hardened. Then, the transparent adhesive 5 is hardened.

A method of applying the transparent adhesive 5 is not particularly limited. For example, the following methods may be used: a method using a dispenser; a method using a coater; and a printing method. Among these methods, it is preferable to use the method using a dispenser, in order to control the amount of transparent adhesive applied and to prevent the generation of air bubbles during bonding. A method of aligning the liquid crystal panel 1 and the intermediate member 4 is not particularly limited. For example, the following methods may be used: a positioning method based on an outward shape; and a positioning method which performs imaging processing for the outer edge of the intermediate member 4 and a positioning mark (not illustrated) for bonding that is provided in the liquid crystal panel 1. Among these methods, it is preferable to use the positioning method using image processing, in terms of the accuracy of positioning. A method of bonding the liquid crystal panel 1 and the intermediate member 4 is not particularly limited. For example, as a bonding environment, the following methods may be used: a bonding method which is performed in an atmospheric pressure environment; and a bonding method which is performed in a vacuum environment. In addition, the following bonding methods may be used: a bonding method using a roller; and a bonding method using a parallel plate. Among these methods, it is preferable to use the bonding method which uses the parallel plate and is performed in the vacuum environment, in order to prevent the generation of air bubbles during bonding. A method of hardening the transparent adhesive 5 is not particularly limited. For example, the following methods may be used: a method which places the intermediate member 4 and the liquid crystal panel 1 bonded to each other, with the intermediate member 4 up, and collectively emits UV light, using a UV lamp that is provided above the intermediate member 4; and a method which places the intermediate member 4 and the liquid crystal panel 1 bonded to each other on a conveyor, with the intermediate member 4 down, and emits UV to the intermediate member 4, using a UV lamp that is provided below the intermediate member 4, while transporting the intermediate member 4 and the liquid crystal panel 1 bonded to each other using the conveyor. Among these methods, it is preferable to use the method which emits UV light from the lower side of the intermediate member 4 while transporting the intermediate member 4 and the liquid crystal panel 1 using the conveyor, in order to uniformly harden the transparent adhesive using irradiation.

Figure 8B:
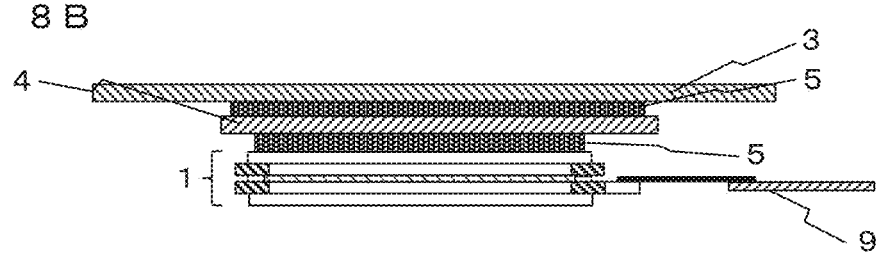

Then, as illustrated in FIG. 8B, the intermediate member 4 to which the liquid crystal panel 1 has been bonded and the front plate 3 are bonded to each other by the transparent adhesive 5. A method of bonding the intermediate member 4 and the front plate 3 is the same as that for bonding the liquid crystal panel 1 and the intermediate member 4 using the transparent adhesive 5 and thus the description thereof will not be repeated.

Then, the liquid crystal panel 1 to which the front plate 3 and the intermediate member 4 have been bonded is incorporated into the backlight chassis 6 and is then fixed thereto. The backlight 7 is fixed to the concave portion formed in the bottom surface of the backlight chassis 6 and then the liquid crystal panel 1 is incorporated into the backlight chassis 6. A method of incorporating the liquid crystal panel 1 to which the front plate 3 and the intermediate member 4 have been bonded into the backlight chassis 6 is not particularly limited. For example, in the method illustrated in FIG. 8C, the liquid crystal panel 1 which is attached to the front plate 3, with the intermediate member 4 interposed therebetween, is dropped into the backlight chassis 6 from the upper side of the backlight chassis 6 which is placed with the opening edge 6b up, while being positioned by the inner side surface 6a of the backlight chassis 6 and the side surface 4a of the intermediate member 4, as represented by an arrow. In this case, the liquid crystal panel 1 is dropped until the lower surface of the front plate 3 comes into contact with the opening edge 6b of the backlight chassis 6. In this way, the liquid crystal panel 1 and the backlight chassis 6 are positioned in the vertical direction by the lower surface of the front plate 3 and the opening edge 6b of the backlight chassis 6.

Figure 8C:
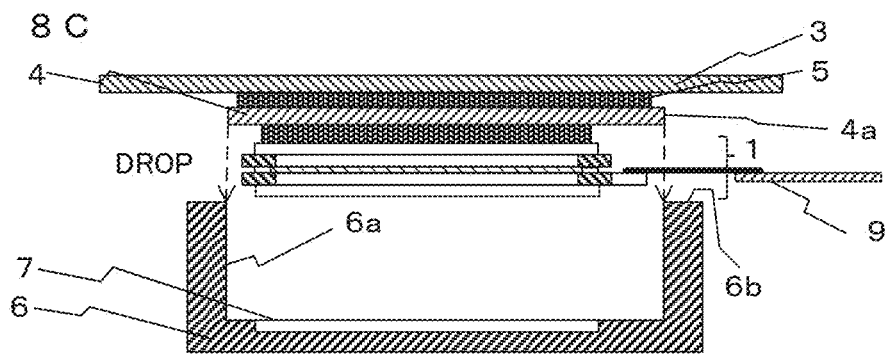
Figure 8D:
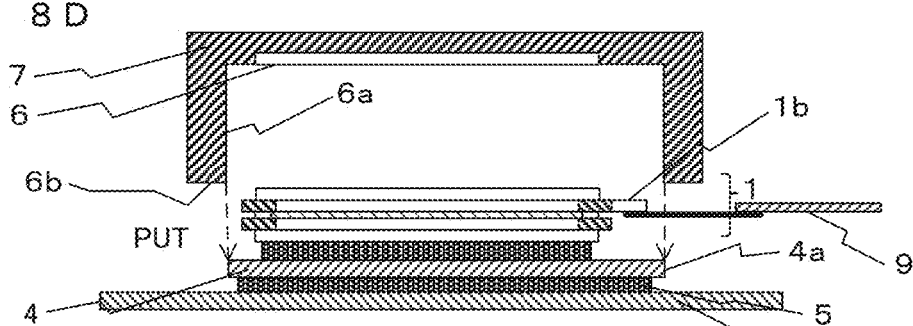

FIG. 8D illustrates another method which incorporates the liquid crystal panel 1 into the backlight chassis 6. In the method illustrated in FIG. 8D, the backlight chassis 6 with the opening edge 6b down, is dropped (put) from the upper side of the front plate 3 placed with the liquid crystal panel 1 up, while being positioned by the inner side surface 6a of the backlight chassis 6 and the side surface 4a of the intermediate member 4, as represented by an arrow. In this case, the backlight chassis 6 is dropped until the opening edge 6b of the backlight chassis 6 comes into contact with the rear surface of the front plate 3. In this way, the liquid crystal panel 1 and the backlight chassis 6 are positioned in the vertical direction by the rear surface of the front plate 3 and the opening edge 6b of the backlight chassis 6.

As a method of incorporating the liquid crystal panel 1 into the backlight chassis 6, it is preferable to use the method illustrated in FIG. 8D among the methods illustrated in FIGS. 8C and 8D, in order to prevent the display unevenness of the liquid crystal panel 1 due to the flexure or warpage of the front plate 3 or the liquid crystal panel 1.

As a clearance for incorporating the intermediate member 4 into the backlight chassis 6 while performing positioning, a gap may be provided between the inner side surface 6a of the backlight chassis 6 and the side surface 4a of the intermediate member 4. The gap may be 1.5 mm or less, and it is preferable that the gap be 1.0 mm or less. For example, the gap can be about 0.5 mm in order to prevent the leakage of light from the backlight 7. When the gap (clearance) is provided between the backlight chassis 6 and the intermediate member 4, the gap is in the range in which no rattling occurs in a contact portion between the backlight chassis 6 and the intermediate member 4 and the backlight chassis 6 and the intermediate member 4 can be positioned in the horizontal direction by the contact between the inner side surface 6a of the backlight chassis 6 and the side surface 4a of the intermediate member 4. A method of fixing the liquid crystal panel 1 and the backlight chassis 6 is not particularly limited. For example, the following methods may be used: a method which attaches a double-sided tape to a contact position between the backlight chassis 6, and the front plate 3 or the intermediate member 4 in advance, and fixes them; and a method which applies an adhesive onto an adhesion surface between the backlight chassis 6, and the front plate 3 or the intermediate member 4. Among these methods, it is preferable to use the method which applies the adhesive onto the adhesion surface, in order to easily adjust the position during an assembly process.

Figure 8E:
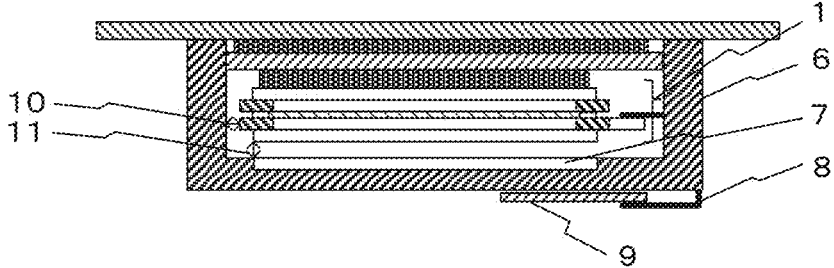

Then, as illustrated in FIG. 8E, the circuit board 9 is fixed to the rear surface (lower surface) of the backlight chassis 6 and a protective plate which covers the circuit board 9 and the FPC 8 is attached. Specifically, the FPC 8 is drawn to the outside of the backlight chassis 6 through a through hole (not illustrated) which passes through the backlight chassis 6 and the circuit board 9 is fixed at the position where the liquid crystal panel 1 is not drawn through the FPC 8. A method of fixing the circuit board 9 is not particularly limited. For example, the circuit board 9 may be fixed by a method using a screw or a method using a double-sided tape. Among these methods, it is preferable to use the method using a screw in order to facilitate the replacement and maintenance of the backlight chassis 6 or the circuit board 9.

In addition, the liquid crystal display device having the structure in which the front plate 3 is supported by the opening edge 6b of the backlight chassis 6 and the intermediate member 4 is supported by the opening edge 6bb as illustrated in FIG. 5B can be assembled by the same method as described above.

In the above-mentioned structure, the liquid crystal display device according to Embodiment 1 is assembled such that the inner side surface 6a of the backlight chassis 6 comes into contact with at least a portion of the side surface 4a of the intermediate member 4. The inner side surface 6a of the backlight chassis 6 comes into contact with the side surface 4a of the intermediate member 4 in the same plane to position the side surface 4a of the intermediate member 4 with respect to the inner side surface 6a of the backlight chassis 6. In addition, the liquid crystal display device is assembled such that the lower surface of the front plate 3 comes into contact with at least a portion of the opening edge 6b (upper surface) of the backlight chassis 6. The lower surface of the front plate 3 comes into contact with the upper surface of the backlight chassis 6 in the same plane to position the upper surface of the backlight chassis 6 with respect to the lower surface of the front plate 3.

Positioning is performed by the inner side surface 6a of the backlight chassis 6 and the side surface 4a of the intermediate member 4 to appropriately ensure the gap 10 between the backlight chassis 6 and the liquid crystal panel 1 in the horizontal direction. In addition, positioning is performed by the lower surface of the front plate 3 and the upper surface of the backlight chassis 6 to appropriately ensure the gap 11 between the backlight chassis 6 (backlight 7) and the liquid crystal panel 1 in the vertical direction.

The external dimensions of the intermediate member 4 are smaller than the external dimensions of the front plate 3 and positioning is performed by the side surface 4a of the intermediate member 4 and the inner side surface 6a of the backlight chassis 6. Therefore, the external dimensions of the backlight chassis 6 can be smaller than those of the front plate 3. In addition, the intermediate member 4 functions as a positioning guide when the liquid crystal panel 1 is incorporated into the backlight chassis 6, which makes it easy to incorporate the liquid crystal panel 1 into the backlight chassis 6 without any contact.

Figure 9A:
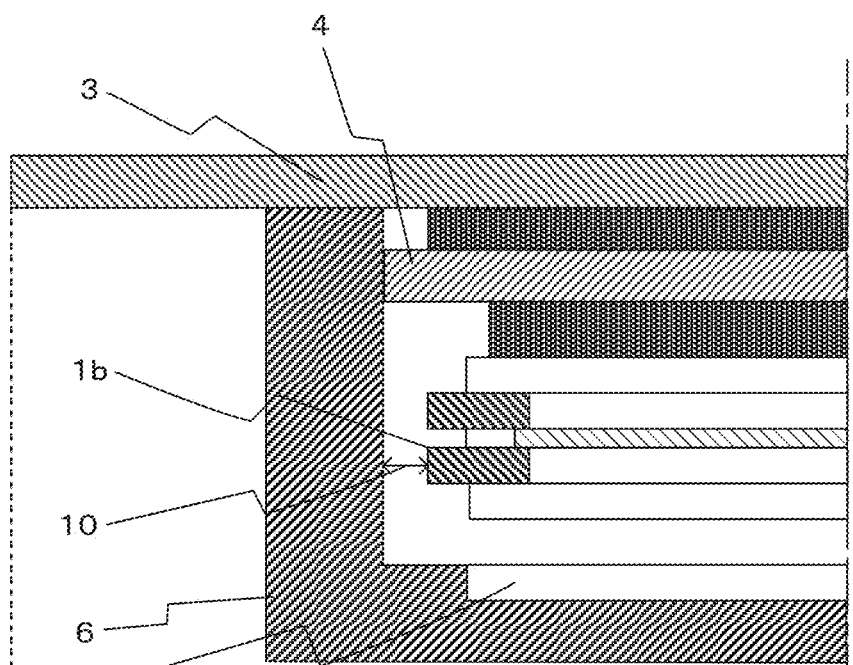
FIGS. 9A and 9B are cross-sectional views illustrating the comparison between the structure according to Embodiment 1 and a structure according to the related art.
Figure 9B:
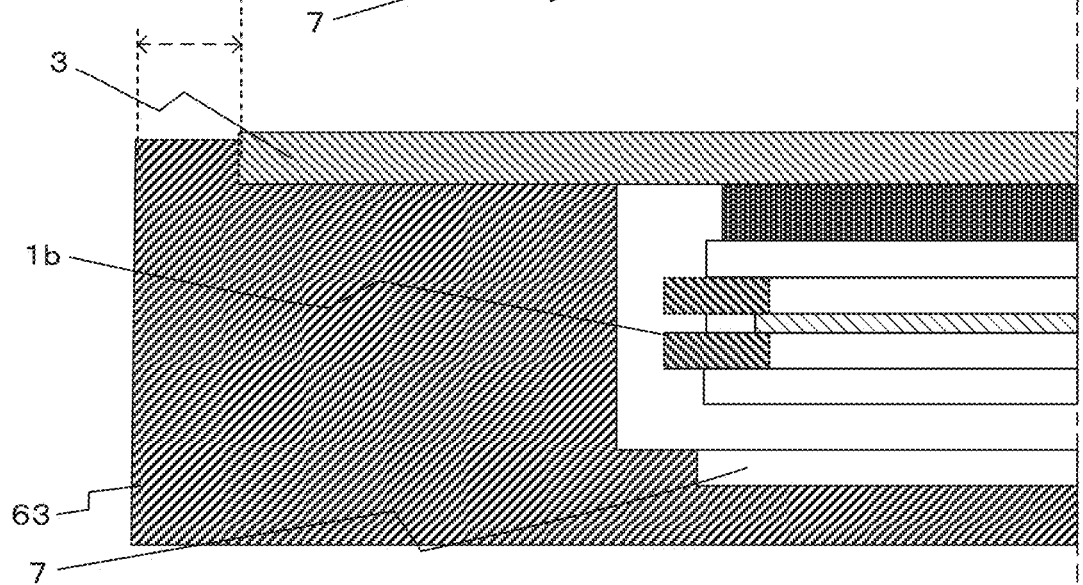

FIGS. 9A and 9B are cross-sectional views illustrating the comparison between the structure according to Embodiment 1 and a structure according to the related art. FIG. 9A illustrates a portion of the cross section of the liquid crystal display device according to Embodiment 1 and FIG. 9B illustrates a portion of the cross section of a liquid crystal display device having a structure without the intermediate member 4 according to the related art. In the structure according to the related art, a backlight chassis 63 (housing) holds the side surface of a front plate 3 (a transparent member or a touch panel). Therefore, as illustrated in FIG. 9B, the backlight chassis 63 needs to come into contact with the side surface of the front plate 3. As a result, the backlight chassis 63 is larger than the front plate 3. Specifically, the backlight chassis 63 has a shape in which the size thereof is greater than that of the front plate 3 by a length, which is represented by a dashed arrow in FIG. 9B, from the side surface of the front plate 3. In contrast, in the liquid crystal display device according to Embodiment 1, it is possible to reduce the size and weight of the backlight chassis 6, as compared to the structure according to the related art.

Figure 10A:
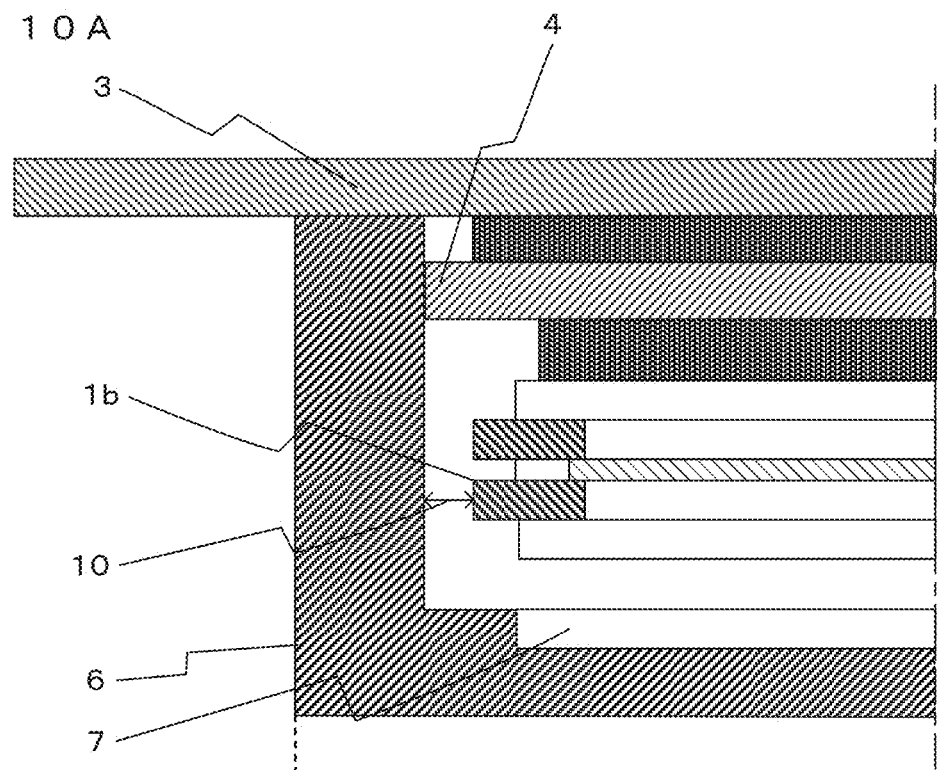
FIGS. 10A and 10B are cross-sectional views illustrating the comparison between the structure according to Embodiment 1 and a structure according to the related art.
Figure 10B:
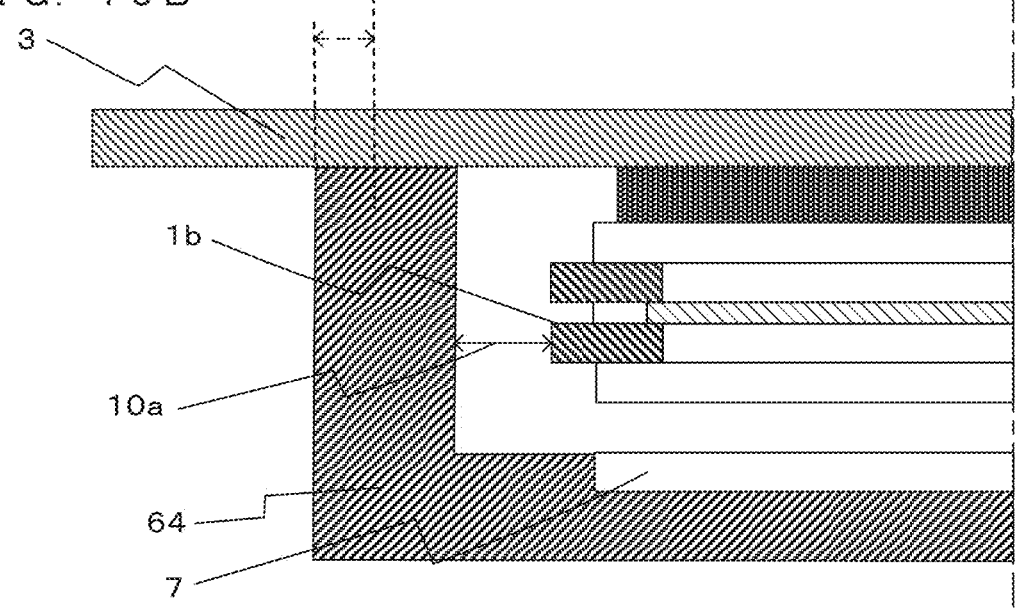

FIGS. 10A and 10B are cross-sectional views illustrating the comparison between the structure according to Embodiment 1 and a structure according to the related art. FIG. 10A illustrates a portion of the cross section of the liquid crystal display device according to Embodiment 1 and FIG. 10B illustrates a portion of the cross section of a liquid crystal display device having a structure without the intermediate member 4 according to the related art. In the structure according to the related art in which a liquid crystal panel 1 is incorporated into a backlight chassis 64, without performing positioning using the backlight chassis 64 and the side surface of the front plate 3, it is necessary to carefully incorporate the liquid crystal panel 1 into the backlight chassis 64 such that the liquid crystal panel 1 and the backlight chassis 64 do not come into contact with each other. In addition, it is necessary to increase a gap 10a in the horizontal direction in advance according to an incorporation process, which results in an increase in the size of the backlight chassis 64. Specifically, the size of the backlight chassis 64 is greater than the size of the backlight chassis 6 according to Embodiment 1 by a length represented by a dashed arrow in FIG. 10B. In contrast, in the liquid crystal display device according to Embodiment 1, it is possible to reduce the size and weight of the backlight chassis 6, as compared to the structure according to the related art.

Figure 11A:
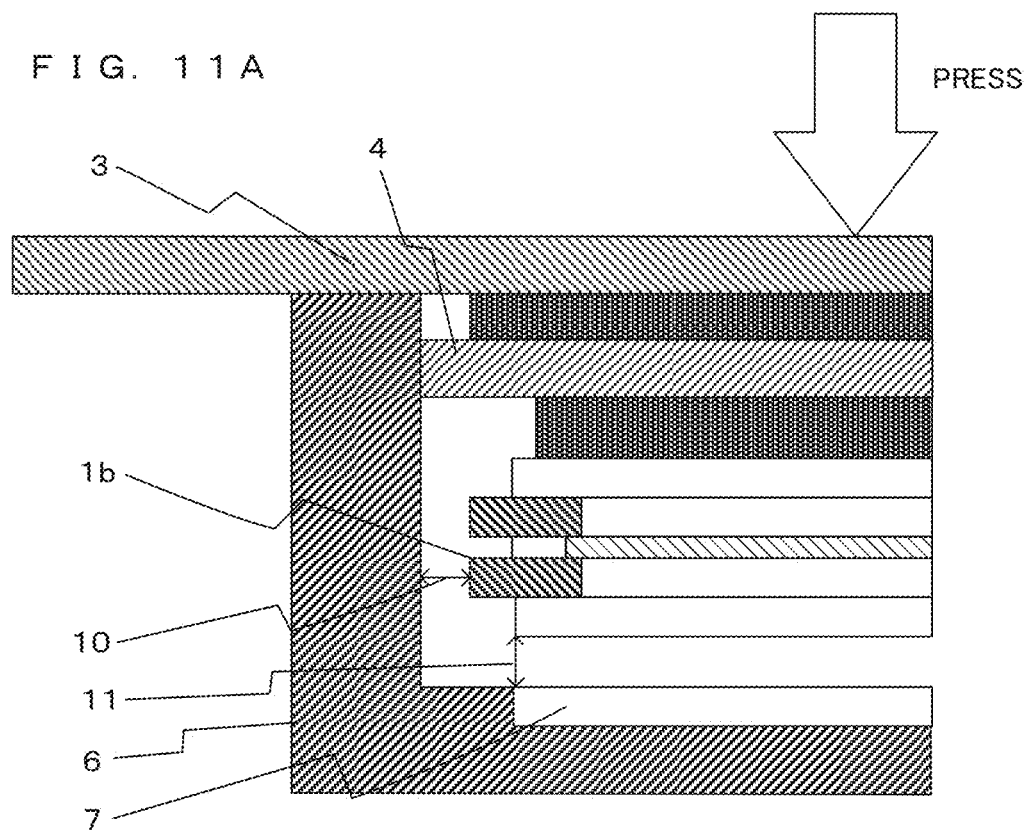
FIGS. 11A and 11B are cross-sectional views illustrating the comparison between the structure according to Embodiment 1 and a structure according to the related art.
Figure 11B:
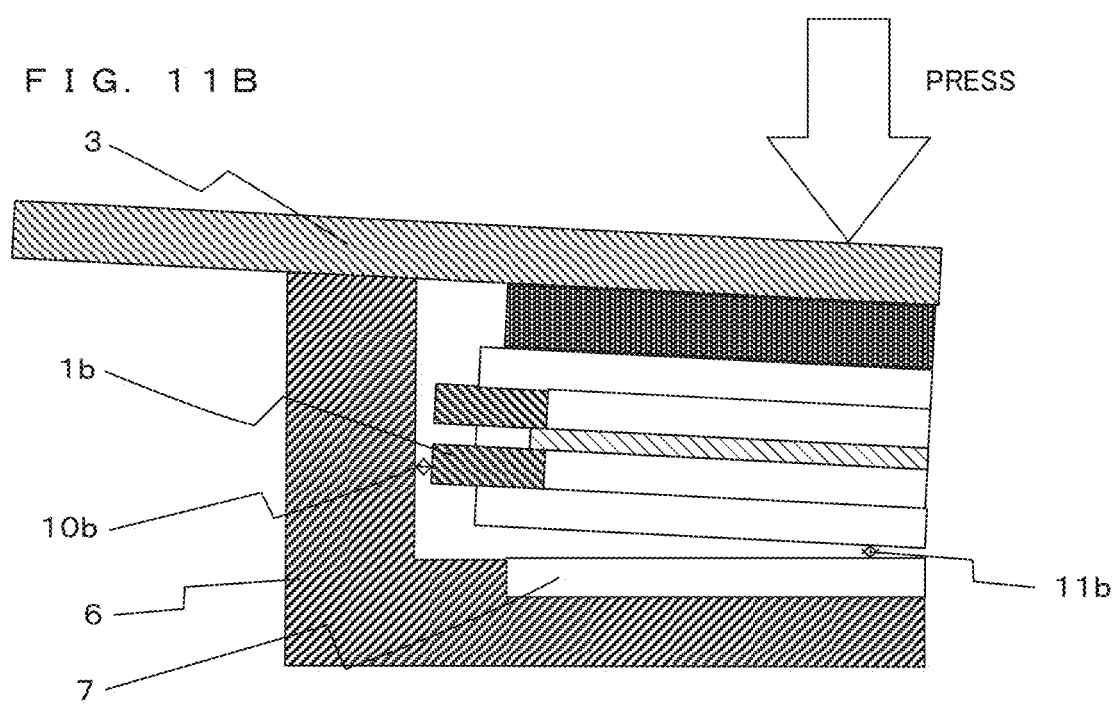

FIGS. 11A and 11B are cross-sectional views illustrating the comparison between the structure according to Embodiment 1 and a structure according to the related art. FIG. 11A illustrates a portion of the cross section of the liquid crystal display device according to Embodiment 1 and FIG. 11B illustrates a portion of the cross section of a liquid crystal display device having a structure without the intermediate member 4 according to the related art. In the structure according to the related art, when the liquid crystal display device is pressed by, for example, a touch operation in the direction represented by an arrow in FIG. 11B, warpage is likely to occur and a gap 10b in the horizontal direction and a gap 11b in the vertical direction are narrowed. When pressing force increases, a liquid crystal panel 1 comes into contact with a backlight chassis 6 and display unevenness occurs. In contrast, in the liquid crystal display device according to Embodiment 1, a portion for holding and supporting the liquid crystal panel 1 includes the front plate 3 and the intermediate member 4 and has a large thickness. In addition, the intermediate member 4 functions as a beam structure of the backlight chassis 6. Therefore, the intermediate member 4 reinforces the front plate 3 and it is possible to prevent warpage due to pressure caused by, for example, a touch operation.

As described above, according to the liquid crystal display device according to Embodiment 1, the dimensions of the backlight chassis 6 can be smaller than the dimensions of the front plate 3. As a result, it is possible to reduce the size and weight of the liquid crystal display device. In addition, it is possible to appropriately ensure the gap 10 between the backlight chassis 6 and the liquid crystal panel 1 in the horizontal direction and the gap 11 therebetween in the vertical direction with a simple assembly operation. Therefore, it is possible to reduce display unevenness due to the contact between the liquid crystal panel 1 and the backlight chassis 6. In addition, it is possible to suppress warpage due to pressure caused by, for example, a touch operation and thus to reduce display unevenness which occurs when the liquid crystal panel 1 and the backlight chassis 6 come into contact with each other due to pressure.

Embodiment 2

Figure 13:
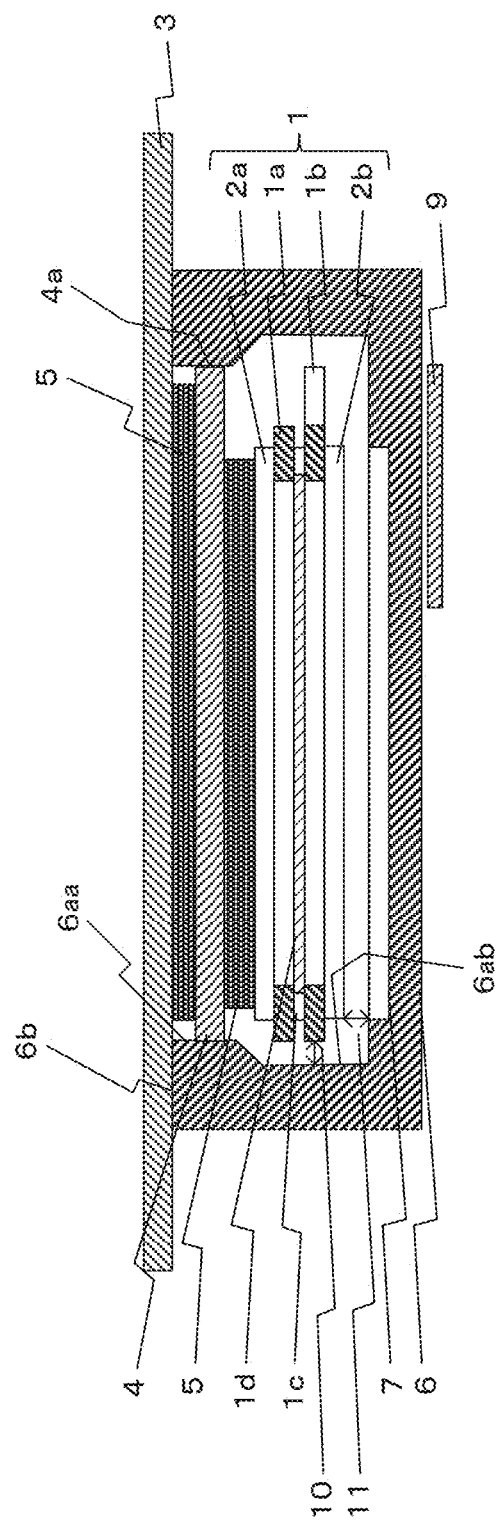
FIG. 13 is a cross-sectional view taken along the line XIII-XIII of FIG. 12.

The structure of Embodiment 2 of the invention will be described. FIG. 12 is a plan view illustrating a liquid crystal display device according to Embodiment 2. FIG. 13 is a cross-sectional view taken along the line XIII-XIII of FIG. 12. In the liquid crystal display device according to Embodiment 2, an intermediate member 4 has substantially the same external dimensions as a liquid crystal panel 1. In Embodiment 2, the liquid crystal panel 1, a front plate 3, and a transparent adhesive 5 have the same structures as those in Embodiment 1 and thus the description thereof will not be repeated.

A backlight chassis 6 according to Embodiment 2 is formed in a shape in which the dimensions of an opening close to an opening edge 6b (the distance between the inner side surfaces 6aa facing to each other) are smaller than the dimensions of an opening close to the bottom surface (the distance between the inner side surface 6ab facing to each other). Therefore, when the inner side surface 6aa close to the opening edge 6b comes into contact with the side surface 4a of the intermediate member 4 and is positioned, a gap 10 is provided between the inner side surface 6ab close to the bottom surface and the liquid crystal panel 1. In addition, similarly to Embodiment 1, the backlight 7 is disposed on the bottom surface of the backlight chassis 6 and a portion of or the entire periphery of the lower surface of the front plate 3 is supported by the opening edge 6b. In Embodiment 2, the gap 10 is provided between the liquid crystal panel 1 which is held and supported by the front plate 3 and the backlight chassis 6 in the horizontal direction and a gap 11 is provided therebetween in the vertical direction.

Figure 14:
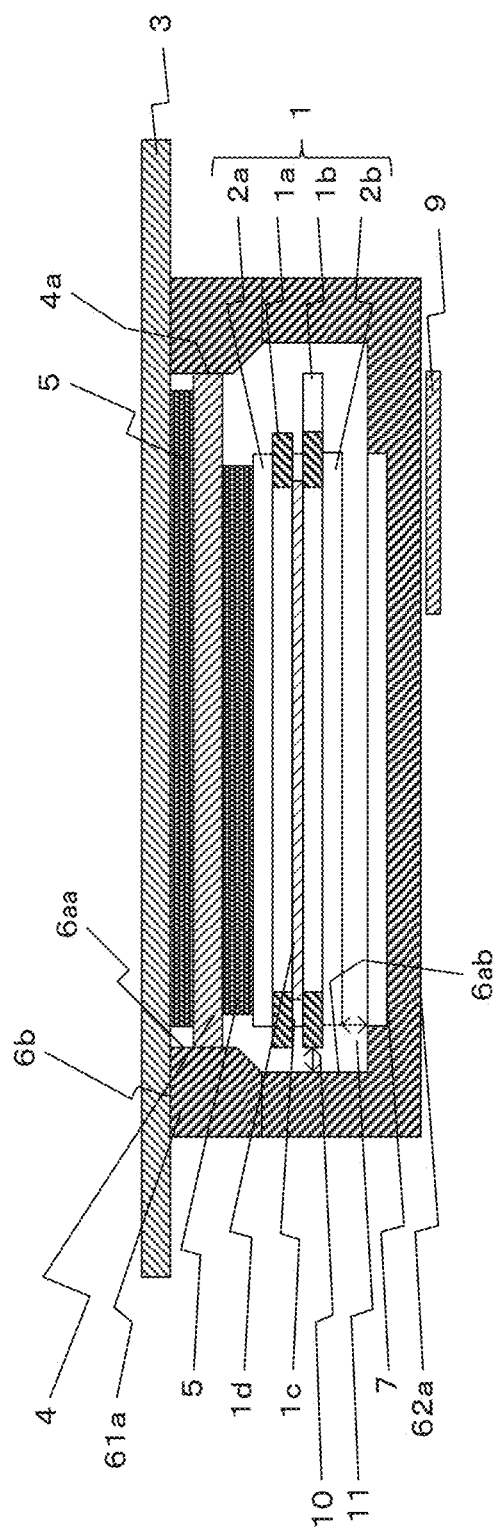
FIG. 14 is a cross-sectional view illustrating a modification example of a backlight chassis according to Embodiment 2.

Next, modification examples of the backlight chassis 6 according to Embodiment 2 will be described. FIG. 14 is a cross-sectional view illustrating a modification example of the backlight chassis 6 according to Embodiment 2. In a liquid crystal display device illustrated in FIG. 14, a backlight chassis 6 is divided into an upper chassis 61a and a lower chassis 62a in the vertical direction. The backlight chassis 6 may be divided into two parts with different opening dimensions. The backlight chassis 6 can be divided into the upper chassis 61a having the inner side surface 6aa and the lower chassis 62a having the inner side surface 6ab. In the example illustrated in FIG. 14, the inner side surface 6aa of the upper chassis 61a comes into contact with the side surface 4a of the intermediate member 4. When the backlight chassis 6 is processed by, for example, molding, it is preferable that the upper chassis 61a and the lower chassis 62a be separately processed.

FIGS. 15A and 15B are diagrams schematically illustrating a modification example of the backlight chassis 6 according to Embodiment 2. FIG. 15A is a plan view illustrating a liquid crystal display device. FIG. 15B is a cross-sectional view taken along the line 15B-15B of FIG. 15A. In the liquid crystal display device illustrated in FIGS. 15A and 15B, an opening edge 6b of a backlight chassis 6 has opening dimensions that are slightly greater than the external dimensions of the intermediate member 4 and a plurality of convex portions 6c are formed on the inner side surface 6aa close to the opening edge 6b. In the example illustrated in FIG. 15A, two convex portions 6c protrude inward from each of four inner side surfaces 6aa. The convex portions 6c are provided at both end sides of each of four side surfaces 4a of the intermediate member 4 so as not to overlap the FPC 8 of the liquid crystal panel 1. However, the position of the convex portions 6c and the number of convex portions 6c are not limited to the example illustrated in FIGS. 15A and 15B. In the backlight chassis 6 having this structure, a protruding end of each convex portion 6c comes into contact with the side surface 4a of the intermediate member 4 and the backlight chassis 6 and the liquid crystal panel 1 are positioned. When the corners of the intermediate member 4 come into contact with the backlight chassis 6, they are likely to chip off. However, as illustrated in FIGS. 15A and 15B, since the corners of the intermediate member 4 do not come into contact with the backlight chassis 6, it is possible to prevent the occurrence of a defect due to the chipping-off of the corners of the intermediate member 4.

Similarly to Embodiment 1, the intermediate member 4 according to Embodiment 2 is bonded between the front plate 3 and the liquid crystal panel 1 by the transparent adhesive 5. The intermediate member 4 according to Embodiment 2 has external dimensions that are smaller than those of the front plate 3 and are substantially equal to those of the liquid crystal panel 1. In addition, a portion of or the entire periphery of the side surface 4a of the intermediate member 4 comes into contact with the inner side surface 6aa of the backlight chassis 6.

The material forming the intermediate member 4, the thickness of the intermediate member 4, and the shape of the outer periphery of the lower surface of the intermediate member 4 are the same as those in Embodiment 1 and thus the description thereof will not be repeated. In addition, when the intermediate member 4 has the function of a touch sensor, the intermediate member 4 may have the same structure as that described in Embodiment 1. The embodiment described in FIGS. 5A and 5B of Embodiment 1 may be applied to the structure according to Embodiment 2. In this case, the external dimensions of the intermediate member 4 are greater than those of the liquid crystal panel 1.

Figure 16A:
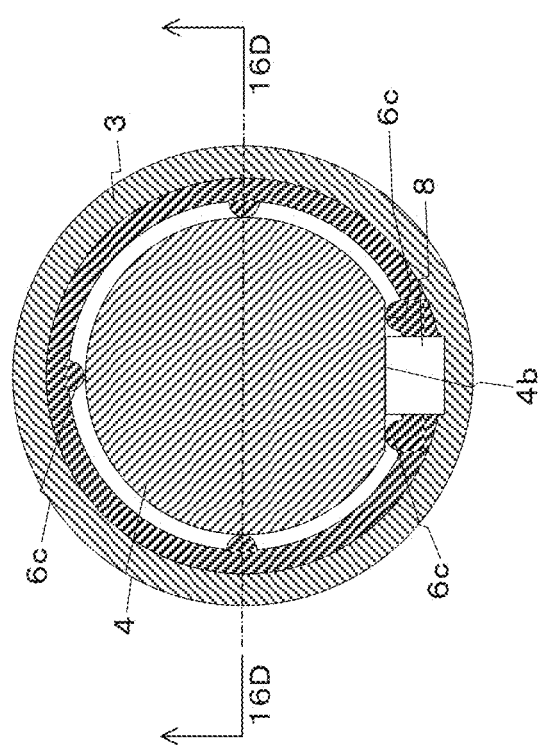
FIGS. 16A to 16D are diagrams schematically illustrating modification examples of the liquid crystal display device illustrated in FIGS. 15A and 15B.
Figure 16C:
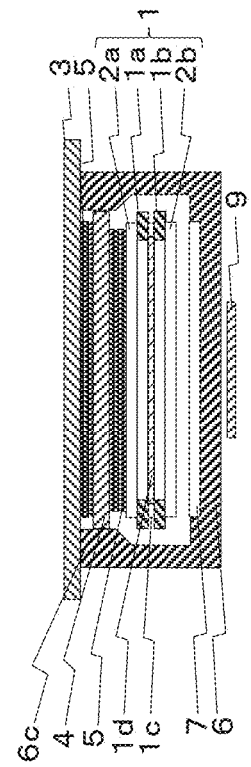
Figure 16B:
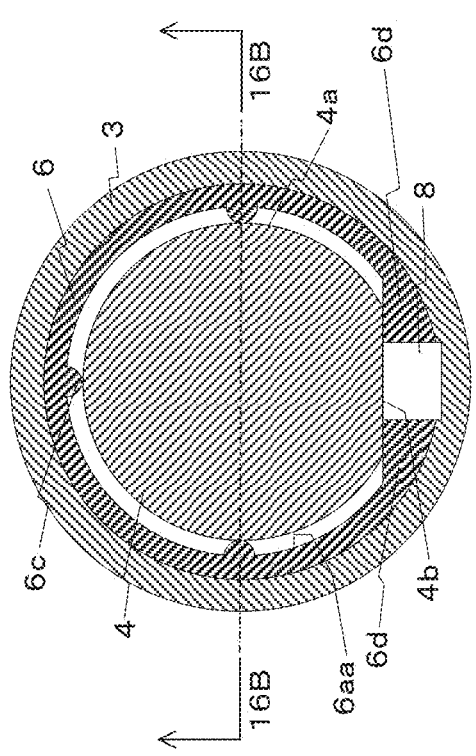
Figure 16D:
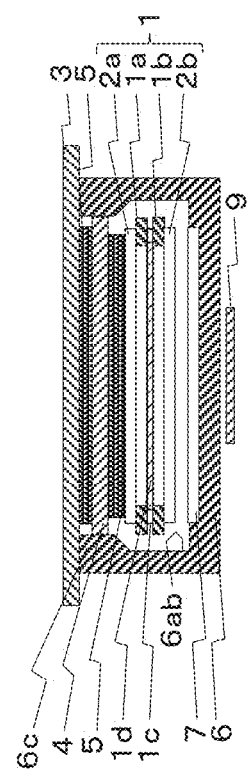

FIGS. 16A to 16D are diagrams schematically illustrating modification examples of the liquid crystal display device illustrated in FIGS. 15A and 15B. As a modification of the liquid crystal display device illustrated in FIGS. 15A and 15B, when a liquid crystal panel 1, a backlight chassis 6, a backlight 7, and a front plate 3 have a circular shape, a circular intermediate member 4 can be provided between the front plate 3 and the liquid crystal panel 1. FIGS. 16A and 16C are plan views illustrating a circular liquid crystal display device. FIG. 16B is a cross-sectional view taken along the line 16B-16B of FIG. 16A. FIG. 16D is a cross-sectional view taken along the line 16D-16D of FIG. 16C. In the circular liquid crystal display device, for example, as illustrated in FIG. 16A, a cutout portion 4b which has a cutout surface parallel to the central axis of the circular intermediate member 4 is formed in a side surface 4a of the intermediate member 4. In addition, convex portions 6c are formed at positions, which face the curved side surface 4a of the intermediate member 4, on the inner side surface 6aa close to an opening edge 6b of the backlight chassis 6 so as to protrude inward. A planar portion 6d is formed at a position which faces the cutout surface of the cutout portion 4b so as to protrude inward. In the example illustrated in FIG. 16A, the cutout portion 4b of the intermediate member 4 is provided at the position where the liquid crystal panel 1 and the FPC 8 overlap each other and two triangular planar portions 6d are provided at the positions, which face the cutout portion 4b, on the inner side surface 6aa of the backlight chassis 6 so as not to overlap the FPC 8. In addition, three convex portions 6c are provided on the inner side surface 6aa of the backlight chassis 6 at three positions, that is, a position which faces the planar portion 6d and two central positions between the position and the planar portion 6d.

In the backlight chassis 6 having the above-mentioned structure, the convex portions 6c come into contact with the side surface 4a of the intermediate member 4 and the planar portion 6d comes into contact with the cutout portion 4b of the intermediate member 4. In this way, the backlight chassis 6 and the liquid crystal panel 1 are positioned. In addition, the planar portion 6d of the backlight chassis 6 comes into contact with the cutout portion 4b of the intermediate member 4 to prevent the rotation of the intermediate member 4 in a circumferential direction. As illustrated in FIG. 16C, instead of the planar portion 6d, two convex portions 6c having the same shape as the convex portion 6c illustrated in FIG. 16A may be provided.

Next, a method of manufacturing the liquid crystal display device according to Embodiment 2 will be described. FIGS. 17A to 18C are diagrams schematically illustrating an example of the flow of a process for manufacturing the liquid crystal display device according to Embodiment 2. Hereinafter, the liquid crystal display device having a structure in which the external dimensions of the intermediate member 4 are substantially equal to the external dimensions of the liquid crystal panel 1 and the backlight chassis 6 is divided into the upper chassis 61a and the lower chassis 62a will be described.

Figure 17A:
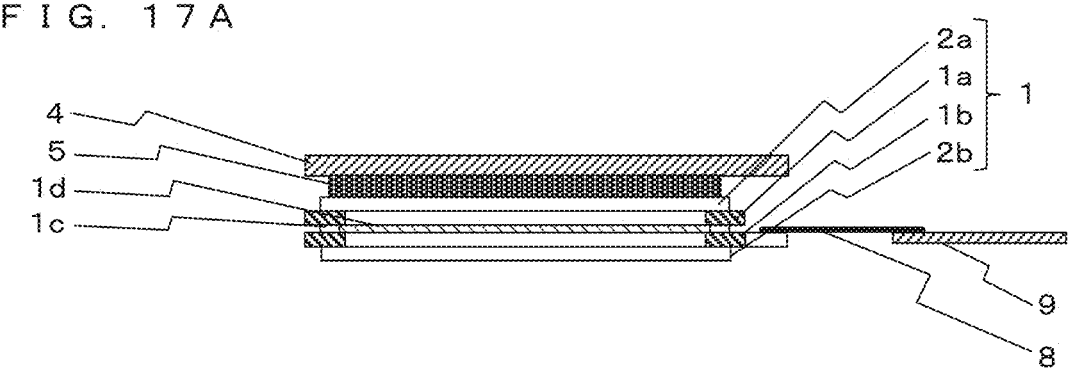
FIGS. 17A to 17D are diagrams schematically illustrating an example of the flow of a process for manufacturing the liquid crystal display device according to Embodiment 2.

First, as illustrated in FIG. 17A, the liquid crystal panel 1 and the intermediate member 4 are bonded to each other by the transparent adhesive 5. A method of bonding the liquid crystal panel 1 and the intermediate member 4 is the same as that in Embodiment 1.

Figure 17B:
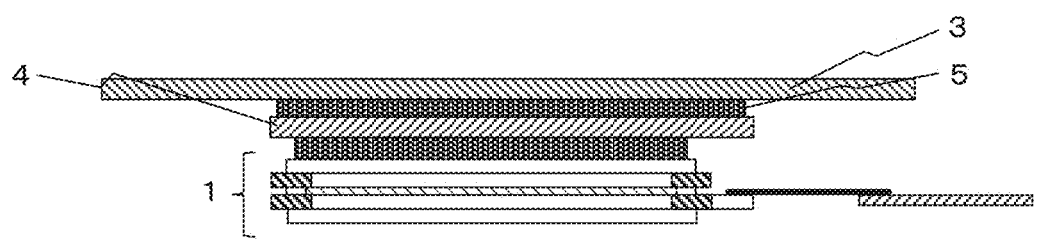

Then, as illustrated in FIG. 17B, the intermediate member 4 to which the liquid crystal panel 1 has been bonded and the front plate 3 are bonded to each other by the transparent adhesive 5. A method of bonding the intermediate member 4 and the front plate 3 is the same as that in Embodiment 1.

Then, the liquid crystal panel 1 to which the front plate 3 and the intermediate member 4 have been bonded is incorporated into the upper chassis 61*a* and is then fixed thereto. A method of incorporating the liquid crystal panel 1 to which the front plate 3 and the intermediate member 4 have been bonded into the upper chassis 61*a* is not particularly limited. For example, in the method illustrated in FIG. 17C, the liquid crystal panel 1 which is attached to the front plate 3, with the intermediate member 4 interposed therebetween, is dropped from the upper side of the upper chassis 61*a* placed with the opening edge 6*b* up, while being positioned by the inner side surface 6*aa* of the upper chassis 61*a* and the side surface 4*a* of the intermediate member 4, as represented by an arrow. In this case, the liquid crystal panel 1 is dropped until the lower surface of the front plate 3 comes into contact with the opening edge 6*b* (upper surface) of the upper chassis 61*a*. In this way, the liquid crystal panel 1 and the upper chassis 61*a* are positioned in the vertical direction by the lower surface of the front plate 3 and the upper surface of the upper chassis 61*a*. Then, as represented by an arrow in FIG. 17D, the liquid crystal panel 1 to which the upper chassis 61*a* has been bonded is inserted from the upper side of the lower chassis 62*a* placed with an opening portion up, and the upper chassis 61*a* is combined with the lower chassis 62*a*. For example, as illustrated in FIG. 17D, the upper chassis 61*a* and the lower chassis 62*a* may be combined with each other by inserting guide pins 62*b* that protrude from an opening end of the lower chassis 62*a* into concave portions (not illustrated) provided in the upper chassis 61*a*.

Figure 18A:
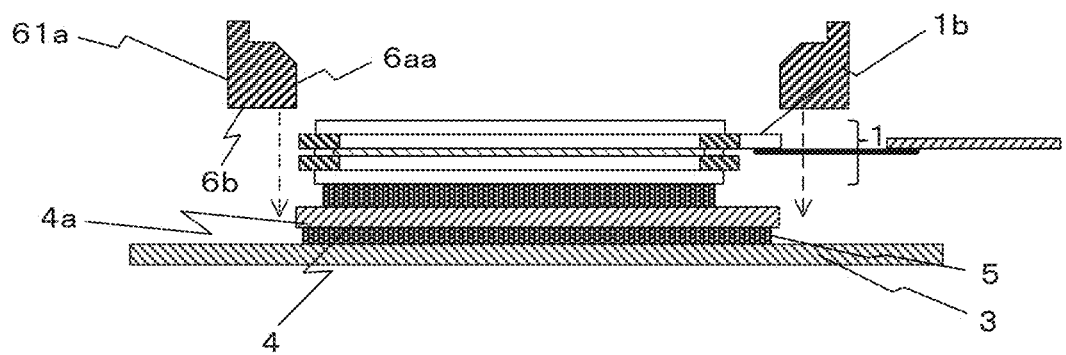
FIGS. 18A to 18C are diagrams schematically illustrating an example of the flow of the process for manufacturing the liquid crystal display device according to Embodiment 2.

FIG. 18A illustrates another method which incorporates the liquid crystal panel 1 into the upper chassis 61*a*. In the method illustrated in FIG. 18A, the upper chassis 61*a* with the opening edge 6*b* down, is dropped from the upper side of the front plate 3 placed with the liquid crystal panel 1 up while being positioned by the inner side surface 6*aa* of the upper chassis 61*a* and the side surface 4*a* of the intermediate member 4, as represented by an arrow. In this case, the upper chassis 61*a* is dropped until the opening edge 6*b* of the upper chassis 61*a* comes into contact with the rear surface of the front plate 3. In this way, positioning is performed in the vertical direction by the rear surface of the front plate 3 and the opening edge 6*b* of the upper chassis 61*a*. Then, as represented by an arrow in FIG. 18B, the lower chassis 62*a* with the opening portion down, is dropped (put) from the upper side of the upper chassis 61*a* placed on the front plate 3. In this way, the lower chassis 62*a* is combined with the upper chassis 61*a*. For example, as illustrated in FIG. 18B, the upper chassis 61*a* and the lower chassis 62*a* may be combined with each other by fitting convex portion 62*c* which is formed in the opening end of the lower chassis 62*a* to concave portion 61*b* which is formed in the opening end of the rear surface of the upper chassis 61*a*.

Figure 17C:
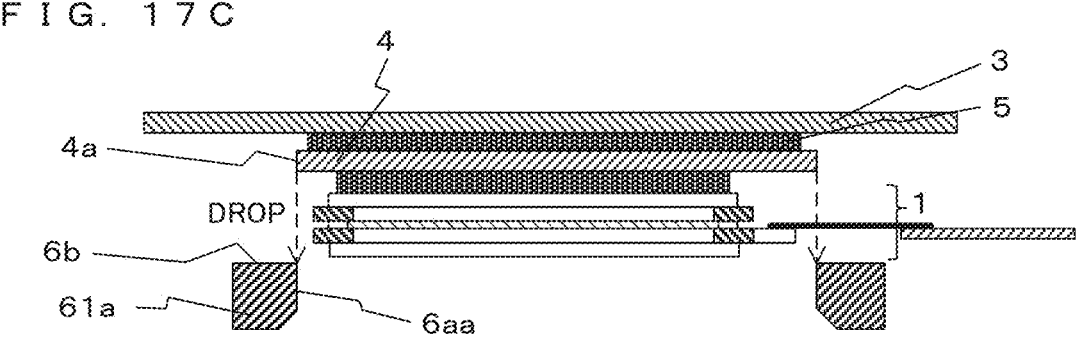
Figure 17D:
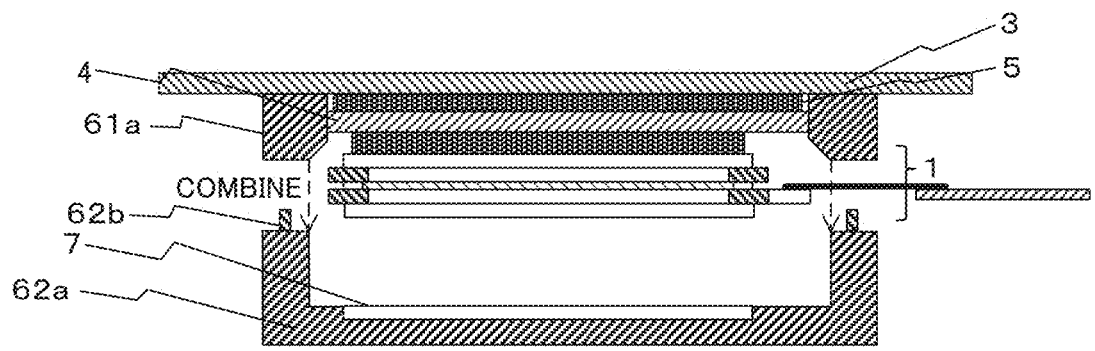
Figure 18B:
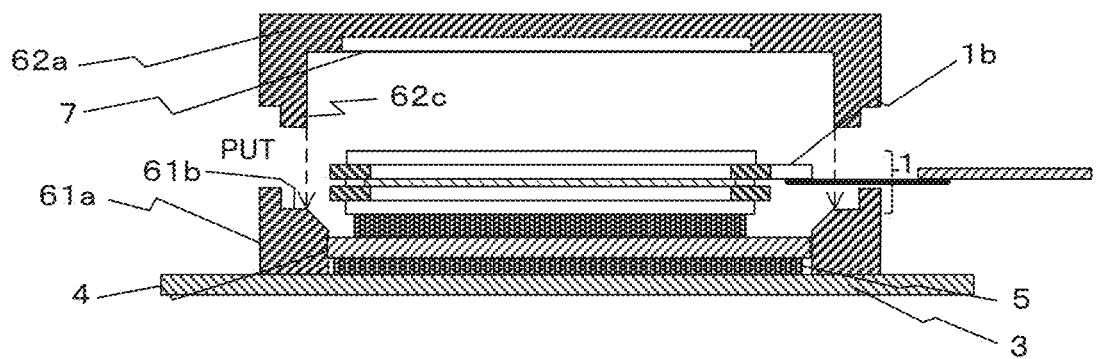

As a method of incorporating the liquid crystal panel 1 into the backlight chassis 6, among the methods illustrated in FIGS. 17C and 17D and the methods illustrated in FIGS. 18A and 18B, it is preferable to use the methods illustrated in FIGS. 18A and 18B in order to prevent the display unevenness of the liquid crystal panel 1 due to the warpage or distortion of the front plate 3 or the liquid crystal panel 1. In addition, it is preferable that a structure for connecting the upper chassis 61*a* and the lower chassis 62*a* be a connection structure using the guide pin 62*b* illustrated in FIG. 17D or a fitting structure between the convex portion 62*c* and the concave portion 61*b* illustrated in FIG. 18B, in order to improve the accuracy of assembly.

Figure 18C:
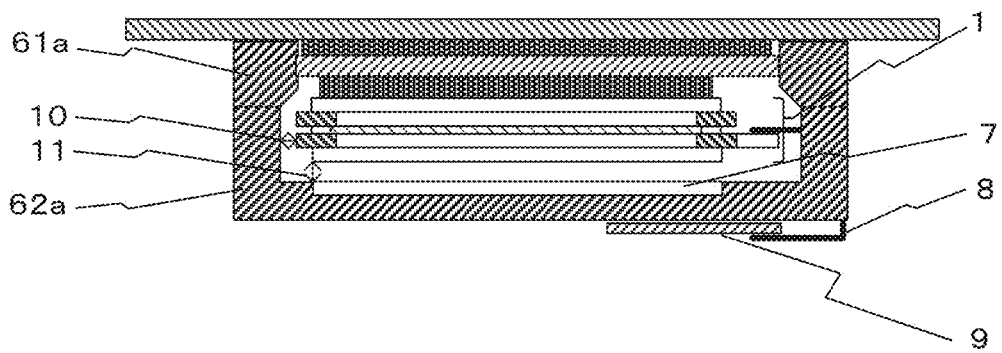

Then, as illustrated in FIG. 18C, a circuit board 9 is fixed to the rear surface of the backlight chassis 6 and a protective plate which covers the circuit board 9 and the FPC 8 is attached. A method which draws the FPC 8 to the outside of the backlight chassis 6 and fixes the circuit board 9 is the same as that in Embodiment 1.

Next, another method of manufacturing the liquid crystal display device according to Embodiment 2 will be described. FIGS. 19A to 20D are diagrams schematically illustrating another example of the flow of a process for manufacturing the liquid crystal display device according to Embodiment 2. FIG. 21 is a cross-sectional view illustrating a liquid crystal display device manufactured by the flow of the process illustrated in FIGS. 19A to 20D. Hereinafter, the liquid crystal display device having a structure in which the external dimensions of the intermediate member 4 are substantially equal to the external dimensions of the liquid crystal panel 1 and the backlight chassis 6 is divided into an upper chassis 65*a* and a lower chassis 65*b*, will be described. In addition, a method of manufacturing the liquid crystal display device using an intermediate member positioning member 70 will be described.

Figure 19A:
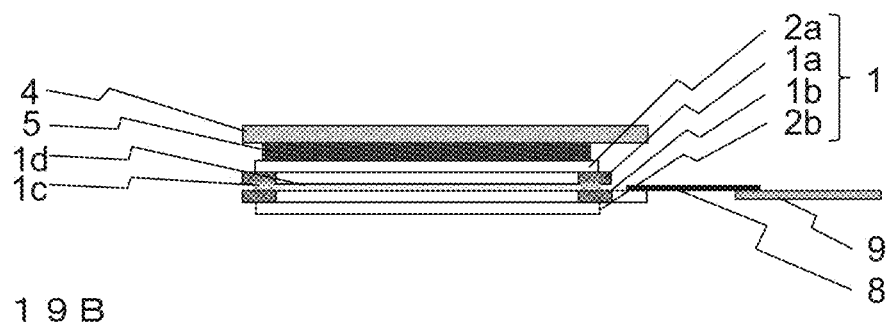
FIGS. 19A to 19D are diagrams schematically illustrating another example of the flow of the process for manufacturing the liquid crystal display device according to Embodiment 2.

First, as illustrated in FIG. 19A, the liquid crystal panel 1 and the intermediate member 4 are bonded to each other by the transparent adhesive 5. A method of bonding the liquid crystal panel 1 and the intermediate member 4 is the same as that in Embodiment 1.

Figure 19B:
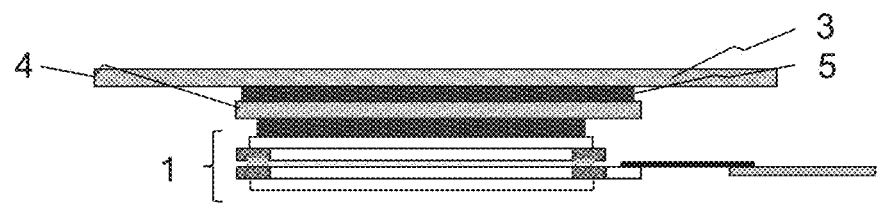

Then, as illustrated in FIG. 19B, the intermediate member 4 to which the liquid crystal panel 1 has been bonded and the front plate 3 are bonded to each other by the transparent adhesive 5. A method of bonding the intermediate member 4 and the front plate 3 is the same as that in Embodiment 1.

Figure 19C:
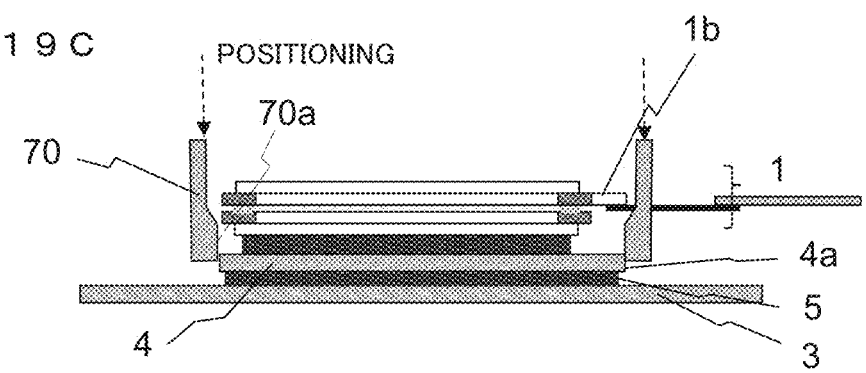

FIGS. 19C to 20C illustrate a method which incorporates the liquid crystal panel 1 into the upper chassis 65*a* and the lower chassis 65*b*. First, as illustrated in FIG. 19C, the intermediate member positioning member 70 is fitted while being positioned by an inner side surface 70*a* of the intermediate member positioning member 70 and the side surface 4*a* of the intermediate member 4, as represented by an arrow.

Figure 19D:
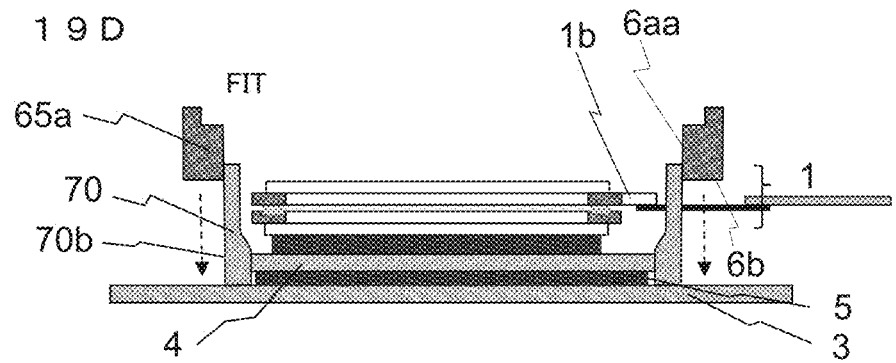

Then, as illustrated in FIG. 19D, the upper chassis 65*a* with the opening edge 6*b* down, is dropped (fitted) along the intermediate member positioning member 70 of a state of fitting while being positioned by the outer side surface 70*b* of the intermediate member positioning member 70 and the inner side surface 6*aa* of the upper chassis 65*a*, as represented by an arrow. In this case, the upper chassis 65*a* is dropped until the opening edge 6*b* of the upper chassis 65*a* comes into contact with the rear surface (upper surface) of the front plate 3. In this way, positioning is performed in the vertical direction by the rear surface of the front plate 3 and the opening edge 6*b* of the upper chassis 65*a*, and the upper chassis 65*a* is fixed to the front plate 3.

Figure 20A:
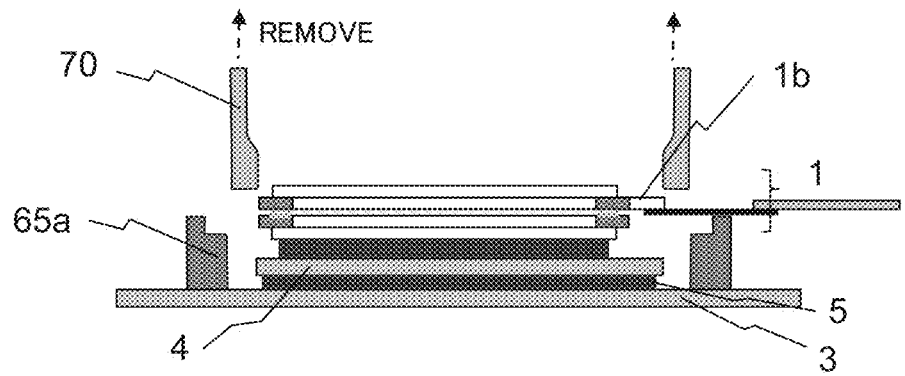
FIGS. 20A to 20D are diagrams schematically illustrating another example of the flow of the process for manufacturing the liquid crystal display device according to Embodiment 2.
Figure 20B:
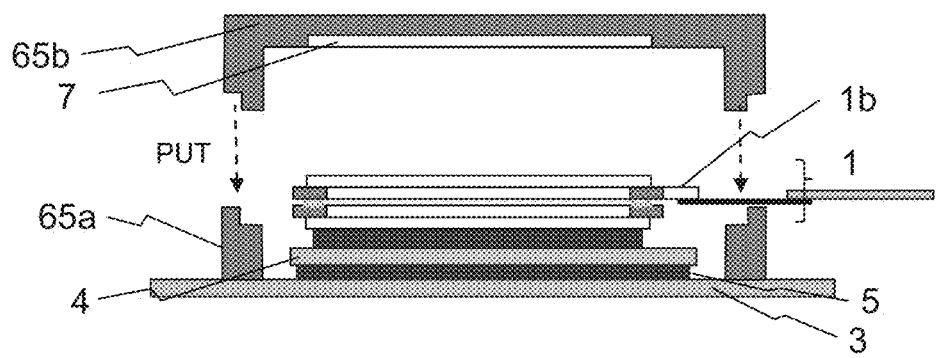
Figure 20C:
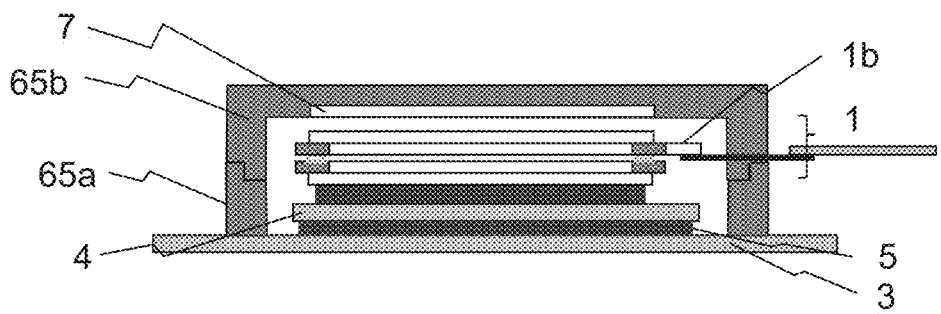
Figure 21:
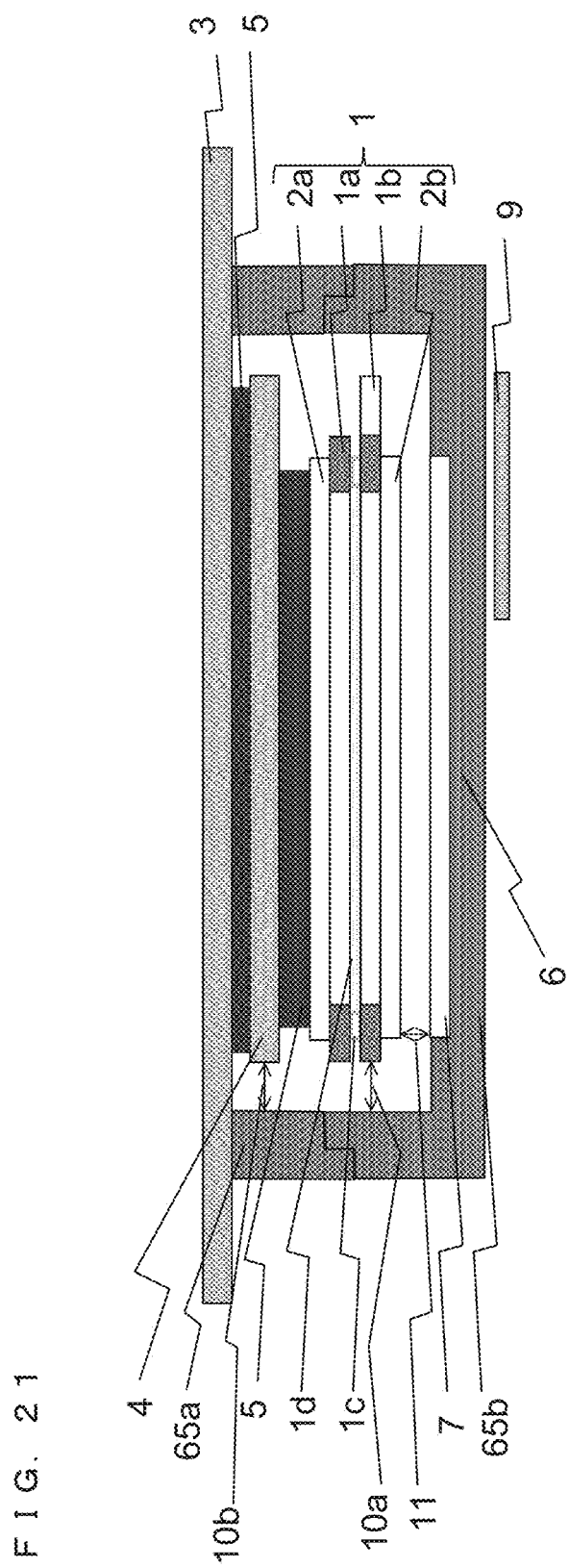
FIG. 21 is a cross-sectional view illustrating a liquid crystal display device manufactured by the flow of the process illustrated in FIGS. 19A to 20D.

Then, as illustrated in FIG. 20A, the intermediate member positioning member 70 is removed from the intermediate member 4. Then, as illustrated in FIG. 20B, the lower chassis 65*b* is combined to the upper chassis 65*a* while being positioned, as represented by an arrow. A method of fixing the lower chassis 65*b* to the upper chassis 65*a* is not particularly limited. For example, the upper chassis 65*a* and the lower chassis 65*b* may be fixed by an adhesive, a double-sided tape, or a screw. It is preferable to fix using a screw in order to facilitate the replacement and maintenance of parts. FIG. 20C illustrates a state where the upper chassis 65*a* is combined to the lower chassis 65*b*.

Figure 20D:
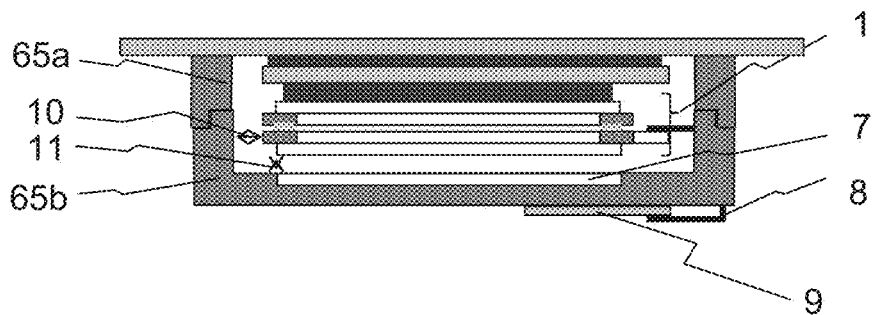

Then, as illustrated in FIG. 20D, a circuit board 9 is fixed to the rear surface of the backlight chassis 6 and a protective plate which covers the circuit board 9 and the FPC 8 is attached. A method which draws the FPC 8 to the outside of the backlight chassis 6 and fixes the circuit board 9 is the same as that in Embodiment 1.

As described above, in the present Embodiment, the intermediate member 4 and the backlight chassis 6 (upper chassis 65a) are positioned in the horizontal direction using the intermediate member positioning member 70. Since it is necessary to remove the intermediate member positioning member 70, as illustrated in FIG. 20A, the external dimensions of the liquid crystal panel 1 need to be equal to or smaller than the external dimensions of intermediate member 4. Therefore, after assembling the liquid crystal display device, the gap 10b between the intermediate member 4 and the upper chassis 65a is not more than the gap 10a between the liquid crystal panel 1 and the lower chassis 65b.

Figure 22:
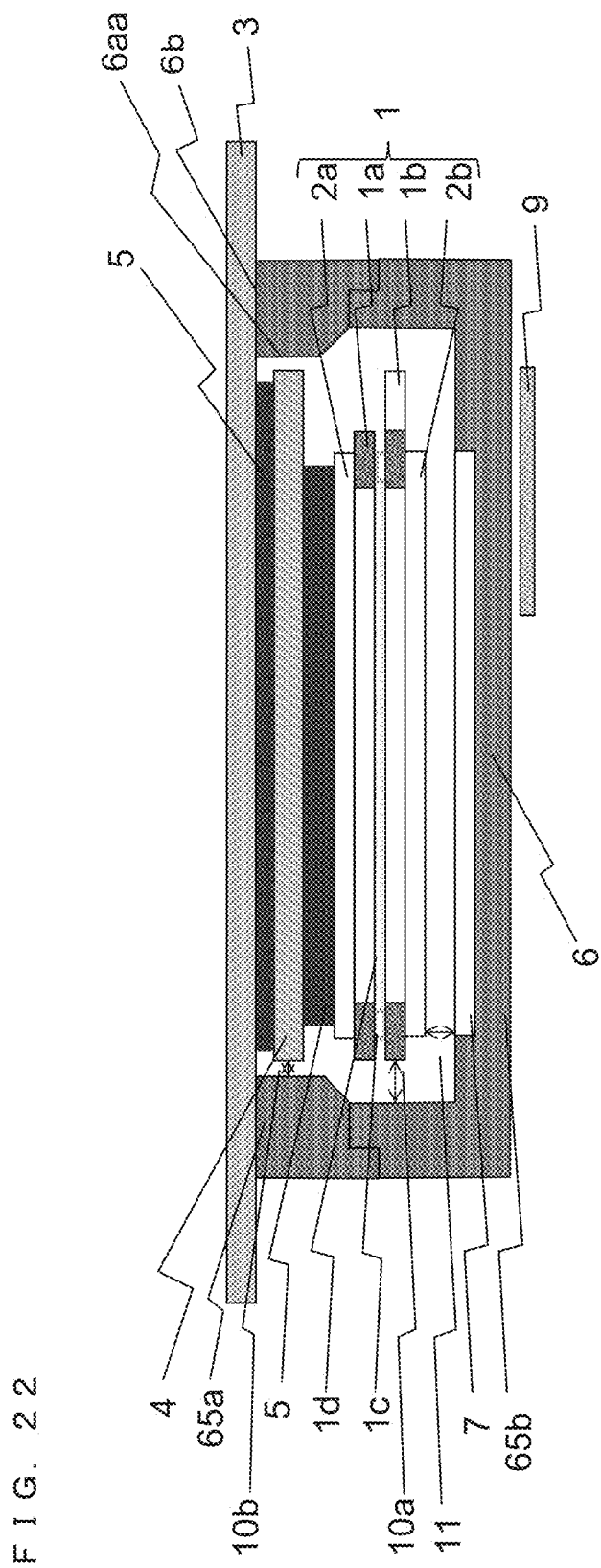
FIG. 22 is a cross-sectional view illustrating another modification example of the liquid crystal display device according to Embodiment 2.

FIG. 22 illustrates another modification of the liquid crystal display device having a structure in which the external dimensions of the intermediate member 4 are substantially equal to the external dimensions of the liquid crystal panel 1 and the backlight chassis 6 is divided into the upper chassis 65a and the lower chassis 65b, the liquid crystal display device manufactured using the intermediate member positioning member 70. In the present modification, the upper chassis 65a has a width different from a width of the lower chassis 65b (the width of the upper chassis 65a is wider than the width of the lower chassis 65b in FIG. 22). Therefore, a gap 10b between the upper chassis 65a and the intermediate member 4 is smaller than the gap 10a between the liquid crystal panel 1 and the lower chassis 65b. As a result, it is possible to prevent the light by the backlight 7 from being seen through the gap 10b when the liquid crystal panel 1 operates.

Figure 27:
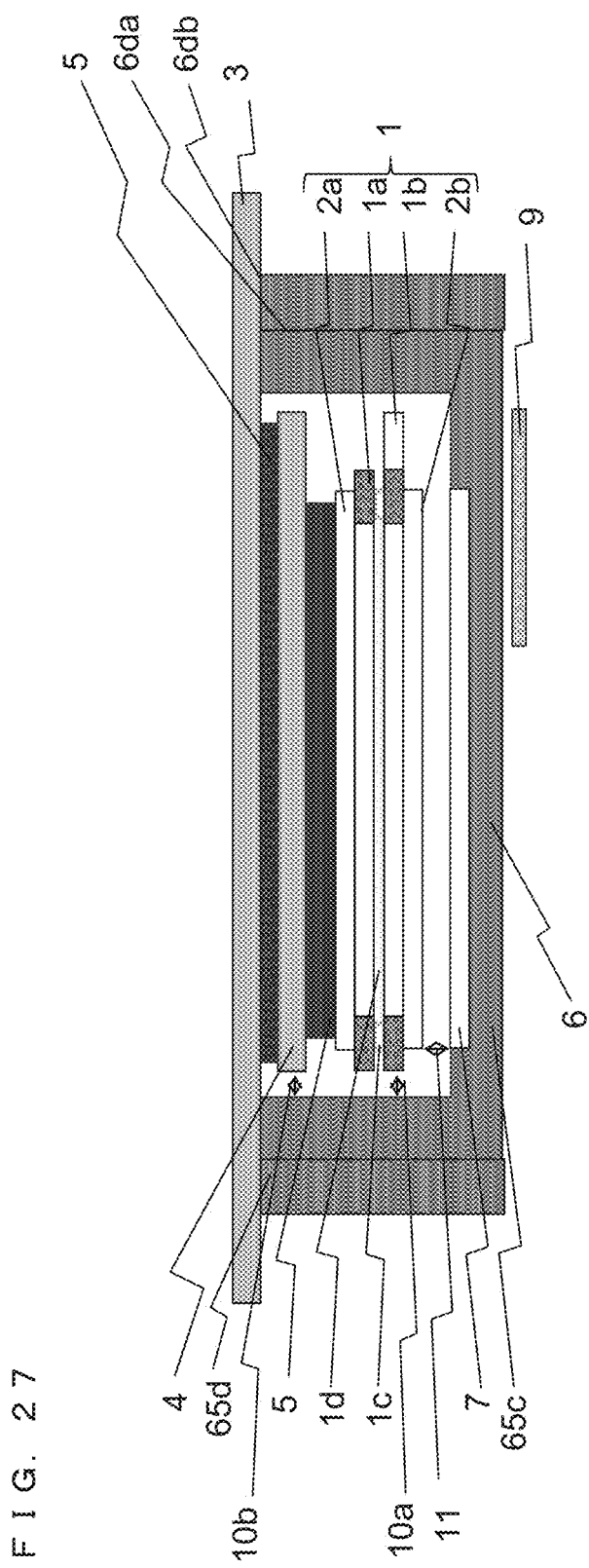
FIG. 27 is a cross-sectional view illustrating a liquid crystal display device manufactured by the flow of the process illustrated in FIGS. 23A to 24D.
Figure 28:
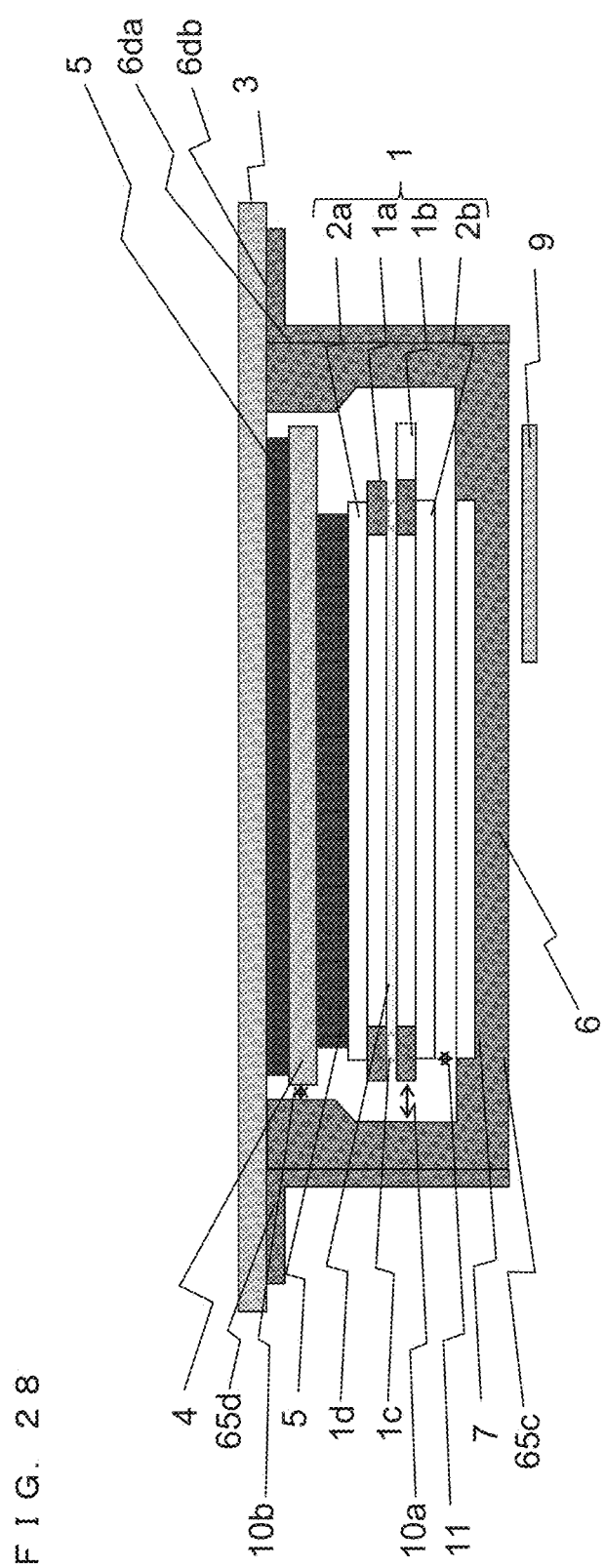
FIG. 28 is a cross-sectional view illustrating a liquid crystal display device manufactured by the flow of the process illustrated in FIGS. 25A to 26C.

Next, another method of manufacturing the liquid crystal display device according to Embodiment 2 will be described. FIGS. 23A to 26C are diagrams schematically illustrating another example of the flow of a process for manufacturing the liquid crystal display device according to Embodiment 2. FIG. 27 is a cross-sectional view illustrating a liquid crystal display device manufactured by the flow of the process illustrated in FIGS. 23A to 24D. FIG. 28 is a cross-sectional view illustrating a liquid crystal display device manufactured by the flow of the process illustrated in FIGS. 25A to 26C. Hereinafter, the liquid crystal display device having a structure in which the external dimensions of the intermediate member 4 are substantially equal to the external dimensions of the liquid crystal panel 1 and the backlight chassis 6 is divided into an inner chassis 65c and an outer chassis 65d, will be described. In addition, a method of manufacturing the liquid crystal display device using an intermediate member positioning member 70 will be described.

Figure 23A:
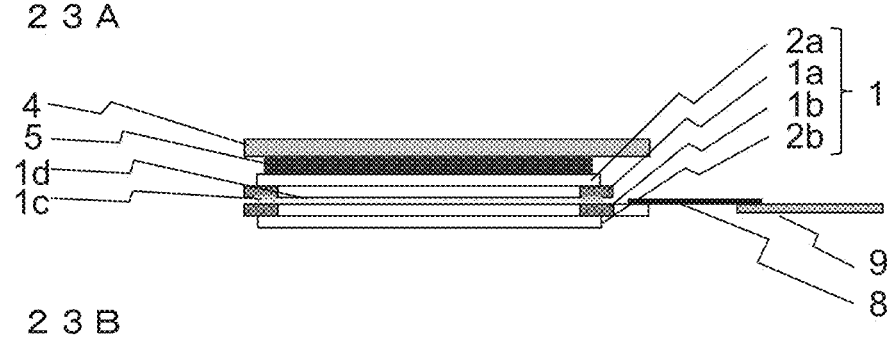
FIGS. 23A to 23D are diagrams schematically illustrating another example of the flow of the process for manufacturing the liquid crystal display device according to Embodiment 2.

First, as illustrated in FIG. 23A, the liquid crystal panel 1 and the intermediate member 4 are bonded to each other by the transparent adhesive 5. A method of bonding the liquid crystal panel 1 and the intermediate member 4 is the same as that in Embodiment 1.

Figure 23B:
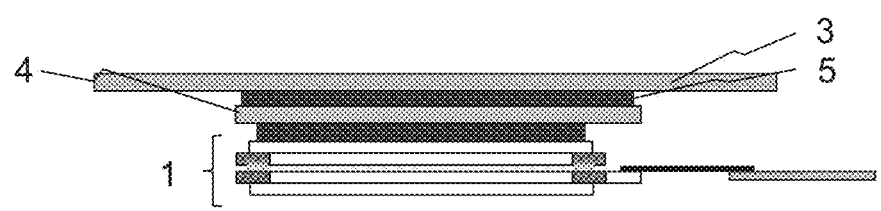

Then, as illustrated in FIG. 23B, the intermediate member 4 to which the liquid crystal panel 1 has been bonded and the front plate 3 are bonded to each other by the transparent adhesive 5. A method of bonding the intermediate member 4 and the front plate 3 is the same as that in Embodiment 1.

Figure 23C:
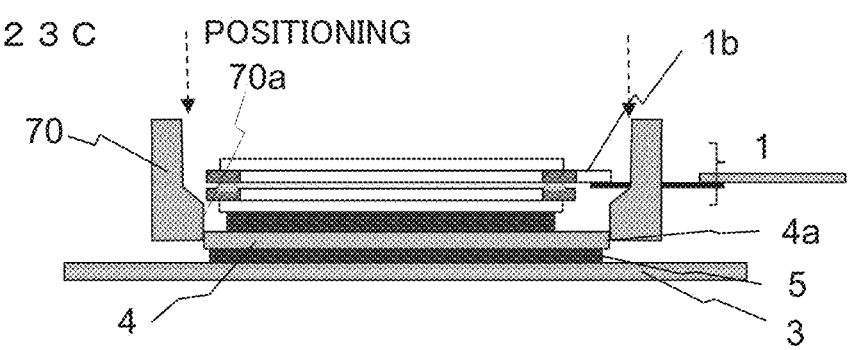

FIGS. 23C to 24C illustrate a method which incorporates the liquid crystal panel 1 into the inner chassis 65c and the outer chassis 65d. First, as illustrated in FIG. 23C, the intermediate member positioning member 70 is fitted while being positioned by an inner side surface 70a of the intermediate member positioning member 70 and the side surface 4a of the intermediate member 4, as represented by an arrow.

Figure 23D:
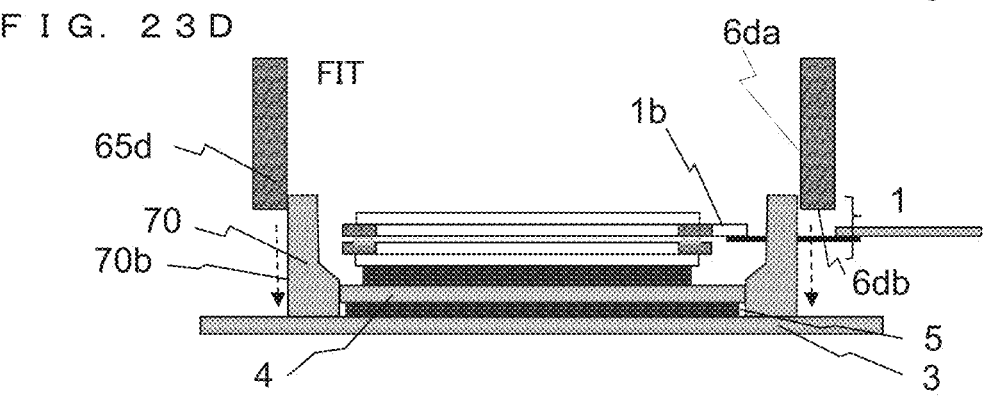

Then, as illustrated in FIG. 23D, the outer chassis 65d with the opening edge 6db down, is dropped (fitted) along the intermediate member positioning member 70 of a state of fitting while being positioned by the outer side surface 70b of the intermediate member positioning member 70 and the inner side surface 6da of the outer chassis 65d, as represented by an arrow. In this case, the outer chassis 65d is dropped until the opening edge 6db of the outer chassis 65d comes into contact with the rear surface (upper surface) of the front plate 3. In this way, positioning is performed in the vertical direction by the rear surface of the front plate 3 and the opening edge 6db of the outer chassis 65d, and the outer chassis 65d is fixed to the front plate 3.

Figure 24A:
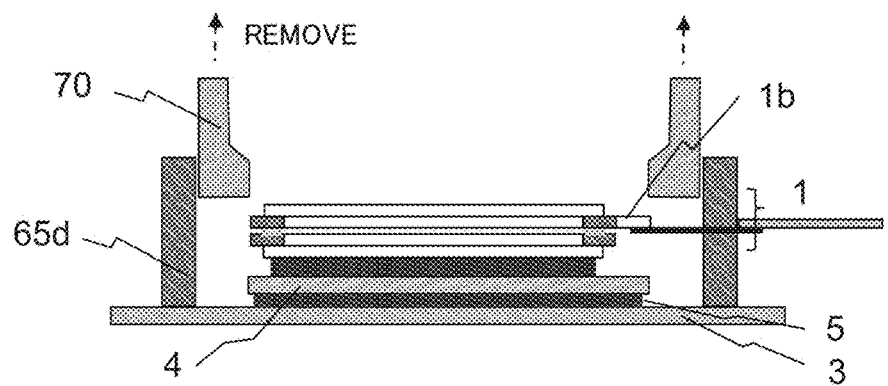
FIGS. 24A to 24D are diagrams schematically illustrating another example of the flow of the process for manufacturing the liquid crystal display device according to Embodiment 2.
Figure 24B:
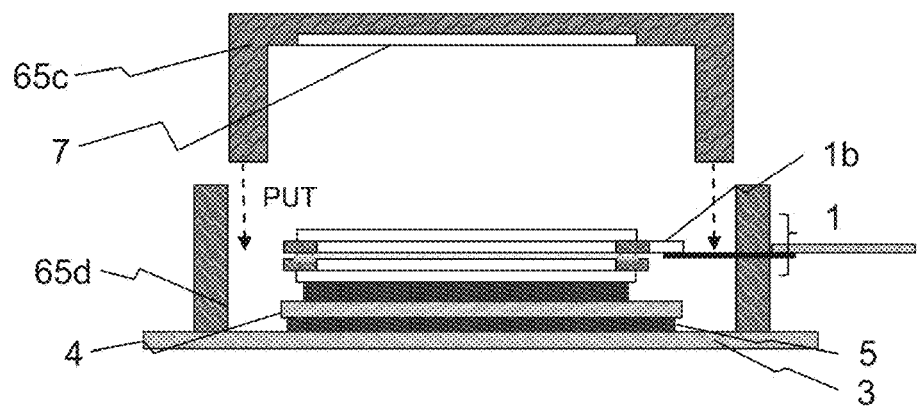
Figure 24C:
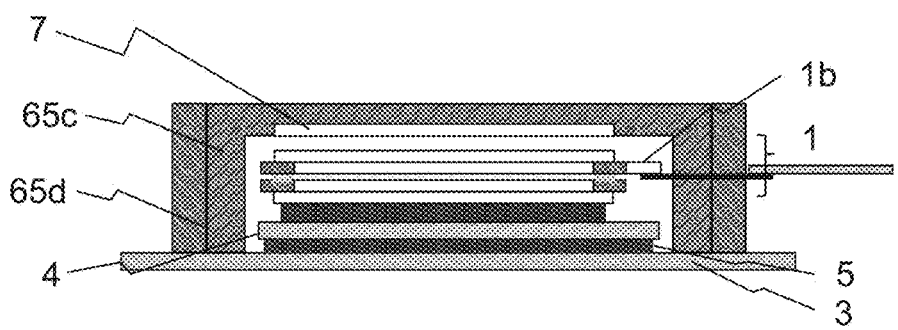

Then, as illustrated in FIG. 24A, the intermediate member positioning member 70 is removed from the intermediate member 4. Then, as illustrated in FIG. 24B, the inner chassis 65c is combined to the outer chassis 65d while being positioned, as represented by an arrow. A method of fixing the inner chassis 65c to the outer chassis 65d is not particularly limited. For example, the outer chassis 65d and the inner chassis 65c may be fixed by an adhesive, a double-sided tape, or a screw. It is preferable to fix using a screw in order to facilitate the replacement and maintenance of parts. FIG. 24C illustrates a state where the inner chassis 65c is combined to the outer chassis 65d.

Figure 24D:
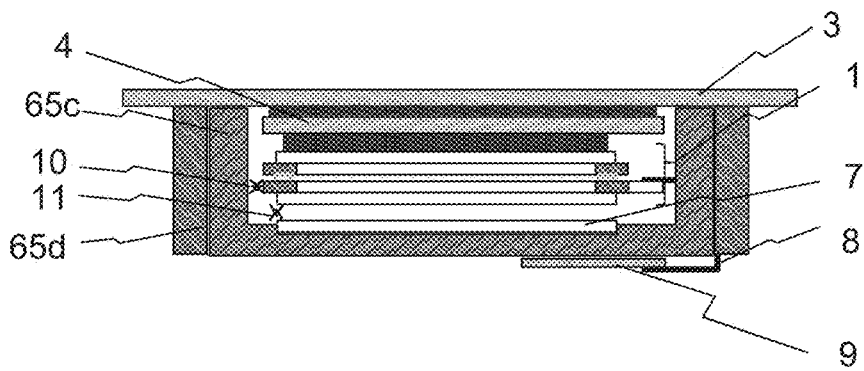
Figure 25A:
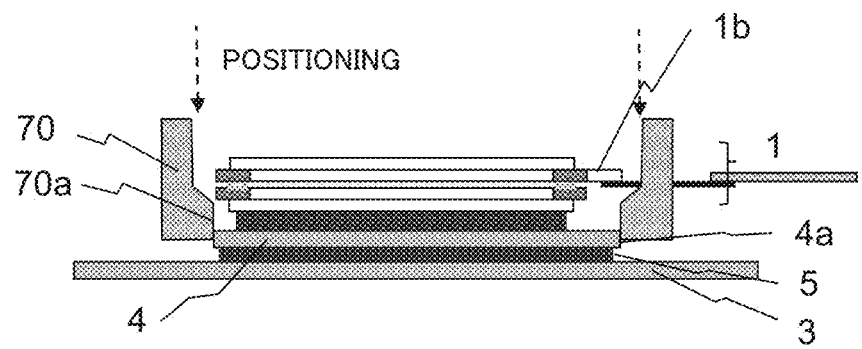
FIGS. 25A to 25C are diagrams schematically illustrating another example of the flow of the process for manufacturing the liquid crystal display device according to Embodiment 2.
Figure 25B:
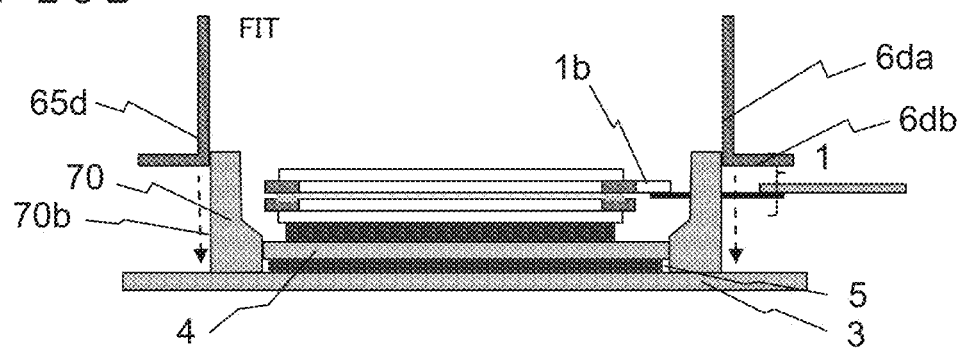
Figure 25C:
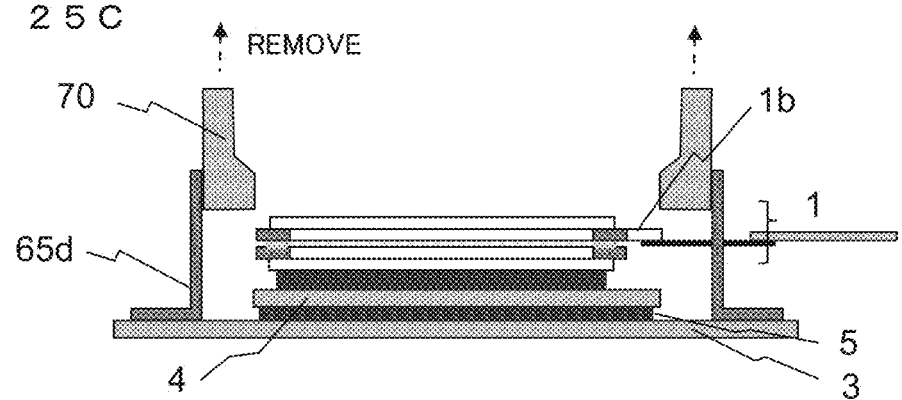
Figure 26A:
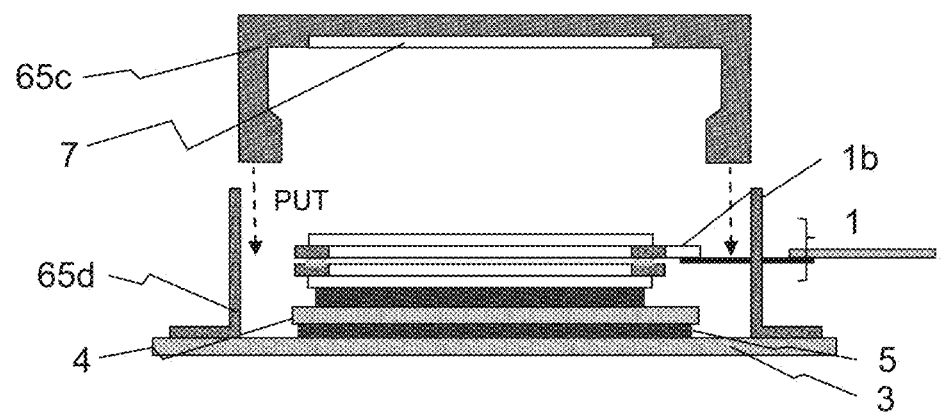
FIGS. 26A to 26C are diagrams schematically illustrating another example of the flow of the process for manufacturing the liquid crystal display device according to Embodiment 2.
Figure 26B:
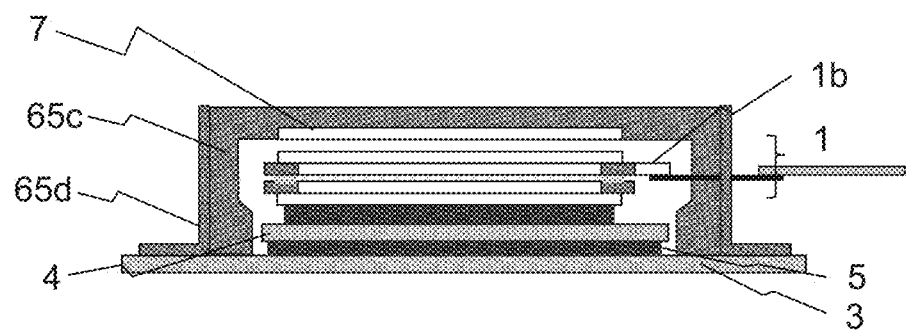
Figure 26C:
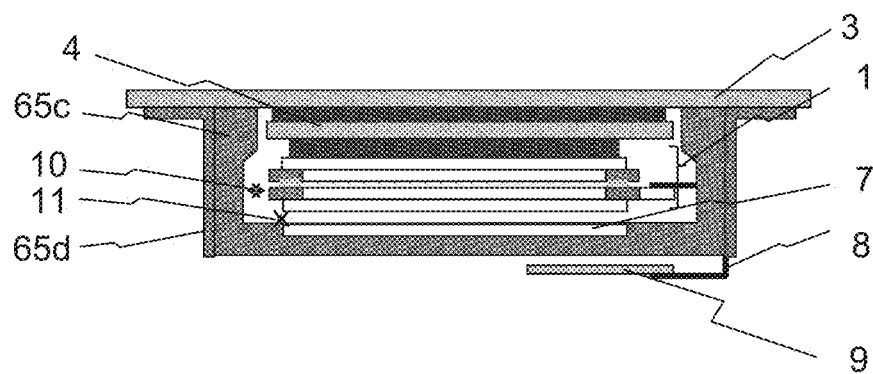

Then, as illustrated in FIG. 24D, a circuit board 9 is fixed to the rear surface of the backlight chassis 6 and a protective plate which covers the circuit board 9 and the FPC 8 is attached. A method which draws the FPC 8 to the outside of the backlight chassis 6 and fixes the circuit board 9 is the same as that in Embodiment 1.

FIGS. 25A to 26C illustrate a method which incorporates the liquid crystal panel 1 into the inner chassis 65c and the outer chassis 65d which has a different structure. FIGS. 25A to 26C correspond to FIGS. 23C to 24D, respectively, the method of incorporating is the same as FIGS. 23C to 24D and thus the description thereof will not be repeated.

As described above, in the present Embodiment, the intermediate member 4 and the backlight chassis 6 (outer chassis 65d) are positioned in the horizontal direction using the intermediate member positioning member 70. Since it is necessary to remove the intermediate member positioning member 70, as illustrated in FIG. 24A, the external dimensions of the liquid crystal panel 1 need to be equal to or smaller than the external dimensions of the intermediate member 4. Therefore, after assembling the liquid crystal display device, the gap 10b between the intermediate member 4 and the inner chassis 65c is not more than the gap 10a between the liquid crystal panel 1 and the inner chassis 65c.

FIG. 28 illustrates another modification of the liquid crystal display device having a structure in which the external dimensions of the intermediate member 4 are substantially equal to the external dimensions of the liquid crystal panel 1 and the backlight chassis 6 is divided into the inner chassis 65c and the outer chassis 65d, the liquid crystal display device manufactured using the intermediate member positioning member 70. In the present modification, since the outer chassis 65d has an L-shape, the inner chassis 65c is reinforced without widening the external dimensions of the backlight chassis 6 and the adhesion area between the front plate 3 and the outer chassis 65d is large, and adhesion strength is high. Further, a gap 10b between the inner chassis 65c and the intermediate member 4 is smaller than the gap 10a between the inner chassis 65c and the liquid crystal panel 1. As a result, it is possible to prevent the light by the backlight 7 from being seen through the gap 10b when the liquid crystal panel 1 operates.

Figure 29A:
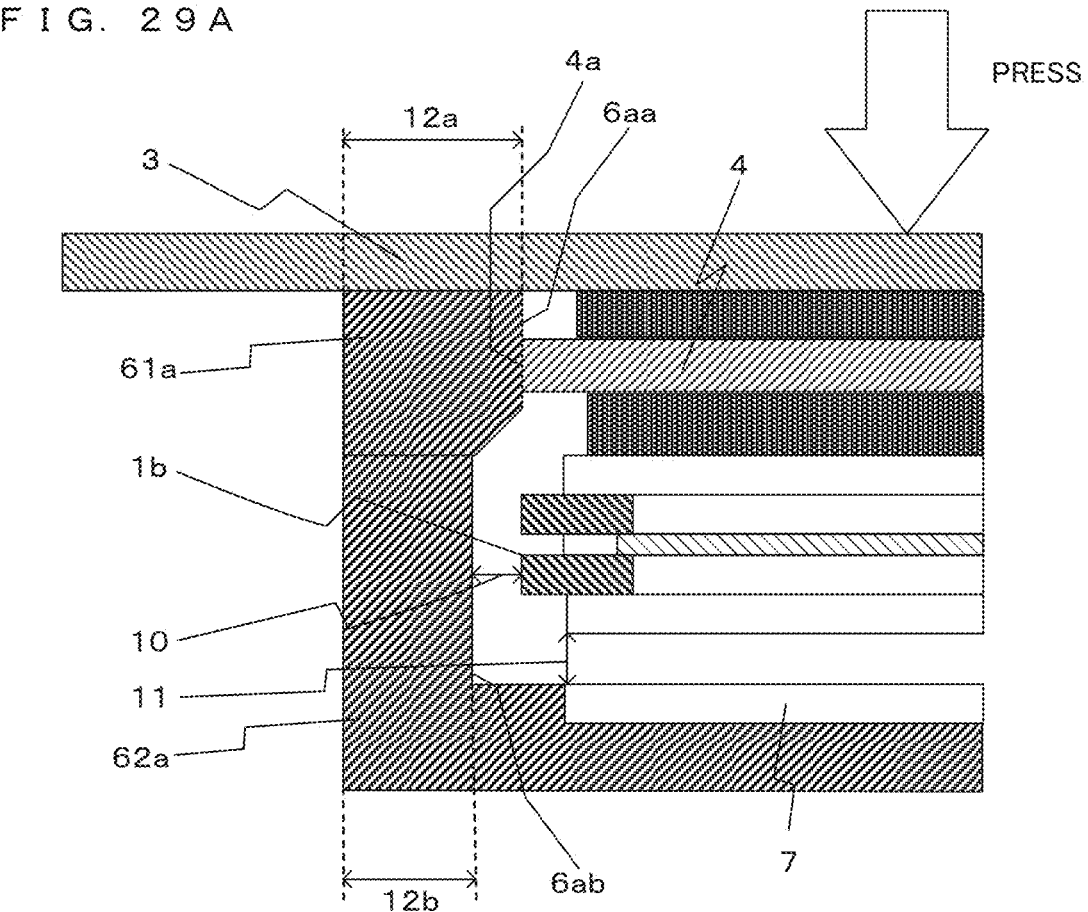
FIGS. 29A and 29B are cross-sectional views illustrating the comparison between the structure according to Embodiment 2 and a structure according to the related art.
Figure 29B:
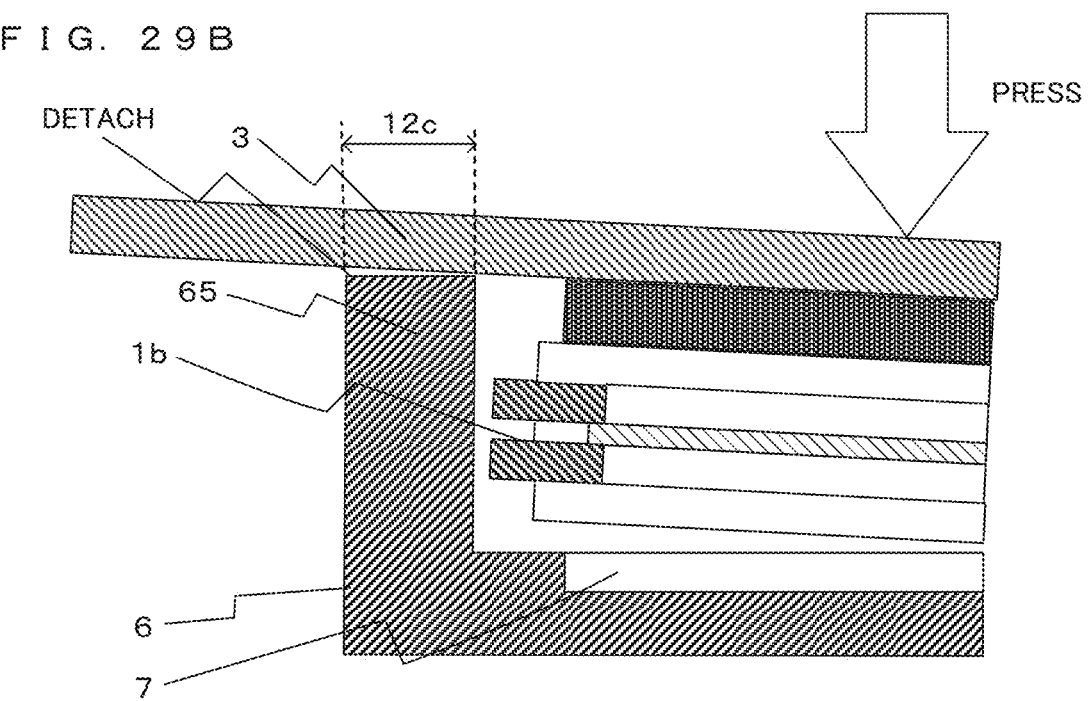

FIGS. 29A and 29B are cross-sectional views illustrating the comparison between the structure according to Embodiment 2 and a structure according to the related art. FIG. 29A illustrates a portion of the cross section of the liquid crystal display device according to Embodiment 2 and FIG. 29B illustrates a portion of the cross section of a liquid crystal display device having a structure without the intermediate member 4 according to the related art. When the external dimensions of the intermediate member 4 are substantially equal to the external dimensions of the liquid crystal panel 1, the inner side surface 6aa of the upper chassis 61a comes into contact with the side surface 4a of the intermediate member 4 to perform positioning. There is a gap 10 between the inner side surface 6ab of the lower chassis 62a and the side surface of the liquid crystal panel 1. Therefore, the upper chassis 61a is configured such that the internal dimensions thereof (opening dimensions) are smaller than those of the lower chassis 62a. In this structure, since the width (thickness) 12a of the upper chassis 61a is greater than the width (thickness) 12b of the lower chassis 62a, the adhesion width, that is, the adhesion area between the front plate 3 and the upper chassis 61a is large and adhesion strength is high. In addition, the rigidity of the upper chassis 61a increases. Therefore, it is possible to reduce the distortion of the backlight chassis 6 and to prevent the warpage due to pressure caused by, for example, a touch operation.

In the structure according to the related art in which the backlight chassis 6 and the front plate 3 are assembled without being positioned, when a backlight chassis 65 having substantially the same external dimensions as the backlight chassis 6 illustrated in FIG. 29A is used, the width 12c of the backlight chassis 65 is smaller than the width 12a of the upper chassis 61a according to Embodiment 2 in order to provide the gap 10 between the side surface of the liquid crystal panel 1 and the backlight chassis 65. Therefore, the adhesion width, that is, the adhesion area between the front plate 3 and the backlight chassis 65 is small and adhesion strength is low. As a result, in the backlight chassis 65 illustrated in FIG. 29B, the front plate 3 and the backlight chassis 65 are likely to be detached from each other due to pressure caused by, for example, a touch operation.

As described above, in the liquid crystal display device according to Embodiment 2, the adhesion strength between the backlight chassis 6 and the front plate 3 increases and it is possible to prevent the front plate 3 and the backlight chassis 6 from being detached from each other due to pressure. In addition, when the upper chassis 61a is distorted, the distortion is transmitted to the liquid crystal panel 1 through the front plate 3 and the intermediate member 4 and causes display unevenness. However, in the liquid crystal display device according to Embodiment 2, it is possible to reduce display unevenness caused by the distortion of the upper chassis 61a. In addition, in the liquid crystal display device according to Embodiment 2, the effect obtained by the incorporation of the intermediate member 4 is the same as that in Embodiment 1.

In Embodiments 1 and 2, the front plate 3 and the intermediate member 4 are bonded to each other by the transparent adhesive 5, and the intermediate member 4 and the liquid crystal panel 1 are bonded to each other by the transparent adhesive 5. However, the liquid crystal panel 1 and the intermediate member 4 may be bonded to each other through an air layer by forming an adhesive member such as a double-sided tape around a surface of the liquid crystal panel 1 which faces the intermediate member 4. Further, the intermediate member 4 and the front plate 3 may be bonded to each other through an air layer by forming an adhesive member such as a double-sided tape around a surface of the intermediate member 4 which faces the front plate 3.

Embodiment 3

Figure 30:
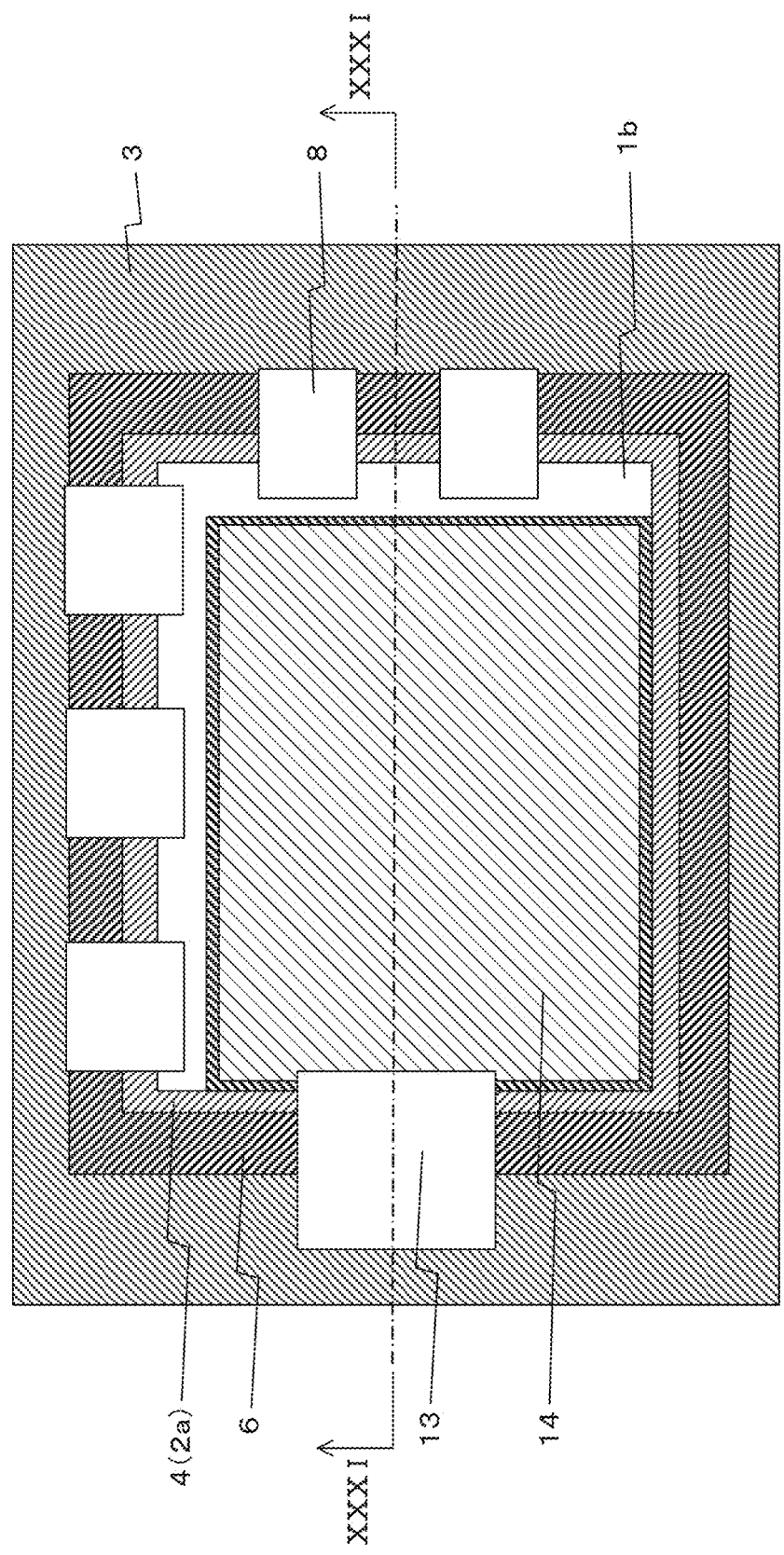
FIG. 30 is a plan view illustrating a liquid crystal display device according to Embodiment 3.
Figure 31:
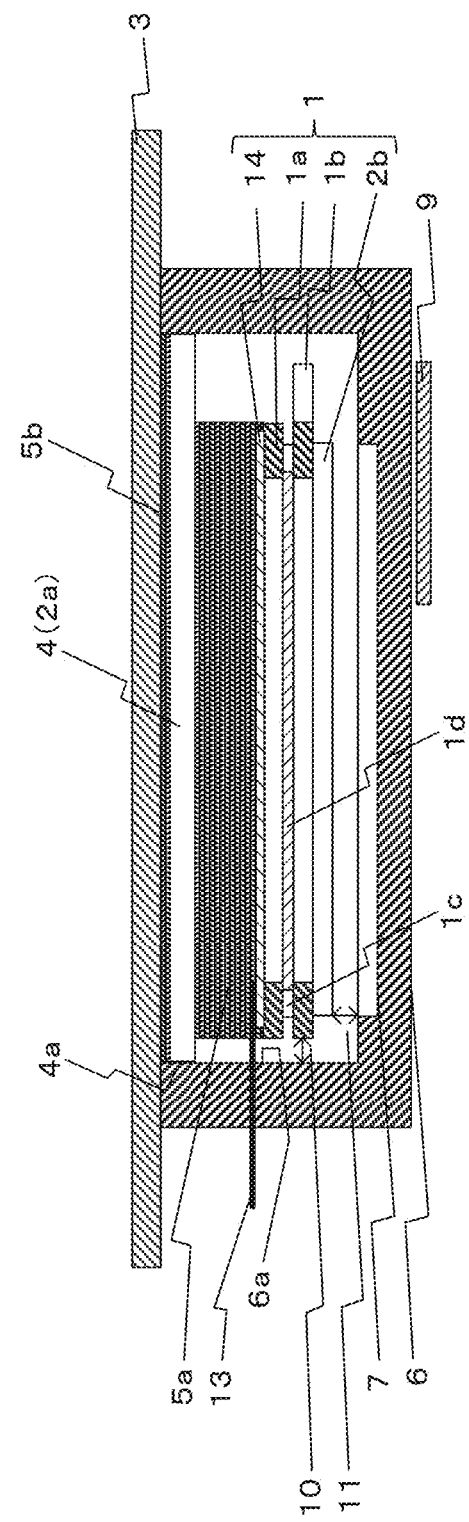
FIG. 31 is a cross-sectional view taken along the line XXXI-XXXI of FIG. 30.

The structure of Embodiment 3 of the invention will be described. FIG. 30 is a plan view illustrating a liquid crystal display device according to Embodiment 3. FIG. 31 is a cross-sectional view taken along the line XXXI-XXXI of FIG. 30. The liquid crystal display device according to Embodiment 3 differs from the liquid crystal panels 1 according to Embodiments 1 and 2 in that the polarizing plate/optical compensation film 2a bonded to the color filter substrate 1a is used as the intermediate member 4. Therefore, in Embodiment 3, the polarizing plate/optical compensation film 2a is not bonded to the color filter substrate 1a of the liquid crystal panel 1. Hereinafter, the polarizing plate/optical compensation film 2a used as the intermediate member 4 is simply referred to as an intermediate member 4.

The intermediate member 4 according to Embodiment 3 is bonded to the front plate 3 by a double-sided tape 5b. The external dimensions of the intermediate member 4 are smaller than those of the front plate 3 and are equal to or greater than those of the liquid crystal panel 1. In Embodiment 3, the inner side surface 6a of the backlight chassis 6 comes into contact with a portion of or the entire side surface 4a of the intermediate member 4. The polarizing plate/optical compensation film 2a used as the intermediate member 4 is made of a composite material such as triacetylcellulose (TAC) or polyvinyl chloride (PVC). The thickness of the intermediate member 4 and the shape of an outer peripheral portion of the lower surface of the intermediate member 4 are the same as those in Embodiment 1 and thus the description thereof will not be repeated.

The liquid crystal panel 1 according to Embodiment 3 includes a color filter substrate 1a, a TFT substrate 1b, a seal 1c, a liquid crystal agent 1d, and a polarizing plate/optical compensation film 2b which is bonded to the TFT substrate 1b. In addition, a circuit board 9 is connected to the liquid crystal panel 1 through an FPC 8. In Embodiment 3, the liquid crystal panel 1 has the function of a touch sensor and a touch sensor pattern 14 is formed on the upper surface of the color filter substrate 1a. A touch panel FPC 13 which outputs a touch detection signal from the touch sensor pattern 14 is connected to a detection circuit (not illustrated). A surface of the liquid crystal panel 1 on which the touch sensor pattern 14 is provided is bonded to the intermediate member 4 through a transparent adhesive 5a. The transparent adhesive 5a and the double-sided tape 5b are made of the same material as that in Embodiment 1. It is preferable that the transparent adhesive 5a and the double-sided tape 5b be made of a material which has a high resistance value and is impervious to water.

The transparent adhesive 5a which bonds the liquid crystal panel 1 and the intermediate member 4 is formed so as to cover the opposite surfaces of the liquid crystal panel 1 and the intermediate member 4. It is preferable that the transparent adhesive 5a cover the touch sensor pattern 14 and a connection portion between the touch sensor pattern 14 and the touch panel FPC 13. Preferably, the transparent adhesive 5a does not come into contact with an outer peripheral portion of the polarizing plate/optical compensation film 2a used as the intermediate member 4. A method which prevents the contact between the outer peripheral portion of the intermediate member 4 and the transparent adhesive 5a is not particularly limited. For example, the following methods may be used: a method which bonds a protective tape; a method which applies a coating agent onto the outer peripheral portion of the intermediate member 4;

and a method which applies a dam material to the inner periphery of the intermediate member 4 to prevent the contact. Among these methods, it is preferable to use the method which applies a coating agent, in terms of workability. FIG. 32 is a cross-sectional view illustrating a modification example of the intermediate member 4. FIG. 32 illustrates a structure in which a coating agent 15 is applied to the outer peripheral portion of the intermediate member 4. As such, when the coating agent 15 is applied to the outer peripheral portion of the intermediate member 4, it is possible to prevent the contact between the transparent adhesive 5a and the outer peripheral portion of the intermediate member 4.

In Embodiment 3, the structures of the front plate 3 and the backlight chassis 6 are the same as those in Embodiment 1 and thus the description thereof will not be repeated.

Figure 33:
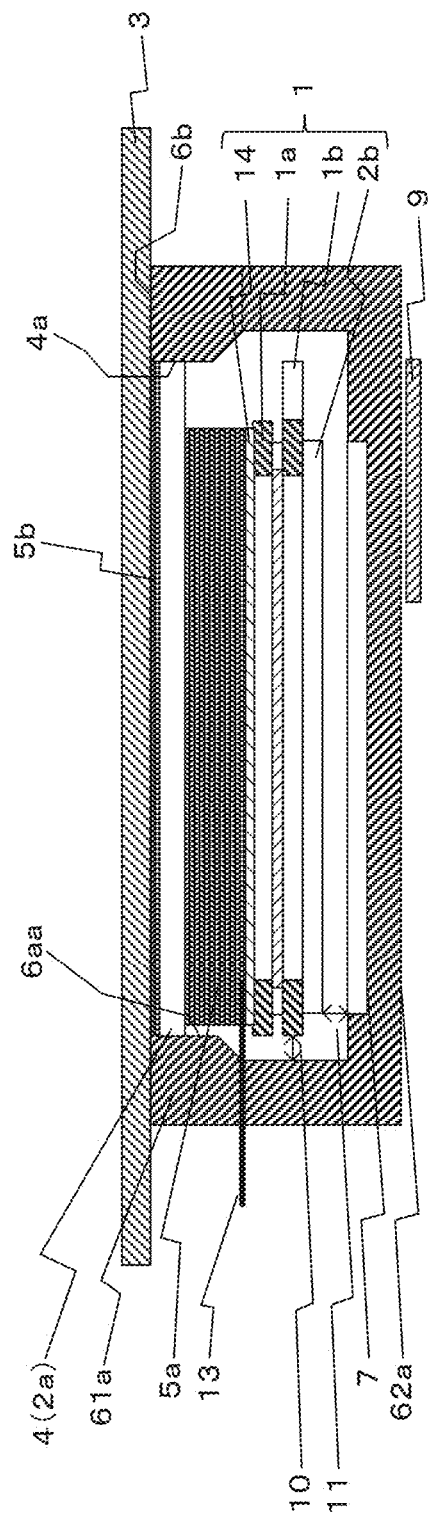
FIG. 33 is a cross-sectional view illustrating a modification example of a backlight chassis according to Embodiment 3.

In the liquid crystal display device according to Embodiment 3, as in Embodiment 2, the backlight chassis 6 may be divided into an upper chassis 61a and a lower chassis 62a and the external dimensions of the intermediate member 4 may be substantially equal to the external dimensions of the liquid crystal panel 1. FIG. 33 is a cross-sectional view illustrating a modification example of the backlight chassis 6 according to Embodiment 3. In a liquid crystal display device illustrated in FIG. 33, an inner side surface 6aa of the upper chassis 61a comes into contact with the side surface 4a of the intermediate member 4 to perform positioning in the horizontal direction and an opening edge 6b of the upper chassis 61a comes into contact with the front plate 3 to perform positioning in the vertical direction.

For example, when the front plate 3 and the intermediate member 4 are mode of plastic, the front plate 3 and the intermediate member 4 are likely to warp due to the difference between the thermal expansion coefficient of the front plate 3 and the intermediate member 4 and the thermal expansion coefficient of the color filter substrate 1a and the TFT substrate 1b which are made of glass in the liquid crystal panel 1. In this case, it is preferable that the intermediate member 4 and the liquid crystal panel 1 be bonded to each other by the double-sided tape 5b and the intermediate member 4 and the front plate 3 be bonded to each other by the transparent adhesive 5a.

Next, a method of manufacturing the liquid crystal display device according to Embodiment 3 will be described. FIGS. 34A to 34E are diagrams schematically illustrating an example of the flow of a process for manufacturing the liquid crystal display device according to Embodiment 3. Hereinafter, the liquid crystal display device having a structure in which the polarizing plate/optical compensation film 2a is used as the intermediate member 4 will be described.

Figure 34A:
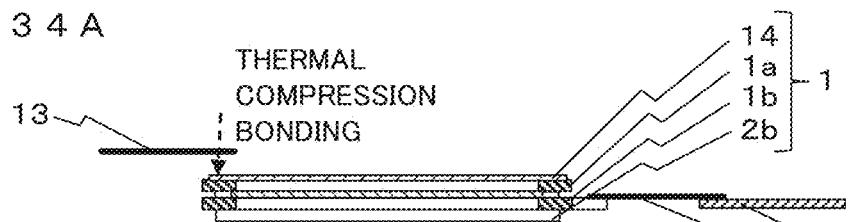
FIGS. 34A to 34E are diagrams schematically illustrating an example of the flow of a process for manufacturing the liquid crystal display device according to Embodiment 3.

First, as illustrated in FIG. 34A, the touch sensor pattern 14 is formed on the upper surface of the color filter substrate 1a of the liquid crystal panel 1 to which the polarizing plate/optical compensation film 2a has not been bonded and the touch panel FPC 13 is connected to the touch sensor pattern 14 on the upper surface of the color filter substrate 1a. A method of connecting the touch panel FPC 13 to the touch sensor pattern 14 on the color filter substrate 1a is not particularly limited. For example, the following methods may be used: a method which performs thermal compression bonding using an anisotropic conductive film (ACF); and a method which performs bonding using conductive paste. Among these methods, it is preferable to use the ACF in terms of the accuracy of connection or stability.

Figure 34B:
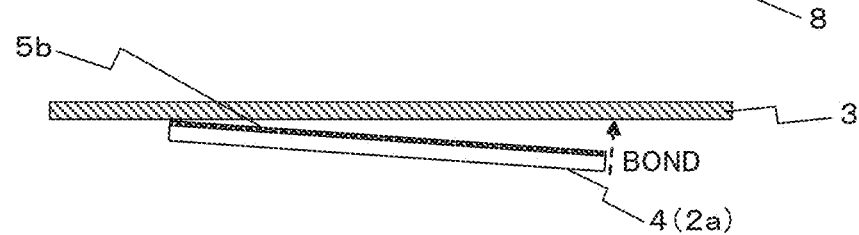

Then, as illustrated in FIG. 34B, the front plate 3 and the intermediate member 4 are bonded to each other by the double-sided tape 5b. Specifically, the double-sided tape 5b is provided on at least one of the front plate 3 and the intermediate member 4, and the front plate 3 and the intermediate member 4 are aligned and bonded by the double-sided tape 5b. It is preferable that the double-sided tape 5b be bonded to the polarizing plate/optical compensation film 2a which is the intermediate member 4. A roll-to-roll bonding process which bonds films can be performed. A method of bonding the double-sided tape 5b is not particularly limited. For example, the following methods may be used: a bonding method which is performed in an atmospheric pressure environment as a bonding environment; and a bonding method which is performed in a vacuum environment as the bonding environment. In addition, the following bonding methods may be used: a bonding method using a roller; and a bonding method using a parallel plate. Among these methods, it is preferable to use the method which performs bonding using a roller in the atmospheric pressure environment in order to reduce a bonding time during bonding. In addition, it is preferable to perform an autoclave treatment (a process which applies a pressure of about 0.3 MPa for about 30 minutes in a thermal environment of about 50 degrees) in order to reduce air bubbles during bonding. A method of aligning the front plate 3 and the intermediate member 4 is the same as that in Embodiment 1 and thus the description thereof will not be repeated.

Figure 34C:
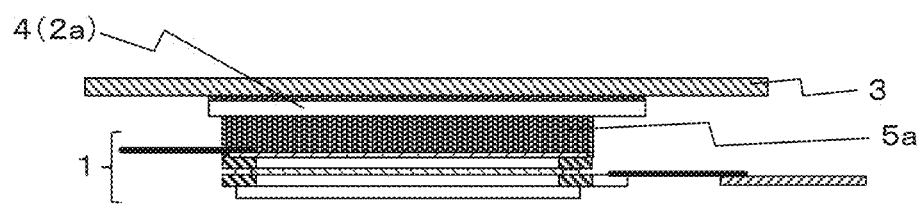

Then, as illustrated in FIG. 34C, the front plate 3 to which the intermediate member 4 has been bonded and the liquid crystal panel 1 are bonded to each other by the transparent adhesive 5a. Specifically, the transparent adhesive 5a is applied onto at least one of the intermediate member 4 bonded to the front plate 3 and the liquid crystal panel 1, and the liquid crystal panel 1 and the intermediate member 4 are aligned and bonded by the transparent adhesive 5a which has not been hardened. Then, the transparent adhesive 5a is hardened. In addition, when the intermediate member 4 is made of a resin material similarly to the polarizing plate/optical compensation film 2a, it is preferable that the thickness of the transparent adhesive 5a which bonds the intermediate member 4 and the liquid crystal panel 1 be greater than the thickness of the touch panel FPC 13 connected to the liquid crystal panel 1 (touch sensor pattern 14). In this case, the difference in level between the touch panel FPC 13 and the color filter substrate 1a is removed and the liquid crystal panel 1 does not warp. Therefore, it is possible to prevent the display unevenness of the liquid crystal panel 1.

Figure 34D:
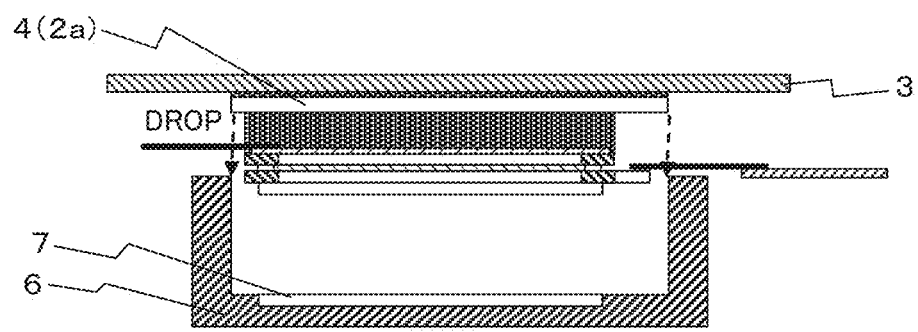
Figure 34E:
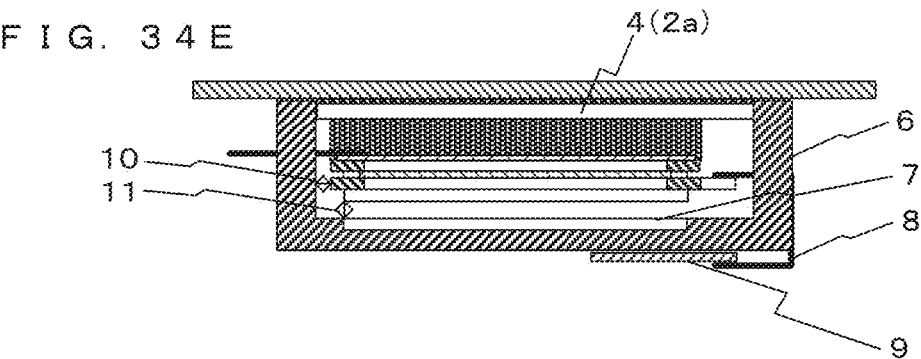

Then, as illustrated in FIG. 34D, the liquid crystal panel 1 to which the front plate 3 and the intermediate member 4 have been bonded is incorporated into the backlight chassis 6 and is then fixed thereto. A method of incorporating the liquid crystal panel 1 into the backlight chassis 6 and fixing the liquid crystal panel 1 is the same as that in Embodiment 1 and thus the description thereof will not be repeated. FIG. 34D illustrates the method illustrated in FIG. 8C in Embodiment 1. The liquid crystal panel 1 may be incorporated into the backlight chassis 6 by the method that drops the backlight chassis 6 from the upper side of the front plate 3 placed with the liquid crystal panel 1 up, as illustrated in FIG. 8D. Then, as illustrated in FIG. 34E, the circuit board 9 is fixed to the rear surface of the backlight chassis 6 and a protective plate which covers the circuit board 9 and the FPC 8 is attached. A method which draws the FPC 8 to the outside of the backlight chassis 6 and fixes the circuit board 9 is the same as that in Embodiment 1 and thus the description thereof will not be repeated.

Figure 35A:
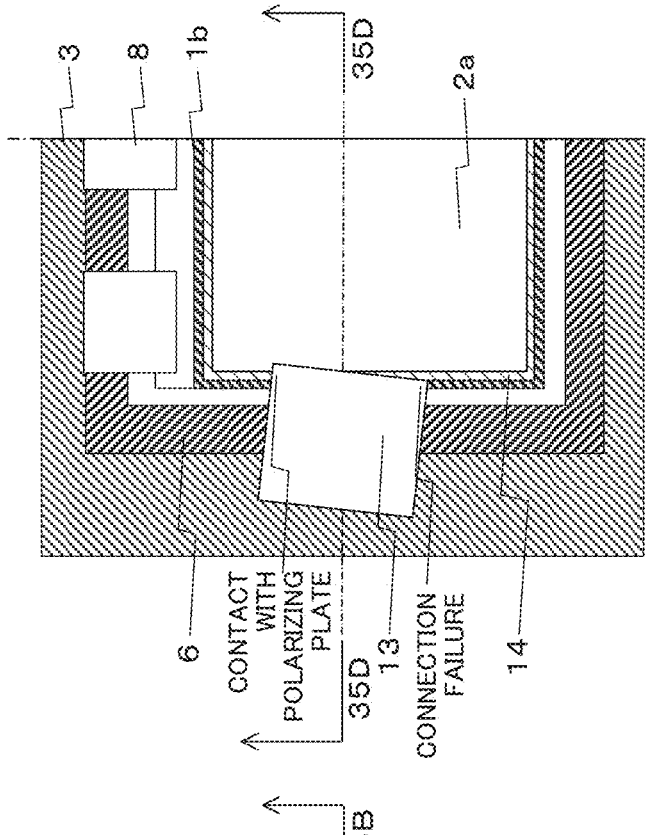
FIGS. 35A to 35D are diagrams schematically illustrating the comparison between the structure according to Embodiment 3 and a structure according to the related art.
Figure 35B:
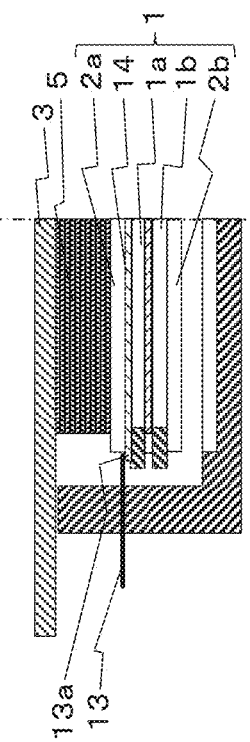
Figure 35C:
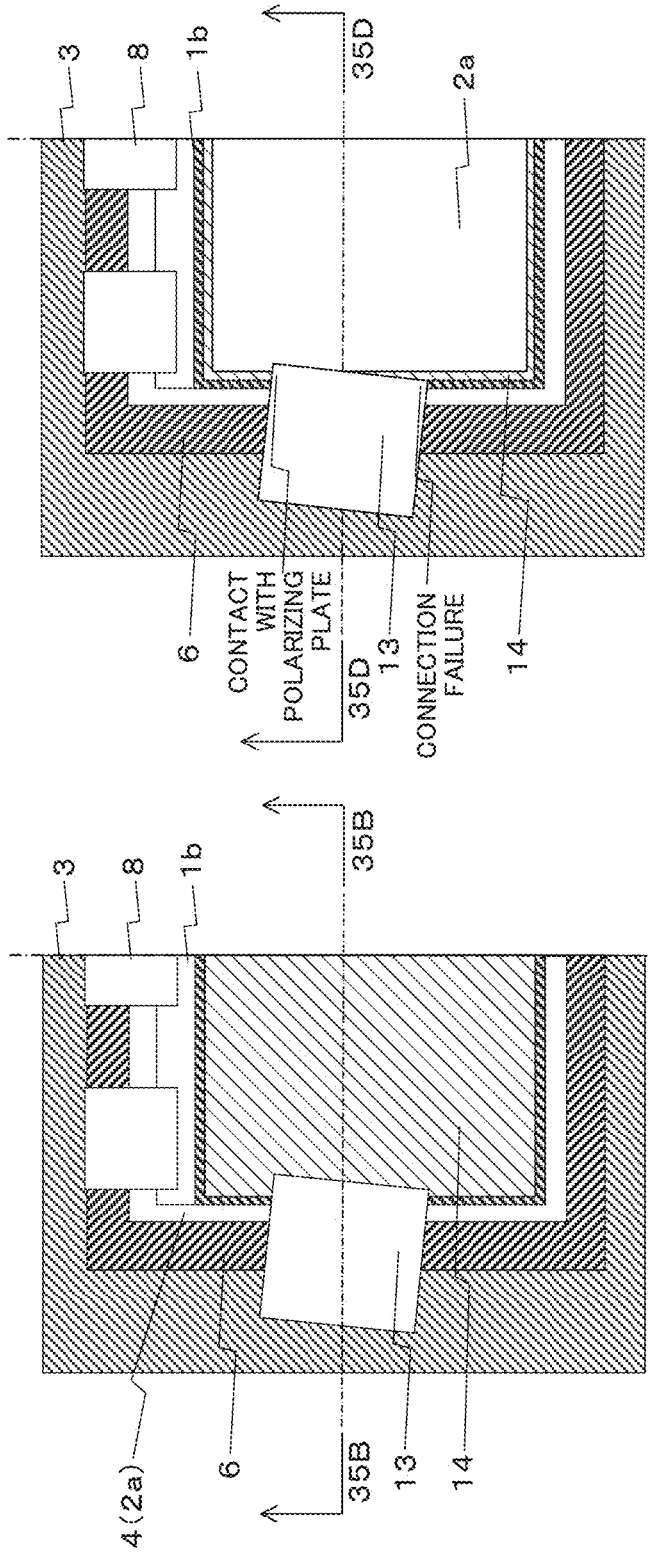
Figure 35D:
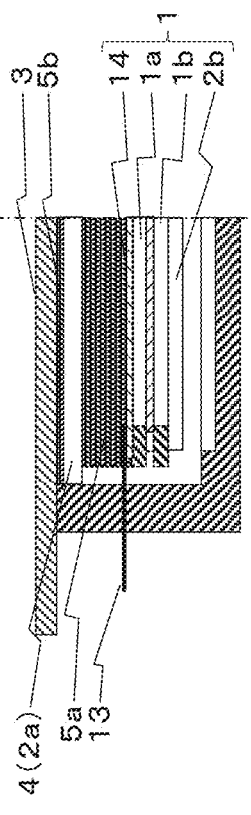

FIGS. 35A to 35D are diagrams schematically illustrating the comparison between the structure according to Embodiment 3 and the structure according to the related art. FIG. 35A illustrates a portion of the plan view of the liquid crystal display device according to Embodiment 3, and FIG. 35B illustrates a portion of the cross section taken along the line 35B-35B of FIG. 35A. FIG. 35C is illustrates a portion of the plan view of a liquid crystal display device having a structure without the intermediate member 4 according to the related art, and FIG. 35D illustrates a portion of the cross section taken along the line 35D-35D of FIG. 35C.

As in Embodiment 3, in a case in which the polarizing plate/optical compensation film 2a is used as the intermediate member 4, when the touch panel FPC 13 is thermally pressed against the touch sensor pattern 14 on the color filter substrate 1a using an ACF, it is possible to increase a pressure contact width since the polarizing plate/optical compensation film 2a is not provided on the color filter substrate 1a. Therefore, as illustrated in FIG. 35A, it is possible to reduce a connection failure due to positional deviation during compression bonding and to prevent the damage of the polarizing plate/optical compensation film 2a due to heat during thermal compression bonding.

In the structure illustrated in FIGS. 35C and 35D, when the touch panel FPC 13 is thermally pressed against the liquid crystal panel 1 to which the polarizing plate/optical compensation film 2a has been bonded using an ACF, it is necessary to increase the size of the color filter substrate 1a since a space 13a for a pressure contact between the touch panel FPC 13 and the touch sensor pattern 14 is provided in the outer periphery of the polarizing plate/optical compensation film 2a. When the size of the color filter substrate 1a does not increase, a connection failure, such as the deviation of a pressure contact position, is likely to occur since the space for a pressure contact between the touch panel FPC 13 and the touch sensor pattern 14 is narrow, as illustrated in FIG. 35C. In addition, since the touch panel FPC 13 and the polarizing plate/optical compensation film 2a are close to each other (the contact with a polarizing plate), the polarizing plate/optical compensation film 2a is likely to be damage by a fire during thermal compression bonding.

Figure 36A:
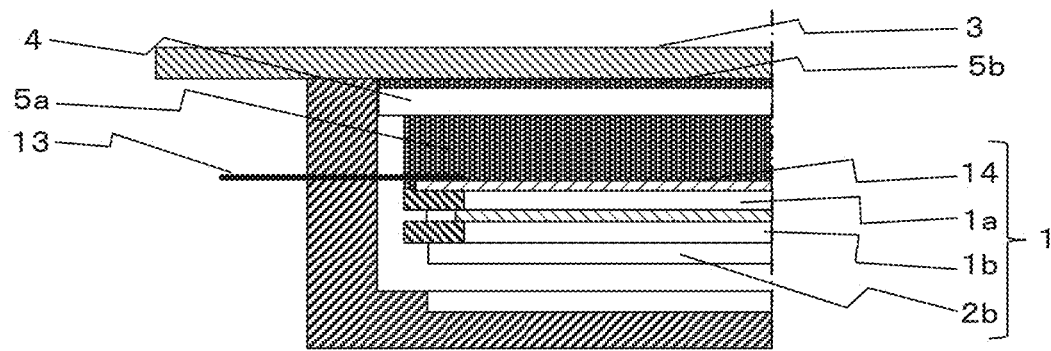
FIGS. 36A to 36C are diagrams schematically illustrating the comparison between the structure according to Embodiment 3 and a structure according to the related art.
Figure 36B:
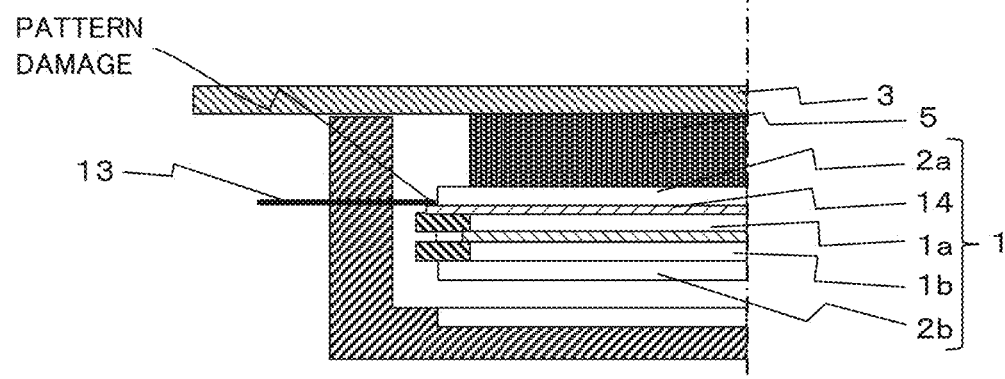
Figure 36C:
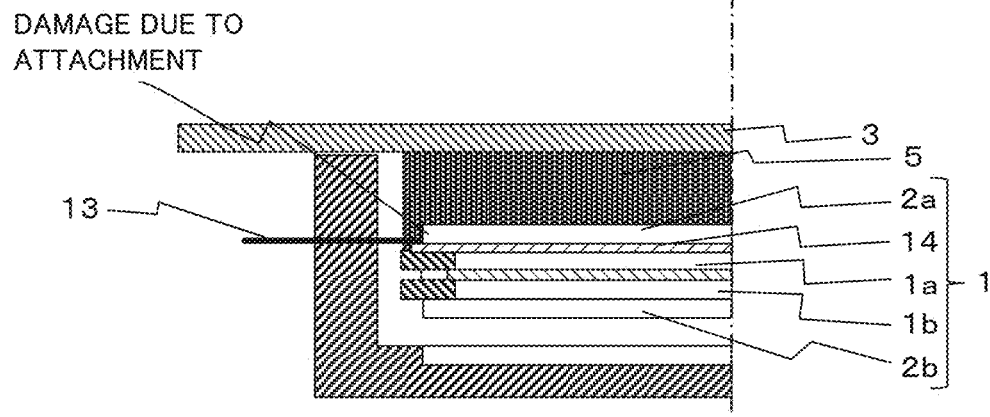

FIGS. 36A to 36C are diagrams schematically illustrating the comparison between the structure according to Embodiment 3 and a structure according to the related art. FIG. 36A illustrates a portion of the cross section of the liquid crystal display device according to Embodiment 3. FIGS. 36B and 36C illustrate a portion of the cross section of a liquid crystal display device having a structure without the intermediate member 4 according to the related art. In the liquid crystal display device according to Embodiment 3, the transparent adhesive 5a covers the touch sensor pattern 14 provided in the liquid crystal panel 1 to prevent the damage of the touch sensor pattern 14 or the corrosion of the surface of the touch sensor pattern 14. In addition, the transparent adhesive 5a covers a connection portion between the touch sensor pattern 14 and the touch panel FPC 13 to prevent the peeling-off of the connection portion and the corrosion of a wiring line in a pressure contact portion. Since the dimensions of the intermediate member 4 are greater than those of the liquid crystal panel 1, it is not necessary to apply the transparent adhesive 5a to the outer periphery of the intermediate member 4. Therefore, the transparent adhesive 5a does not come into contact with the outer periphery of the polarizing plate/optical compensation film 2a used as the intermediate member 4 and it is possible to prevent the occurrence of damage, such as a crack, in the polarizing plate/optical compensation film 2a due to, for example, a solvent component of the transparent adhesive 5a.

In contrast, in the structure according to the related art, as illustrated in FIG. 36B, the connection portion between the touch sensor pattern 14 and the touch panel FPC 13 is exposed.

Therefore, it is difficult to prevent the damage of the touch sensor pattern 14 (pattern damage) in the connection portion, the corrosion of the surface of the touch sensor pattern 14 in the connection portion, or the peeling-off of the connection portion. As illustrated in FIG. 36C, when the connection portion between the touch sensor pattern 14 and the touch panel FPC 13 is covered with the transparent adhesive 5, the transparent adhesive 5 is attached to the outer periphery of the polarizing plate/optical compensation film 2a. In this case, damage, such as a crack, occurs in the polarizing plate/optical compensation film 2a (damage, such as a crack, due to attachment).

As described above, in the liquid crystal display device according to Embodiment 3, it is possible to widen a pressure contact space where the touch panel FPC 13 is thermally pressed against the color filter substrate 1a using an ACF. Therefore, it is possible to prevent, for example, the deviation of a pressure contact position and to prevent the damage of the polarizing plate/optical compensation film 2a by a fire. In addition, since the touch sensor pattern 14 provided on one surface of the liquid crystal panel 1 is covered with the transparent adhesive 5a, it is possible to prevent the damage of the touch sensor pattern 14. Furthermore, a pressure contact portion of the touch panel FPC 13 with respect to the liquid crystal panel 1 is reinforced by the transparent adhesive 5a. Therefore, it is possible to prevent the touch panel FPC 13 from peeling off and to prevent, for example, the corrosion of a wiring line in the pressure contact portion. When there is no difference in level between the color filter substrate 1a and the touch panel FPC 13, it is possible to prevent the warpage of the liquid crystal panel 1 during the bonding between the liquid crystal panel 1 and the intermediate member 4. It is possible to prevent the occurrence of damage, such as a crack, in the polarizing plate/optical compensation film 2a, using the transparent adhesive 5a. In the liquid crystal display device according to Embodiment 3, the same effect as that in Embodiment 1 is obtained by the incorporation of the intermediate member 4.

Embodiment 4

Figure 37:
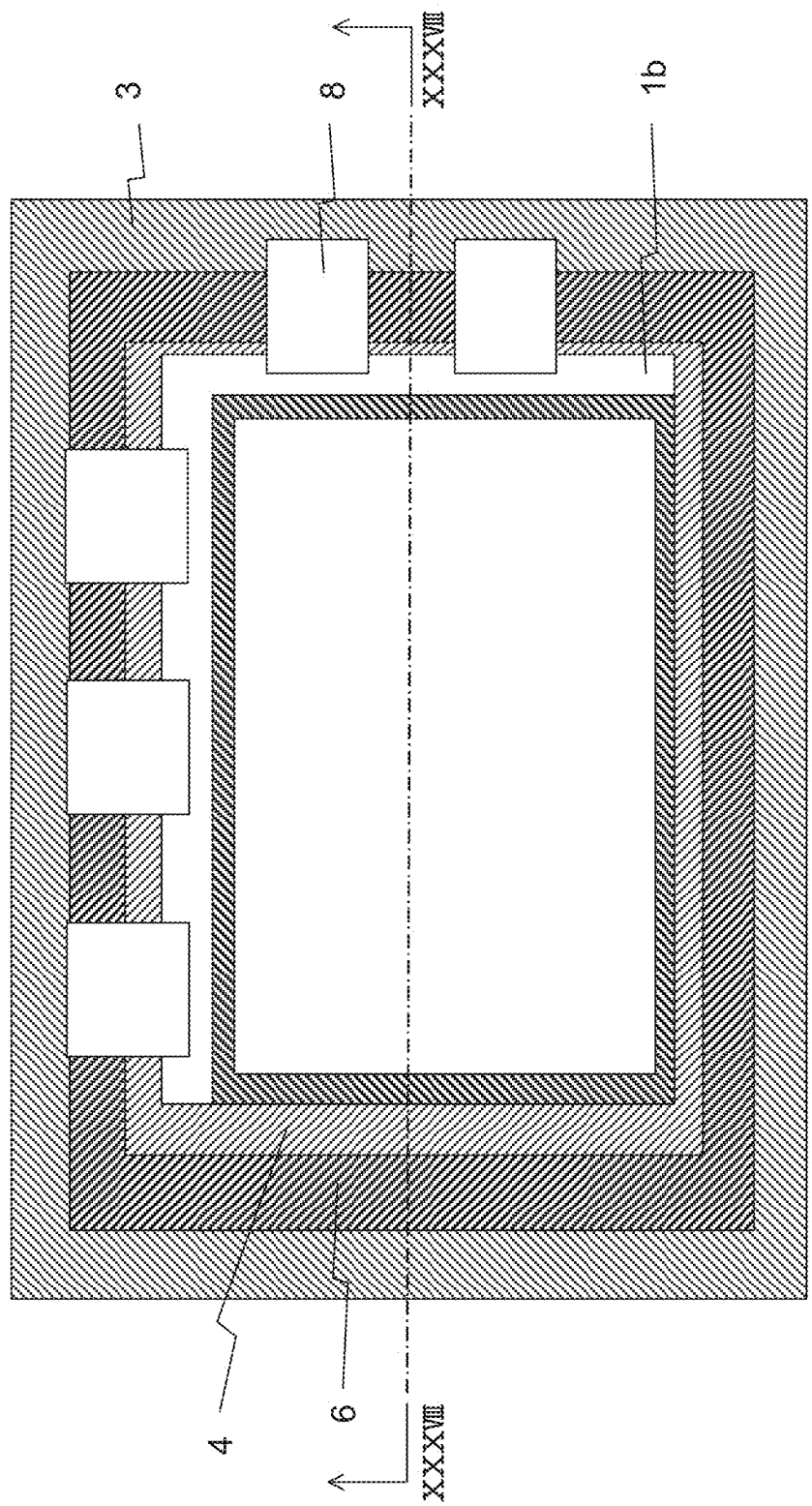
FIG. 37 is a plan view illustrating a liquid crystal display device according to Embodiment 4.
Figure 38:
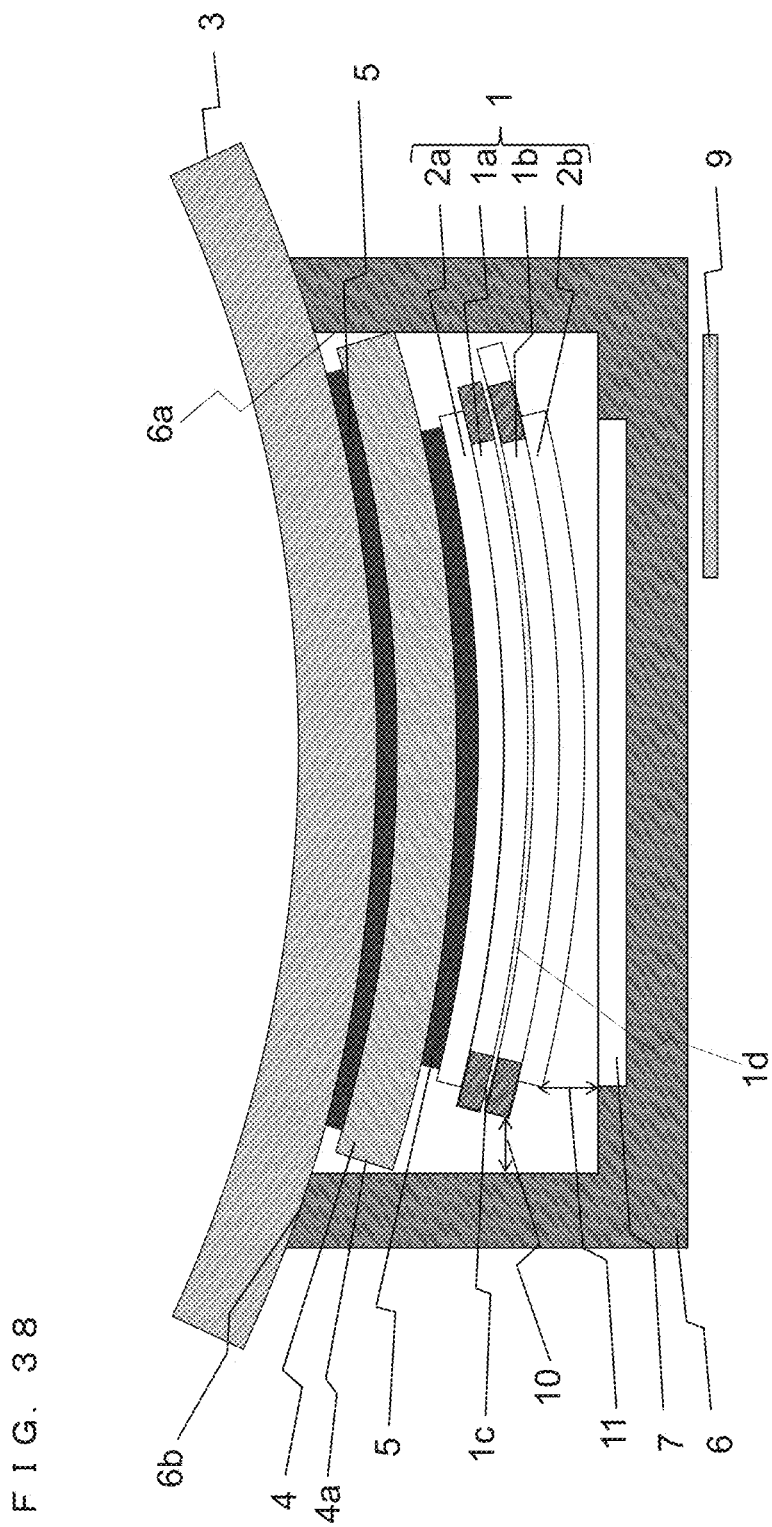
FIG. 38 is a cross-sectional view taken along the line XXXVIII-XXXVIII of FIG. 37.

The structure of Embodiment 4 of the invention will be described. FIG. 37 is a plan view illustrating a liquid crystal display device according to Embodiment 4. FIG. 38 is a cross-sectional view taken along the line XXXVIII-XXXVIII of FIG. 37. In the liquid crystal display device according to Embodiment 4, a front plate 3 has a curved shape. In Embodiment 4, the structures of a liquid crystal panel 1, an intermediate member 4, and a transparent adhesive 5 are the same as those in Embodiment 1 and thus the description thereof will not be repeated.

Figure 39:
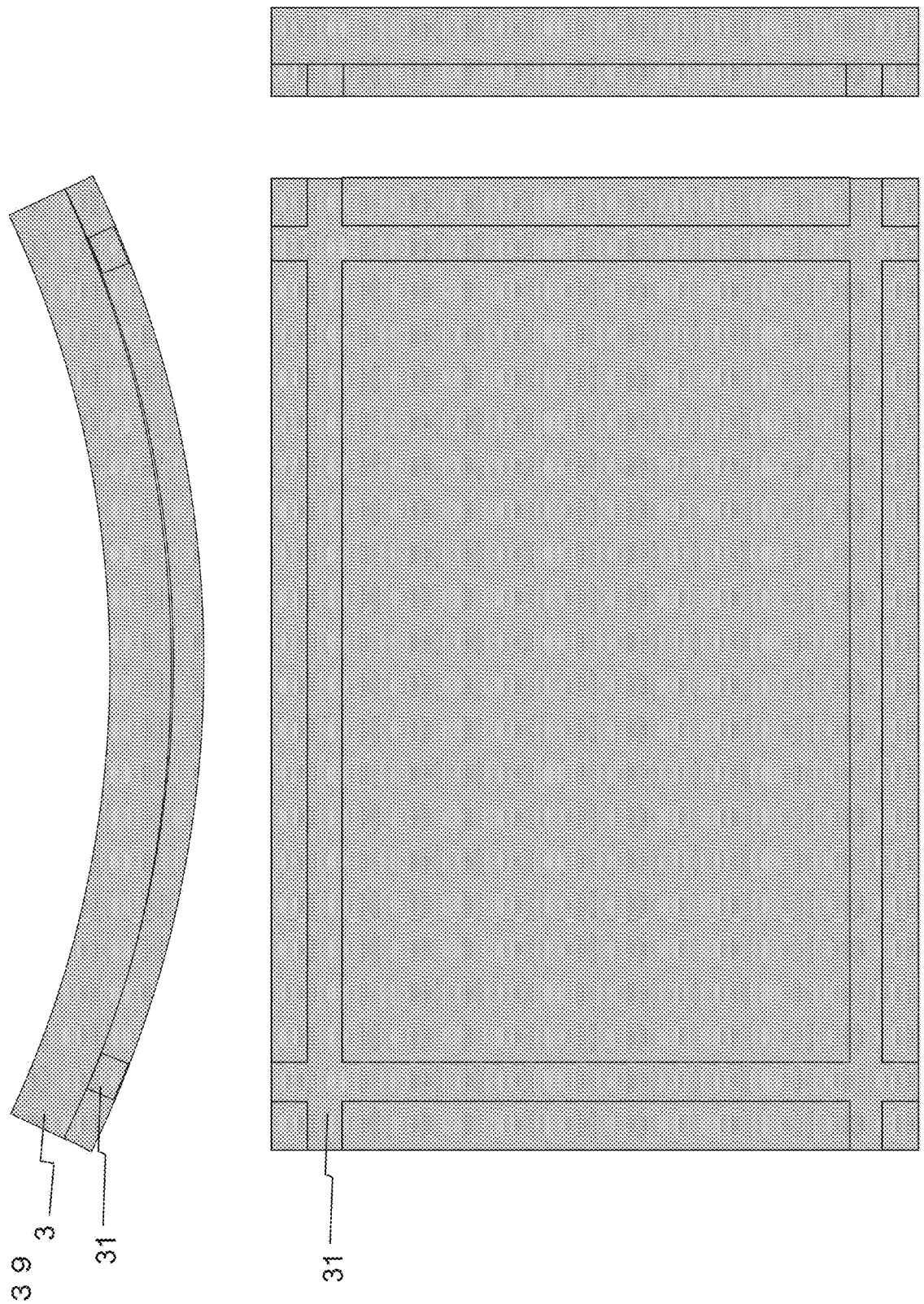
FIG. 39 is a diagram illustrating an example of a front plate with ribs.

The front plate 3 is curved and has a concave curve shape in which it is curved inward as viewed from an observer, a convex curve shape in which it is curved outward as viewed from the observer, a shape in which two opposite sides are curved in a concave direction or a convex direction, or a shape in which four sides are curved. In Embodiment 4, the front plate 3 has the shape in which two opposite sides are curved in the concave direction. When the front plate 3 is made of a material with low rigidity such as a resin, it is preferable to provide a rib 31 or increase the thickness of the front plate 3 during resin molding such that the front plate 3 has high rigidity, as illustrated in FIG. 39.

Similarly to Embodiment 1, the intermediate member 4 is bonded in a curved shape between the front plate 3 and the liquid crystal panel 1 by the transparent adhesive 5 along a surface of the front plate 3 which is close to the backlight chassis 6, and the liquid crystal panel 1 is bonded in a curved shape along the surface of the intermediate member 4 which is close to the backlight chassis 6.

Similarly to Embodiment 1, a backlight 7 is disposed on the bottom surface of the backlight chassis 6, and an opening edge 6b of the backlight chassis 6 is formed in a shape corresponding to the curved shape of the front plate 3. The opening edge 6b supports a portion of or the entire periphery of the lower surface of the front plate 3. An inner side surface 6a of the backlight chassis 6 comes into contact with a portion of or the entire side surface 4a of the curved intermediate member 4. An operation which appropriately ensures the gaps 11 and 10 between the liquid crystal panel 1 and the backlight chassis 6 in the vertical direction and the horizontal direction, respectively, is the same as that in Embodiment 1.

Figure 40:
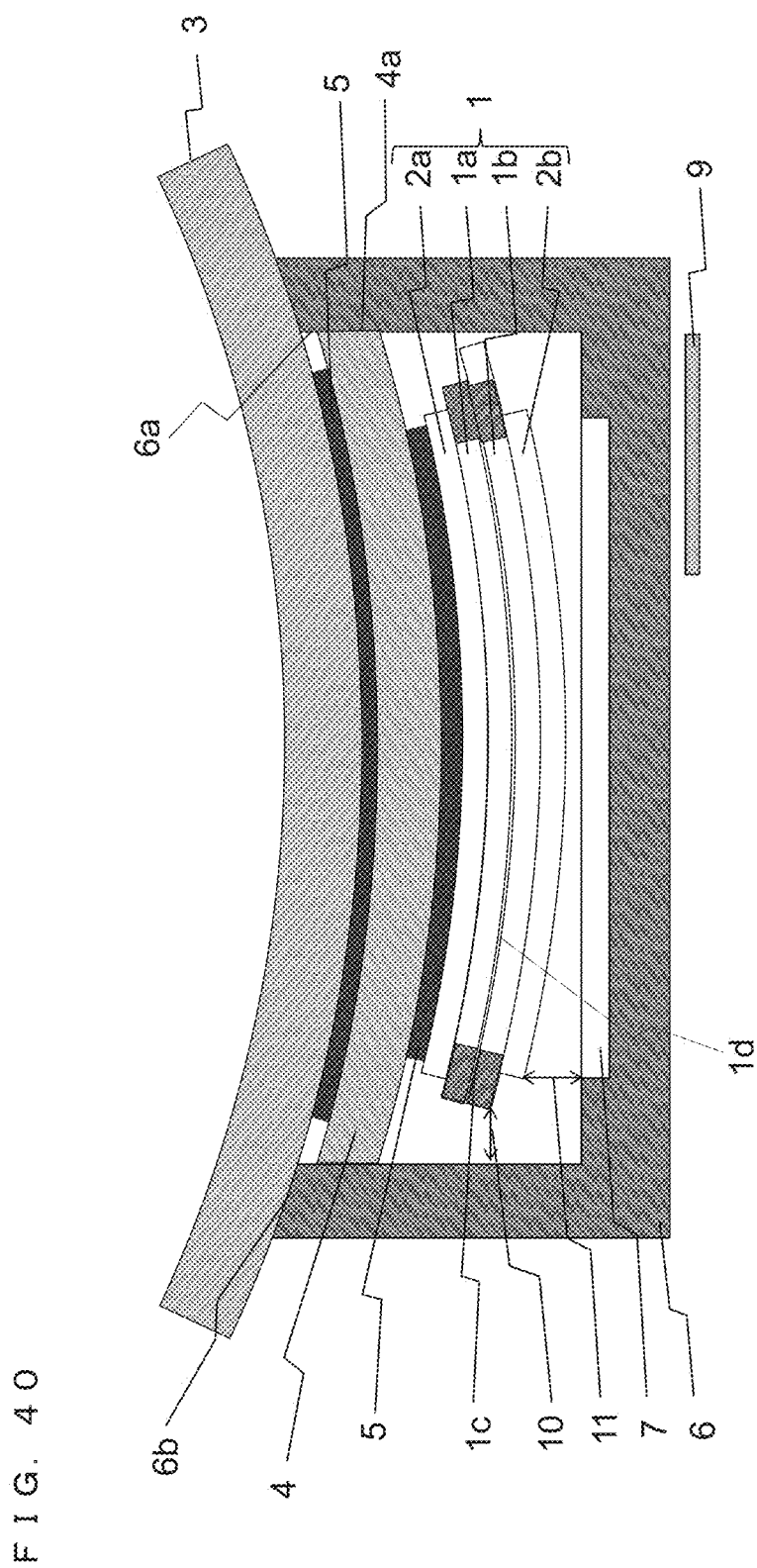
FIG. 40 is a cross-sectional view illustrating a modification example of an intermediate member according to Embodiment 4.

Next, a modification example of the intermediate member 4 according to Embodiment 4 will be described. FIG. 40 is a cross-sectional view illustrating a modification example of the intermediate member 4 according to Embodiment 4. In a liquid crystal display device illustrated in FIG. 40, the side surface 4a of the intermediate member 4 is formed in a shape corresponding to the inner side surface 6a of the backlight chassis 6 when the intermediate member 4 is bonded to the curved front plate 3. For example, as illustrated in FIG. 41A, before the intermediate member 4 is bonded to the curved front plate 3, the intermediate member 4 is a plate with a trapezoidal shape and the side surface 4a of the intermediate member 4 has a tapered shape. Therefore, when the intermediate member 4 is bonded to the front plate 3, the side surface 4a of the intermediate member 4 has a shape corresponding to the inner side surface 6a of the backlight chassis 6. As illustrated in FIG. 41B, the corners of the side surface 4a of the intermediate member 4 are chamfered, which makes it possible to prevent defects caused by the chipping-away of the corner.

Figure 42:
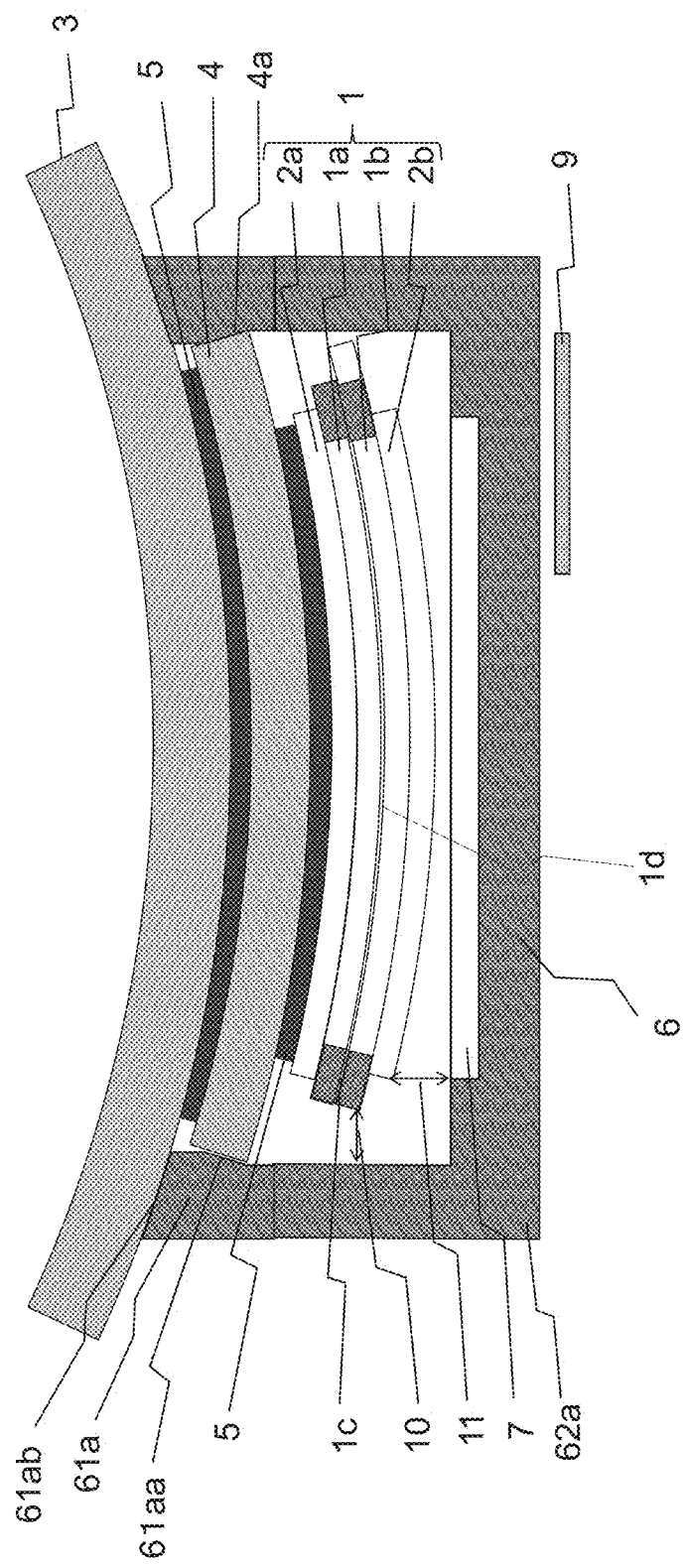
FIG. 42 is a cross-sectional view illustrating a modification example of a backlight chassis according to Embodiment 4.

Next, a modification example of the backlight chassis 6 according to Embodiment 4 will be described. FIG. 42 is a cross-sectional view illustrating a modification example of the backlight chassis 6 according to Embodiment 4. In the modification example illustrated in FIG. 42, the curved front plate 3 is used in the liquid crystal display device in which the backlight chassis 6 is divided into an upper chassis 61a and a lower chassis 62a in the vertical direction, similarly to Embodiment 2. The upper chassis 61a includes an opening edge 61ab which has a shape corresponding to the shape of the curved front plate 3 and an inner side surface 61aa which has a tapered shape corresponding to the side surface 4a of the curved intermediate member 4. The division position of the upper chassis 61a and the lower chassis 62a or a method of processing the upper chassis 61a and the lower chassis 62a is the same as that in Embodiment 2. When the shape of the curved front plate 3 is changed, the division of the backlight chassis 6 makes it possible to change only the shape of the upper chassis 61a and to use the lower chassis 62a as a common member. In addition, it is possible to change the materials forming the upper chassis 61a and the lower chassis 62a. For example, since the backlight 7 is turned on and generates heat, the lower chassis 62a is made of a material with a high radiation performance and the upper chassis 61a is made of an insulating material. In this case, it is possible to reduce the deformation of the liquid crystal panel 1 or the front plate 3 due to heat.

Figure 43:
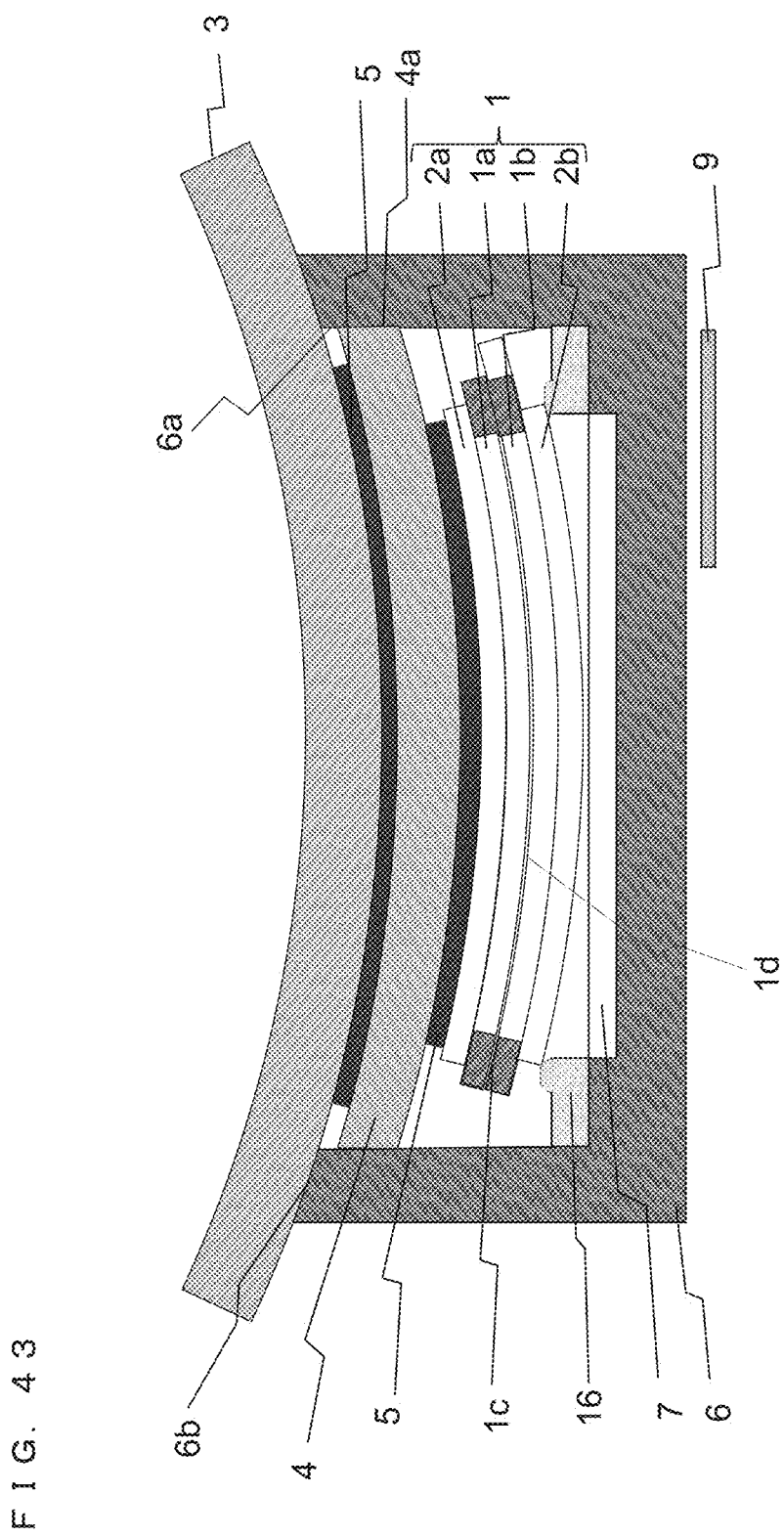
FIG. 43 is a cross-sectional view illustrating another modification example of the backlight chassis according to Embodiment 4.
Figure 44:
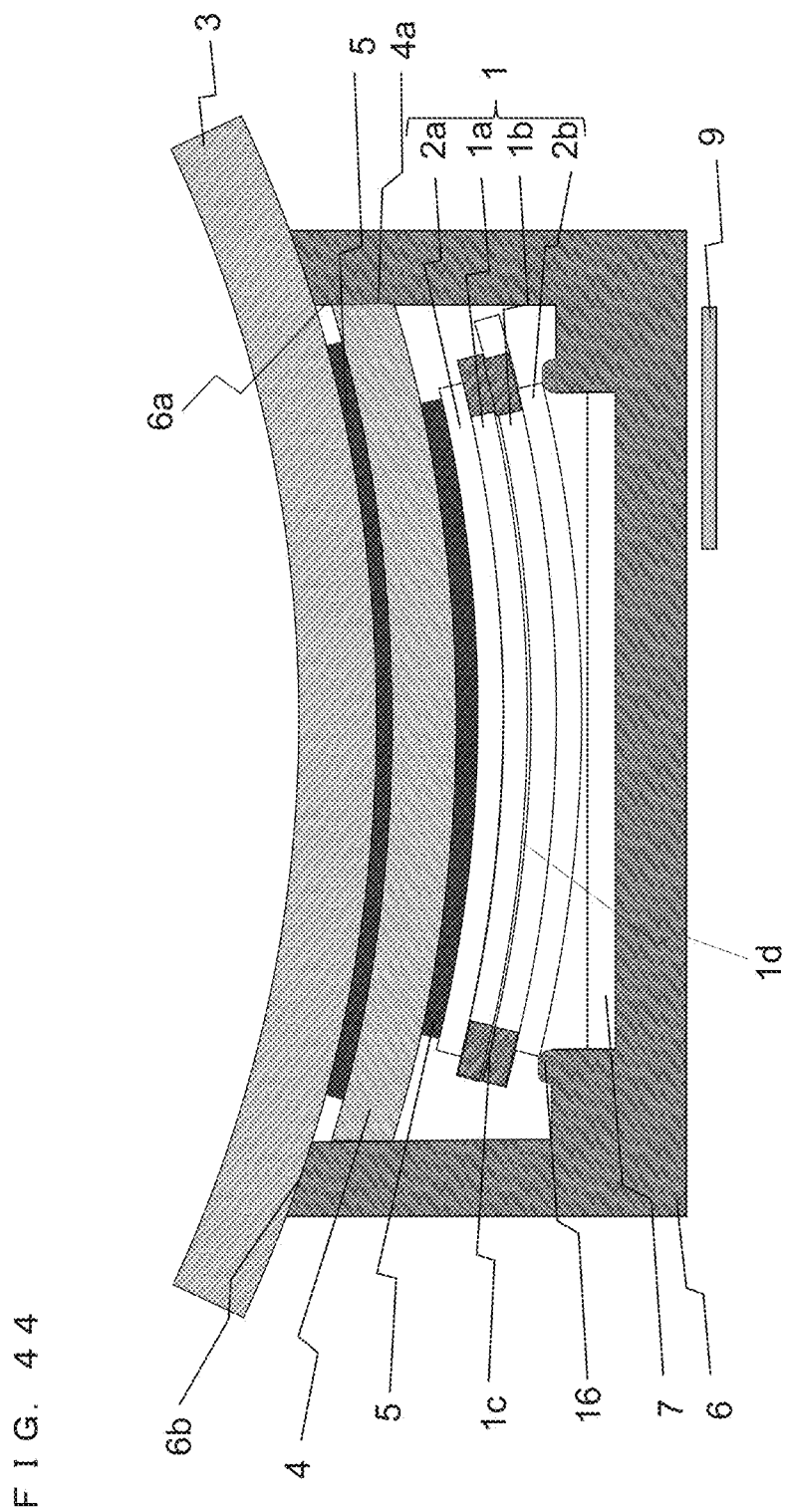
FIG. 44 is a cross-sectional view illustrating another modification example of the backlight chassis according to Embodiment 4.
Figure 45:
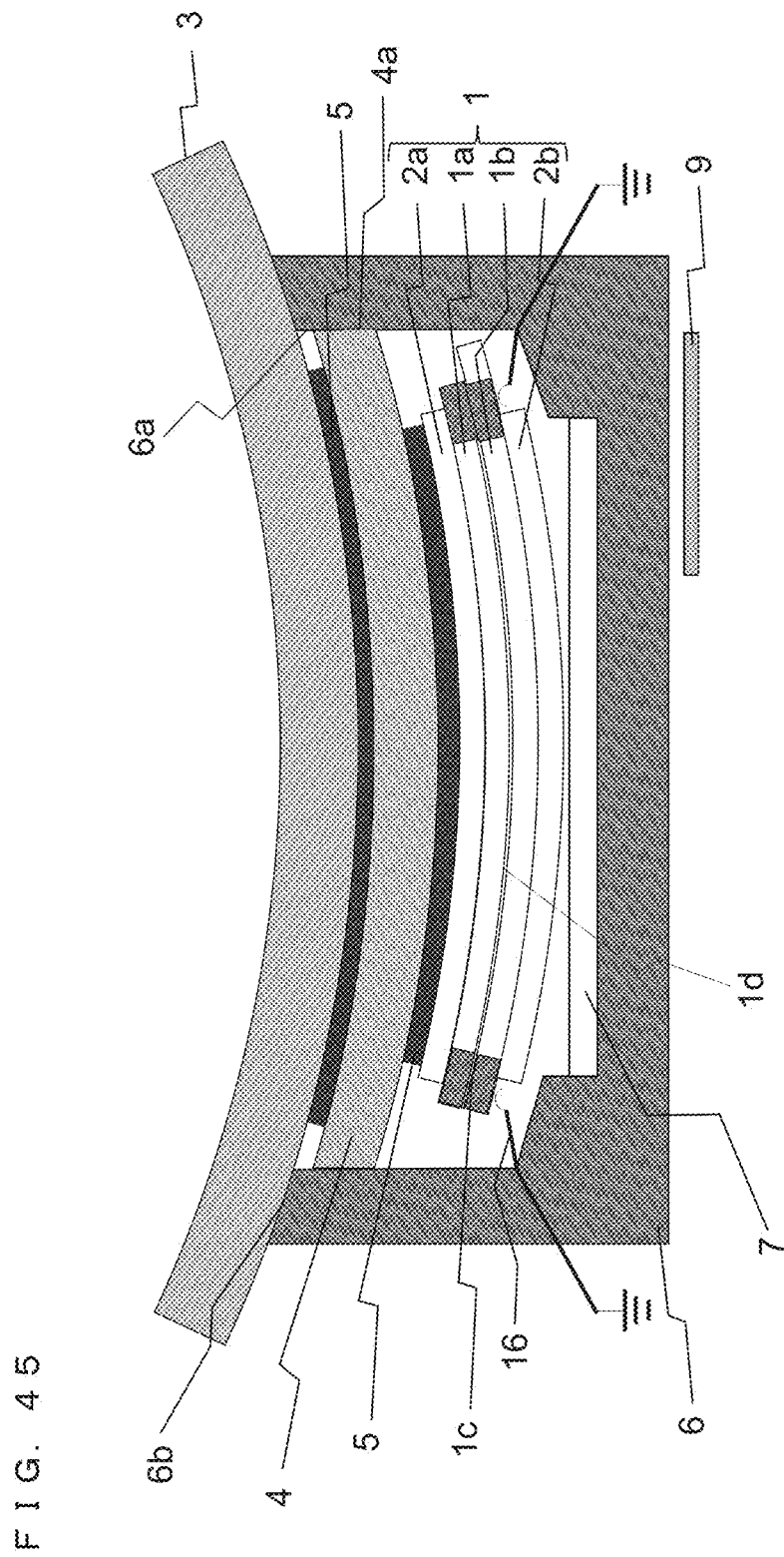
FIG. 45 is a cross-sectional view illustrating another modification example of the backlight chassis according to Embodiment 4.

Other modification examples of the backlight chassis 6 will be described. FIGS. 43, 44, and 45 are cross-sectional views illustrating modification examples of the backlight chassis 6. As illustrated in FIG. 43, a cushion member 16 which comes into contact with the entire periphery of the lower surface of the liquid crystal panel 1 may be provided on the bottom surface of the backlight chassis 6 so as to surround the backlight 7. In this case, it is possible to prevent a foreign material from entering into the gap between the liquid crystal panel 1 and the backlight 7. As illustrated in FIG. 44, the cushion member 16 and the backlight chassis 6 may be integrally formed. In this case, it is possible to remove a process of assembling the cushion member 16. As illustrated in FIG. 45, a spring structure with elasticity may be used. For example, a conductive cushion member 16 having a spring structure is provided between the periphery of the backlight chassis 6 and the periphery of the lower surface of the liquid crystal panel 1 and the cushion member 16 is connected to the ground. In this case, it is possible to prevent the rear surface of the liquid crystal panel 1 from being electrified. In this case, it is preferable that the cushion member 16 be provided in the entire periphery of the backlight chassis 6. However, the cushion member 16 is not necessarily provided in the entire periphery of the backlight chassis 6.

Figure 46:
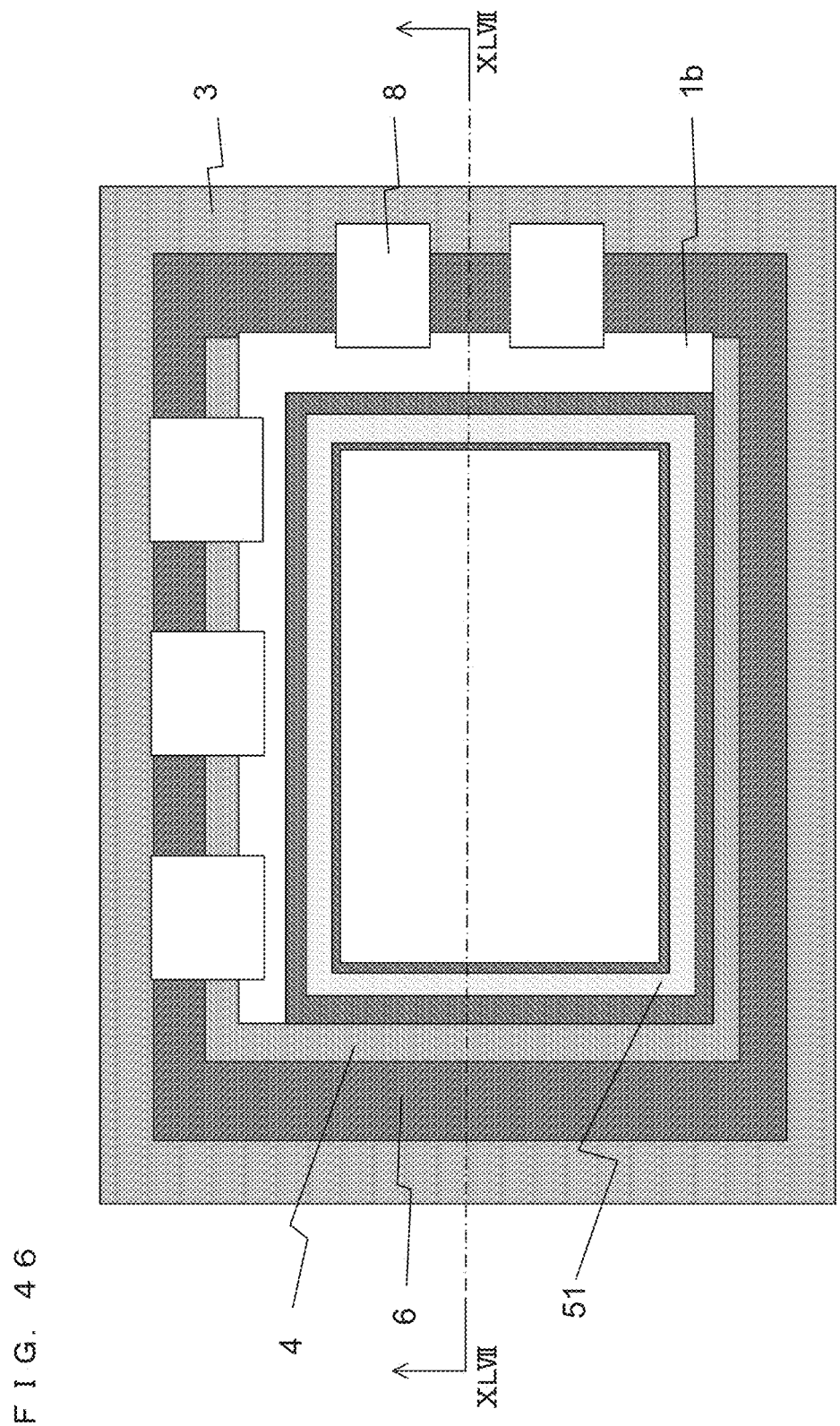
FIG. 46 is a plan view illustrating a modification example in which a liquid crystal panel according to Embodiment 4 is bonded without being curved.
Figure 47:
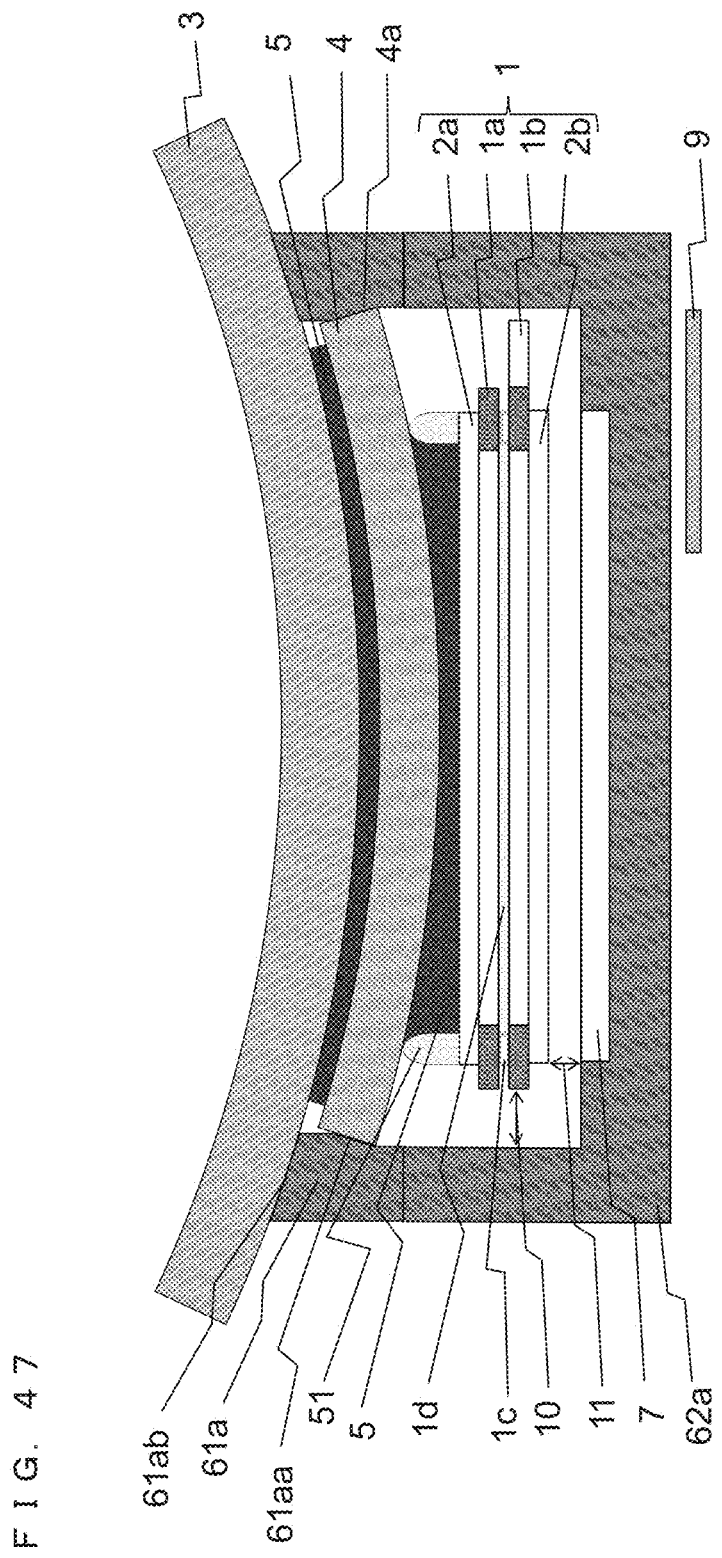
FIG. 47 is a cross-sectional view illustrating a modification example in which the liquid crystal panel according to Embodiment 4 is bonded without being curved.

As illustrated in FIGS. 46 and 47, the liquid crystal panel 1 may be bonded to the curved front plate 3 and the curved intermediate member 4 by the transparent adhesive 5, without being curved. FIG. 46 is a plan view illustrating an example in which the liquid crystal panel 1 is bonded without being curved. FIG. 47 is a cross-sectional view taken along the line XLVII-XLVII of FIG. 46. In the liquid crystal display device illustrated in FIGS. 46 and 47, a spacer 51 is provided around the polarizing plate/optical compensation film 2a to maintain the gap between the liquid crystal panel 1 and the intermediate member 4 such that the liquid crystal panel 1 is not curved. In addition, the transparent adhesive 5 in the vicinity of the center of the liquid crystal panel 1 can be thin and the transparent adhesive 5 in the vicinity of the spacer 51 can be thick.

Figure 48:
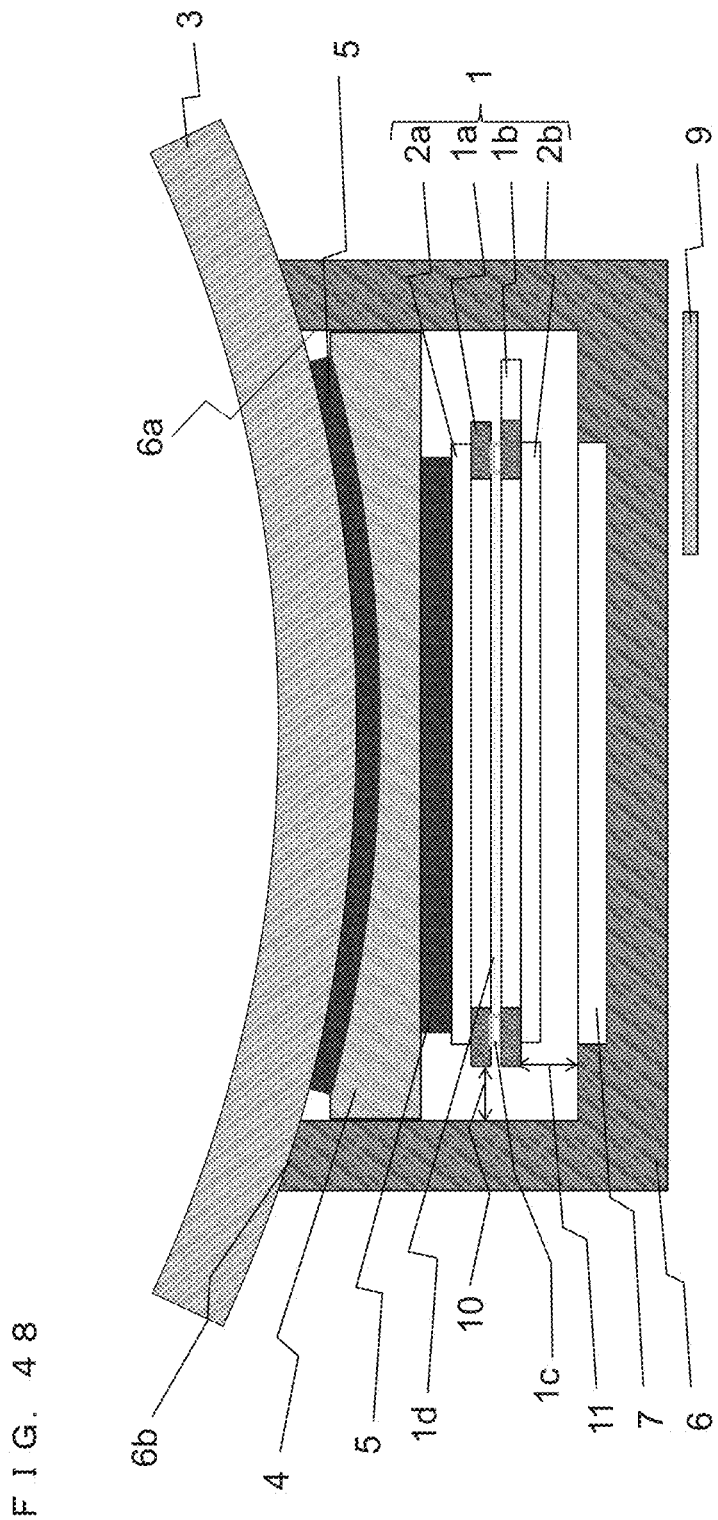
FIG. 48 is a cross-sectional view illustrating a modification example of the intermediate member to which the liquid crystal panel according to Embodiment 4 is bonded without being curved.
Figure 49A:
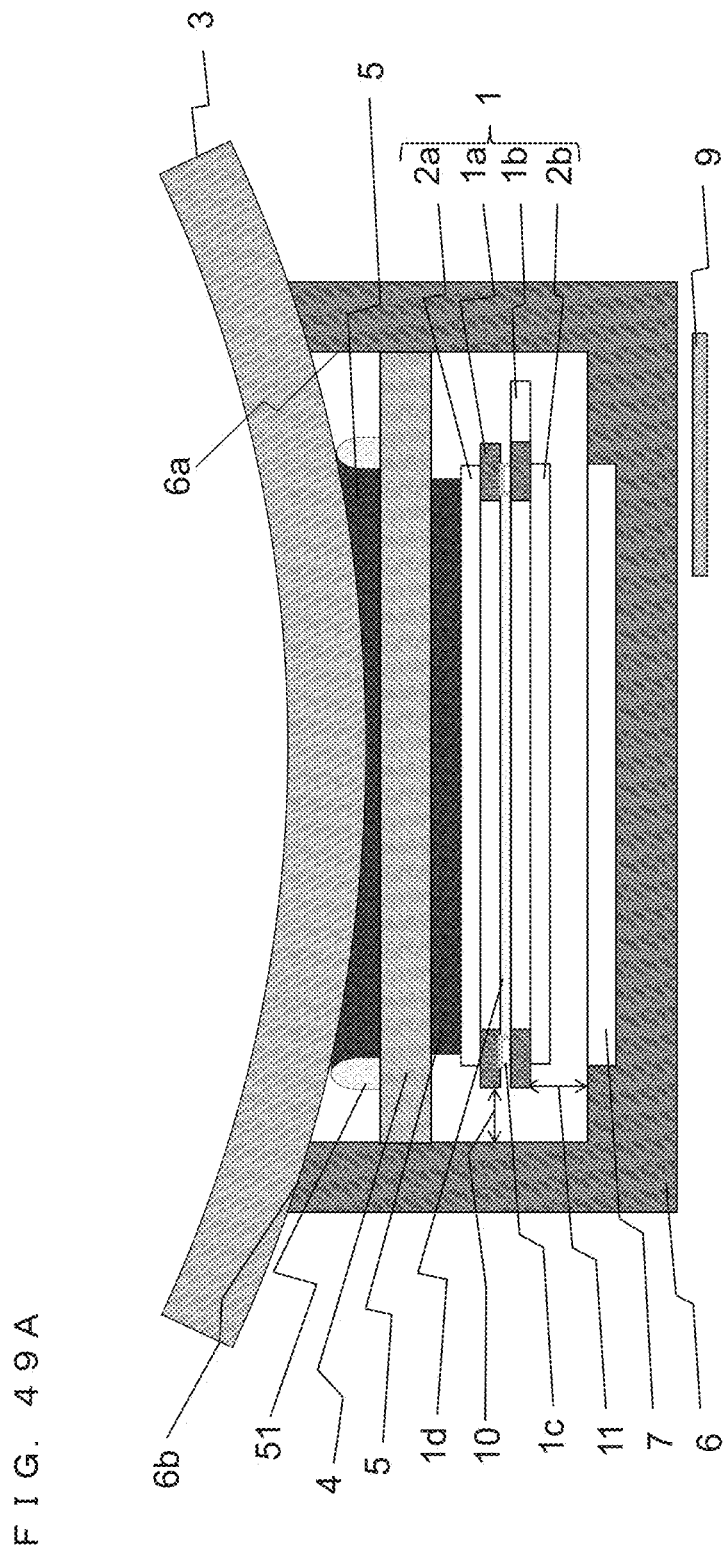
FIGS. 49A and 49B are cross-sectional views illustrating another modification examples in which the liquid crystal panel according to Embodiment 4 is bonded without being curved.
Figure 49B:
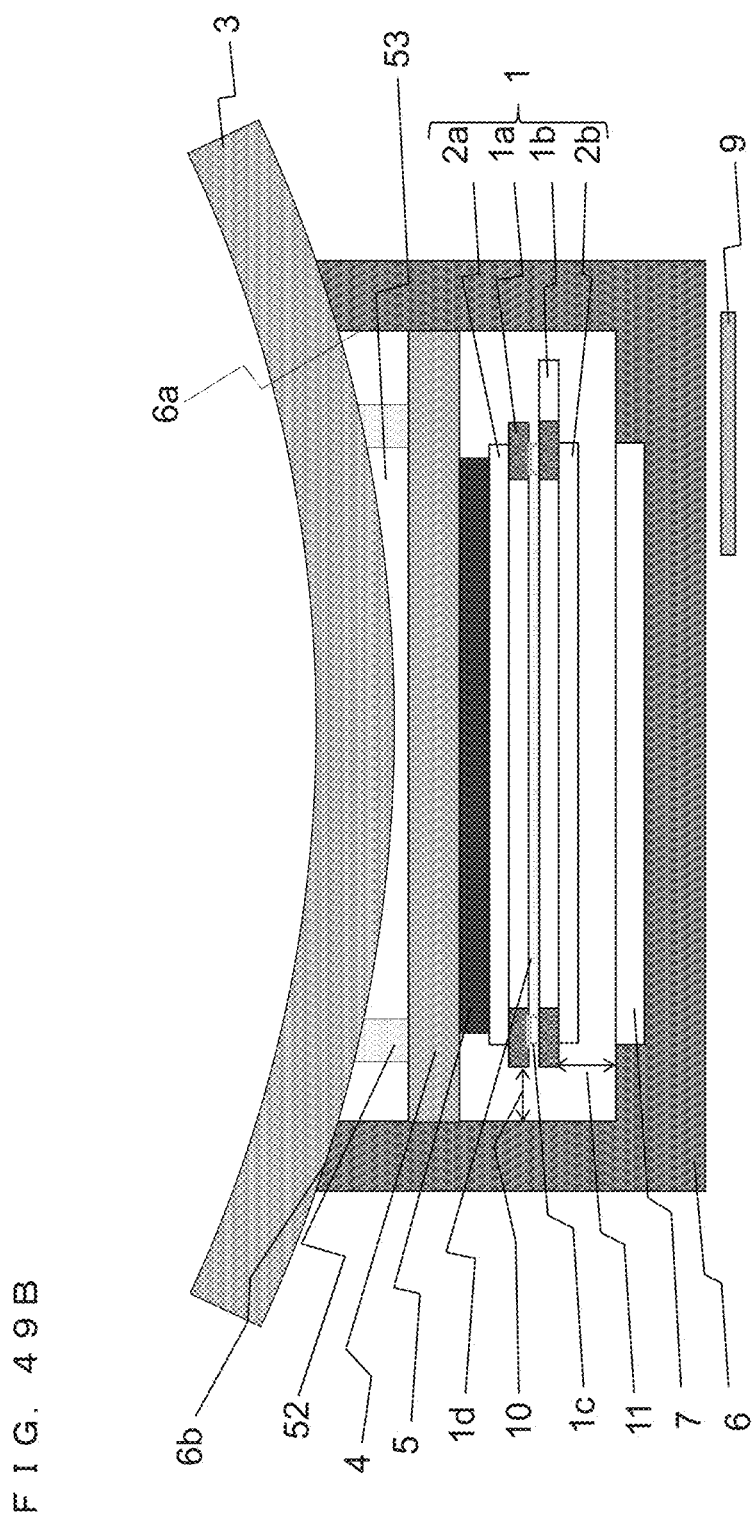

In addition, FIG. 48 is a cross-sectional view illustrating a modification example of the intermediate member 4. FIGS. 49A and 49B are cross-sectional views illustrating examples in which the liquid crystal panel 1 is bonded without being curved. In a liquid crystal display device illustrated in FIG. 48, a surface of an intermediate member 4 which faces the front plate 3 is formed in a shape corresponding to the curved shape of the front plate 3 and a surface of the intermediate member 4 which faces the liquid crystal panel 1 is flat. Therefore, the liquid crystal panel 1 can be bonded without being curved. In addition, in a liquid crystal display device illustrated in FIG. 49A, a spacer 51 is provided around a surface which faces the front plate 3 in an intermediate member 4 having two flat surfaces to maintain the gap between the intermediate member 4 and the front plate 3 such that both the liquid crystal panel 1 and the intermediate member 4 are not curved. In this case, the transparent adhesive 5 in the vicinity of the center of the intermediate member 4 can be thin and the transparent adhesive 5 in the vicinity of the spacer 51 can be thick. In addition, in a liquid crystal display device illustrated in FIG. 49B, an adhesive member (a double-sided tape) 52 is provided around a surface which faces the front plate 3 in an intermediate member 4 having two flat surfaces to maintain the gap (an air layer 53) between the intermediate member 4 and the front plate 3 such that both the liquid crystal panel 1 and the intermediate member 4 are not curved. In the structure illustrated in FIG. 49B, since the front plate 3 and the intermediate member 4 are bonded to each other through an air layer 53, it is not necessary to use the transparent adhesive 5, as illustrated in FIG. 49A.

As illustrated in FIGS. 47, 48, 49A, and 49B, when the liquid crystal panel 1 is bonded without being curved, it is possible to prevent the occurrence of a display defect (unevenness) due to the non-uniformity of the gap between the color filter substrate 1a and the TFT substrate 1b when the liquid crystal panel 1 is curved or to prevent the seal 1c which bonds the TFT substrate 1b and the color filter substrate 1a from peeling off. Therefore, it is possible to obtain a good display state. In addition, in the liquid crystal display device illustrated in FIG. 48, the front plate 3 which is formed in a curved shape in advance and the intermediate member 4 which is processed in a concave shape corresponding to the curved shape of the front plate 3 are used. In the liquid crystal display device illustrated in FIG. 49A, the front plate 3 which is formed in a curved shape in advance is used. Therefore, the liquid crystal display device can be assembled through the same manufacturing flow as that in Embodiment 1. That is, it is possible to omit a process of curving an intermediate member 4 illustrated in FIG. 53A or FIG. 53B, which will be described below. Therefore, a bonding function of a bonding device is not complicated and it is possible to stably produce a liquid crystal display device.

In the liquid crystal display device illustrated in FIG. 49B, the front plate 3 and the intermediate member 4 are bonded to each other through an air layer 53. However, the intermediate member 4 and the liquid crystal panel 1 may be bonded to each other through an air layer. In addition, a structure in which the front plate 3 and the intermediate member 4 are bonded to each other through an air layer, and the intermediate member 4 and the liquid crystal panel 1 are bonded to each other through an air layer may be used.

Figure 50:
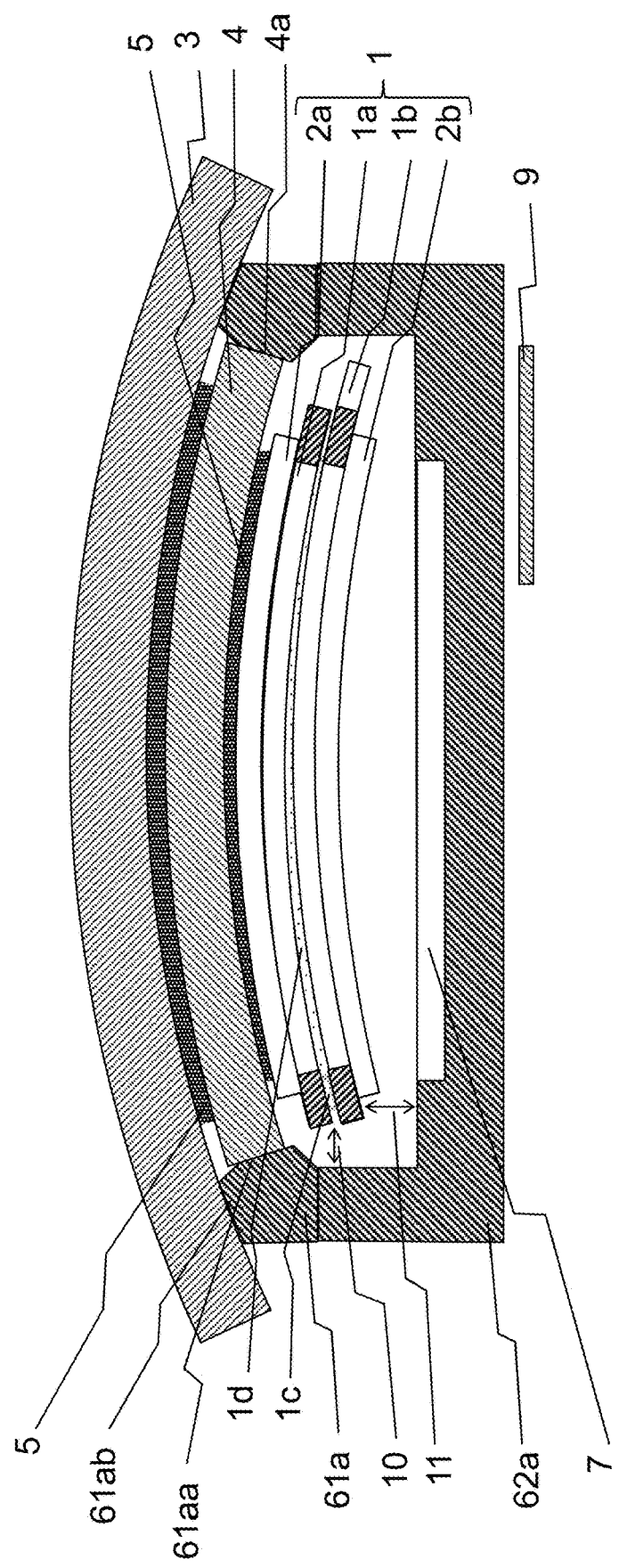
FIG. 50 is a cross-sectional view illustrating a modification example in which a front plate according to Embodiment 4 is curved in a convex direction.
Figure 51:
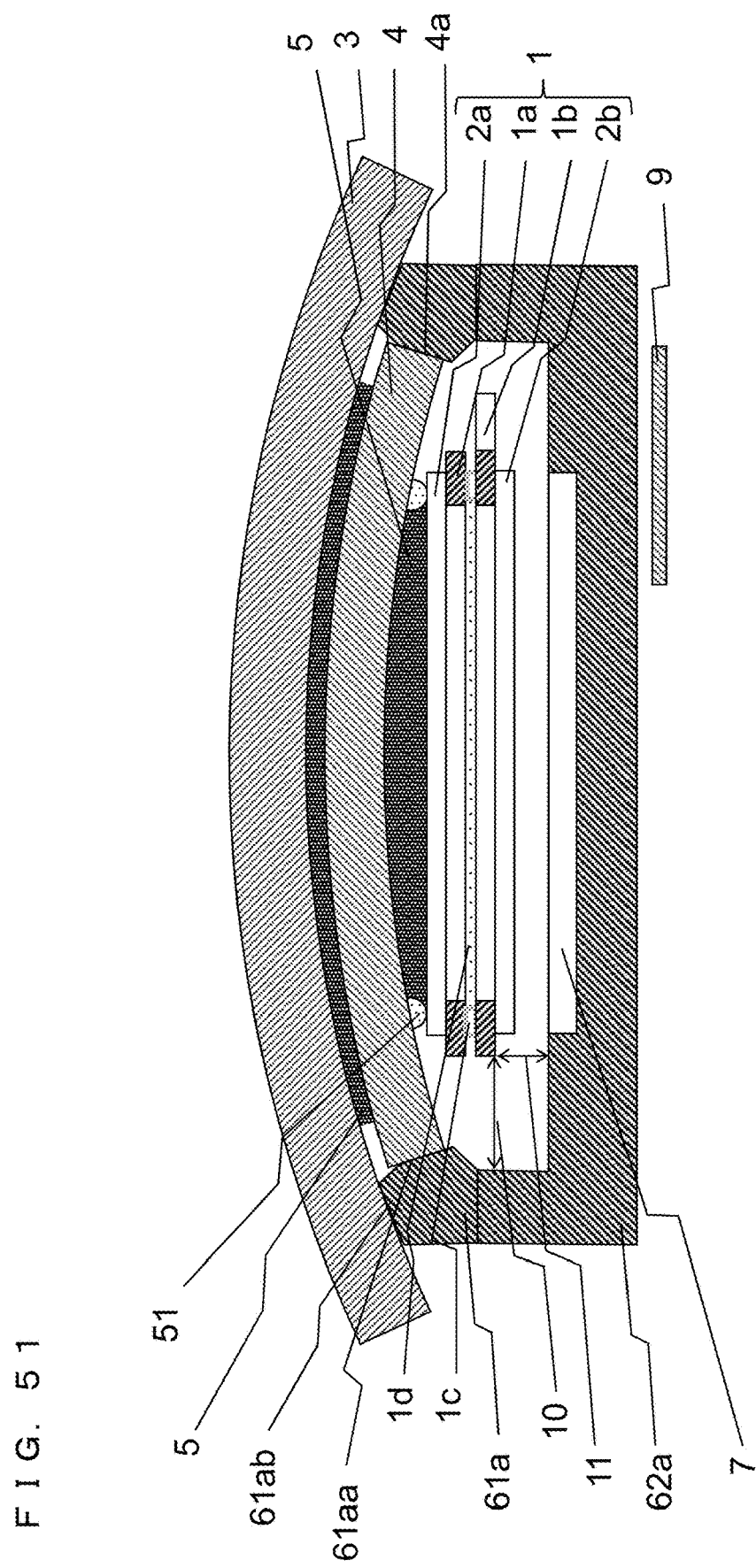
FIG. 51 is a cross-sectional view illustrating another modification example in which a front plate according to Embodiment 4 is curved in a convex direction.
Figure 52:
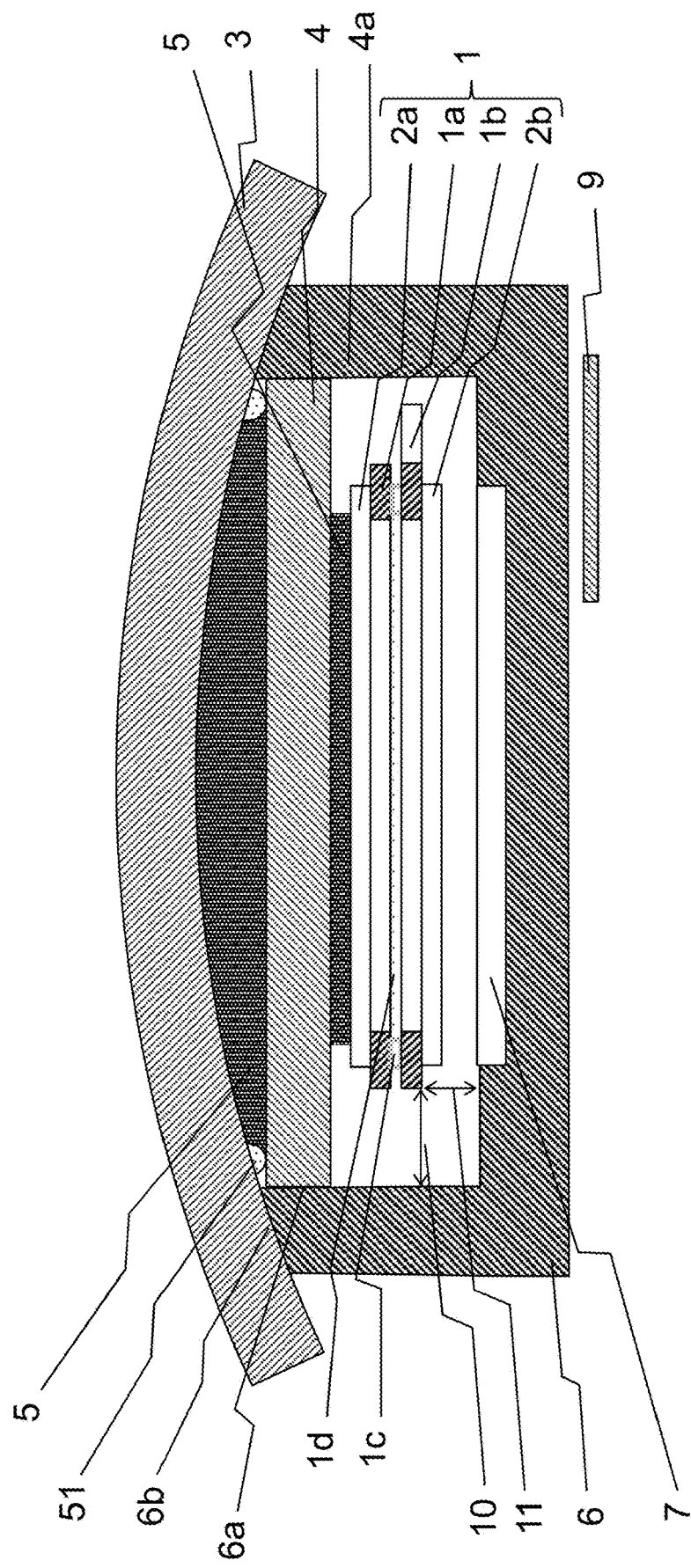
FIG. 52 is a cross-sectional view illustrating another modification example in which a front plate according to Embodiment 4 is curved in a convex direction.

In Embodiment 4, the curved front plate 3 has a shape in which two opposite sides are curved in the concave direction. However, the curved front plate 3 may have a shape in which two opposite sides are curved in the convex direction. In this case, the liquid crystal display device can have the same structure as described above. FIGS. 50, 51, and 52 are cross-sectional views illustrating examples in which two opposite sides of the front plate 3 are curved in the convex direction. FIG. 50 illustrates an example in which the front plate 3, the intermediate member 4 and the liquid crystal panel 1 are curved in the convex direction. FIG. 51 illustrates an example in which the front plate 3 and the intermediate member 4 are curved in the convex direction. FIG. 52 illustrates an example in which only the front plate 3 is curved in the convex direction.

In a liquid crystal display device illustrated in FIG. 51, a spacer 51 is provided around the polarizing plate/optical compensation film 2a to maintain the gap between the liquid crystal panel 1 and the intermediate member 4 by the spacer 51 and the transparent adhesive 5 such that the liquid crystal panel 1 is not curved. In addition, the transparent adhesive 5 in the vicinity of the center of the liquid crystal panel 1 can be thick and the transparent adhesive 5 in the vicinity of the spacer 51 can be thin. In addition, in a liquid crystal display device illustrated in FIG. 52, a spacer 51 is provided around a surface which faces the front plate 3 in an intermediate member 4 having two flat surfaces to maintain the gap between the intermediate member 4 and the front plate 3 by the spacer 51 and the transparent adhesive 5 such that both the liquid crystal panel 1 and the intermediate member 4 are not curved. In this case, the transparent adhesive 5 in the vicinity of the center of the intermediate member 4 can be thick and the transparent adhesive 5 in the vicinity of the spacer 51 can be thin.

Next, a method of manufacturing the liquid crystal display device according to Embodiment 4 will be described. FIGS. 53A to 54D are diagrams schematically illustrating an example of the flow of a process for manufacturing the liquid crystal display device according to Embodiment 4. Hereinafter, the liquid crystal display device having a structure in which two opposite sides of the front plate 3 are curved in the concave direction, the backlight chassis 6 is divided into the upper chassis 61a and the lower chassis 62a, and the liquid crystal panel 1 is bonded without being curved will be described.

Figure 53A:
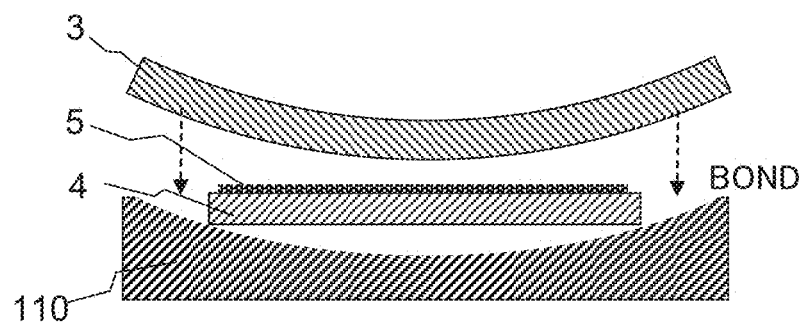
FIGS. 53A to 53C are diagrams schematically illustrating an example of the flow of a process for manufacturing the liquid crystal display device according to Embodiment 4.
Figure 53B:
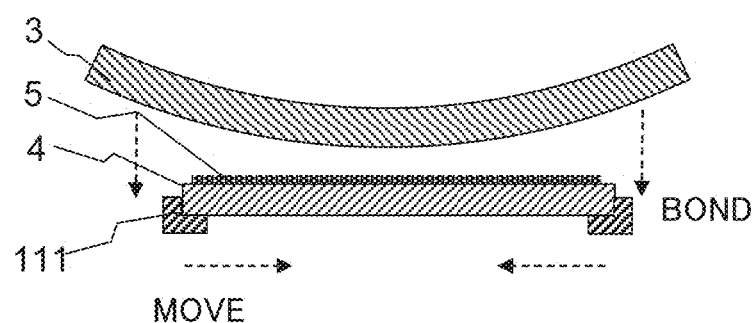

First, as illustrated in FIGS. 53A and 53B, the curved front plate 3 and the intermediate member 4 are bonded to each other by the transparent adhesive 5. A bonding method is not particularly limited. In addition to the method according to Embodiment 1, a method may be used which applies the transparent adhesive 5 to the intermediate member 4 with a uniform thickness and presses the intermediate member 4 to which the transparent adhesive 5 is applied against the curved front plate 3. In this case, the following methods may be used: a method using a stage 110 which holds the intermediate member 4 and is curved in a shape corresponding to the curved shape of the front plate 3 as illustrated in FIG. 53A; and a method using a mechanism which holds both ends of the intermediate member 4 and presses the intermediate member 4 against the front plate 3 and in which claws 111 move so as to be close to each other while holding both ends of the intermediate member 4 in order to prevent the drop of the intermediate member 4, as illustrated in FIG. 53B.

Figure 53C:
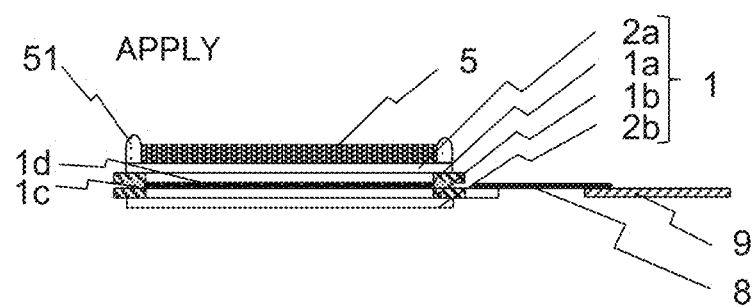

Then, as illustrated in FIG. 53C, the spacer 51 is provided around a surface of the liquid crystal panel 1 and the transparent adhesive 5 is applied inside the spacer 51. A method of providing the spacer 51 is not particularly limited. For example, the following methods may be used: a method which applies a transparent resin having the same refractive index as the transparent adhesive 5 in a bead shape; and a method which attaches a tape. It is preferable to use the method which applies the transparent resin in order to improve flexibility in shape.

Figure 54A:
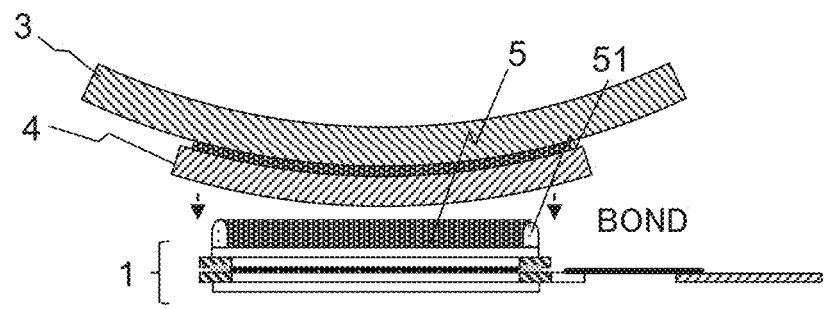
FIGS. 54A to 54D are diagrams schematically illustrating an example of the flow of the process for manufacturing the liquid crystal display device according to Embodiment 4.

Then, as illustrated in FIG. 54A, the front plate 3 to which the intermediate member 4 has been bonded is bonded to the liquid crystal panel 1 having the transparent adhesive 5 applied thereto. A method of bonding the intermediate member 4 and the liquid crystal panel 1 is not particularly limited, and the same method as that described in Embodiment 1 can be used.

Figure 54B:
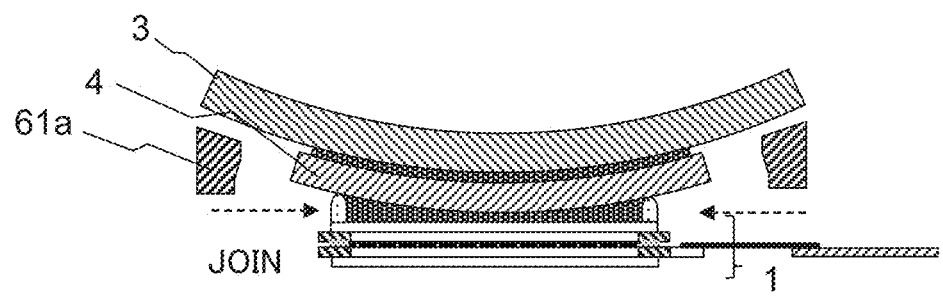

Then, as illustrated in FIG. 54B, the liquid crystal panel 1 to which the front plate 3 and the intermediate member 4 have been bonded is incorporated into the upper chassis 61a and is then fixed thereto. As a method of incorporating the liquid crystal panel 1 to which the front plate 3 and the intermediate member 4 have been bonded into the upper chassis 61a, a method is used which divides the upper chassis 61a into four sides and the divided parts of the upper chassis 61a are joined to the side surfaces of the intermediate member 4, in addition to the method described in Embodiment 2. This method has the advantage that it facilitates an assembly operation and can improve workability and is preferably used in terms of manufacture.

Figure 54C:
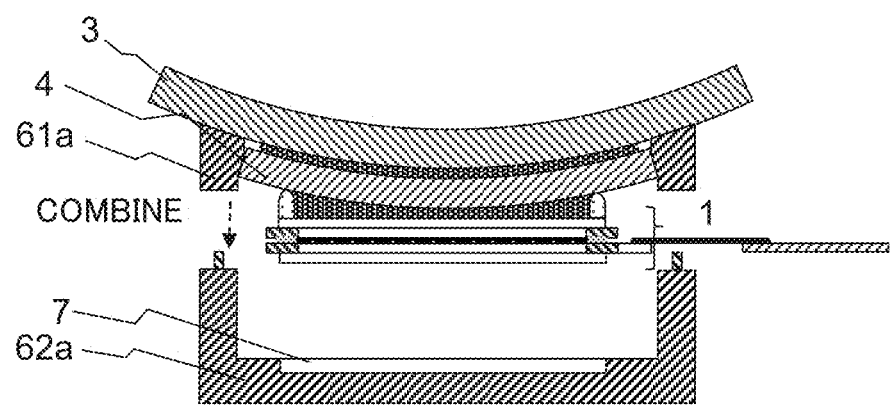

Then, as illustrated in FIG. 54C, the liquid crystal panel 1 incorporated into the upper chassis 61a is incorporated into the lower chassis 62a and is then fixed thereto. A method of incorporating the liquid crystal panel 1 into the lower chassis 62*a* is the same as that in Embodiment 2.

Figure 54D:
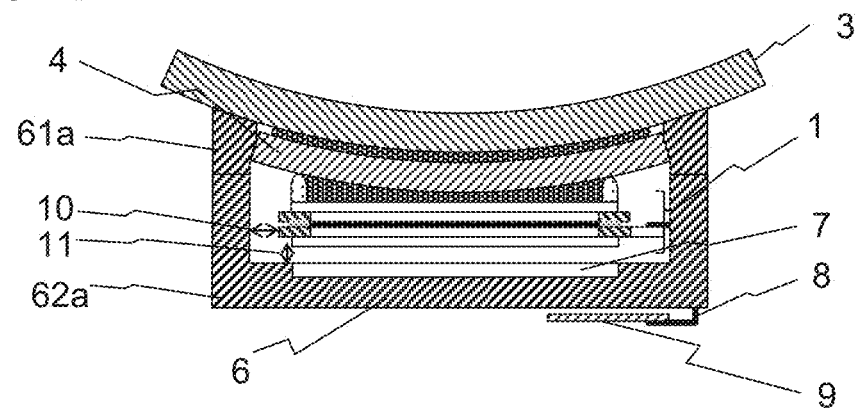

Then, as illustrated in FIG. 54D, the circuit board 9 is fixed to the rear surface of the backlight chassis 6 and a protective plate (not illustrated) which covers the circuit board 9 and the FPC 8 is attached. A method of drawing the FPC 8 to the outside of the backlight chassis 6 and fixing the circuit board 9 is the same as that in Embodiment 1.

As described above, in the liquid crystal display device according to Embodiment 4, in the structure in which the front plate 3 is curved, the use of the intermediate member 4 makes it possible to obtain the same effect as that in Embodiment 1.

The method of manufacturing the liquid crystal display device illustrated in FIG. 47 has been described above. The liquid crystal display device illustrated in FIG. 49A can be also manufactured by the same process as that described in Embodiment 1 (FIGS. 8A to 8E). In this case, a spacer 51 is provided around a surface of the intermediate member 4 which faces the front plate 3 and the transparent adhesive 5 is applied inside the spacer 51. In addition, the curved front plate 3 is bonded to the intermediate member 4 and is incorporated into the chassis 6.

Next, another method of manufacturing the liquid crystal display device according to Embodiment 4 will be described. FIGS. 55A to 56C are diagrams schematically illustrating another example of the flow of a process for manufacturing the liquid crystal display device according to Embodiment 4. Hereinafter, the liquid crystal display device having a structure in which two opposite sides of the front plate 3 are curved in the convex direction, the backlight chassis 6 is divided into the upper chassis 61*a* and the lower chassis 62*a*, and the liquid crystal panel 1 is bonded without being curved will be described. In the process illustrated in FIGS. 55A to 56C, about the same process as the above-described manufacturing process, the description thereof will not be repeated.

Figure 55A:
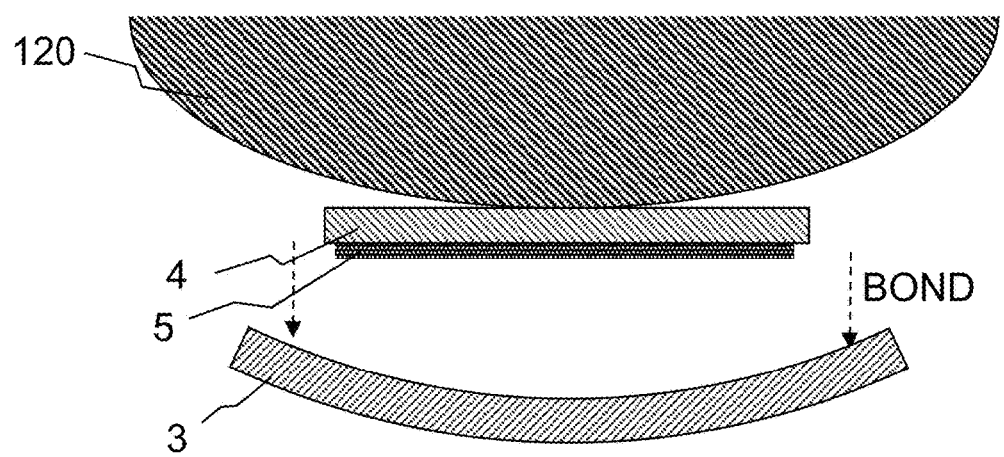
FIGS. 55A to 55C are diagrams schematically illustrating another example of the flow of the process for manufacturing the liquid crystal display device according to Embodiment 4.

First, as illustrated in FIG. 55A, the curved front plate 3 and the intermediate member 4 are bonded to each other by the transparent adhesive 5. A bonding method is not particularly limited. In addition to the method according to Embodiment 1, a method may be used which applies the transparent adhesive 5 to the intermediate member 4 with a uniform thickness and presses the intermediate member 4 to which the transparent adhesive 5 is applied against the curved front plate 3. In this case, a method may be used which presses the intermediate member 4 against the curved front plate 3 using a press jig 120 having a convex shape corresponding to the curved shape of the front plate 3 as illustrated in FIG. 55A.

Figure 55B:
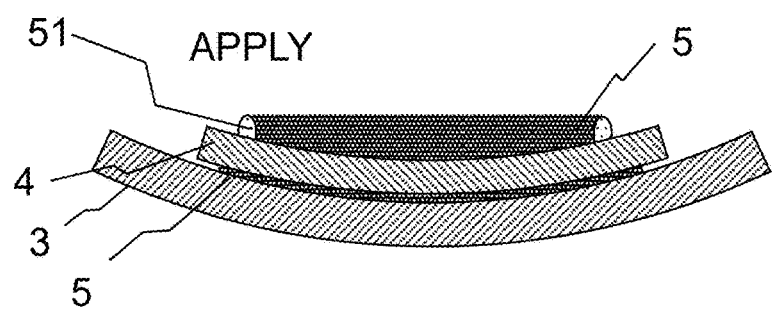

Then, as illustrated in FIG. 55B, a spacer 51 is provided around a surface opposite to a surface of the intermediate member 4 which faces the front plate 3 (a portion corresponding to the periphery of the liquid crystal panel 1 to be bonded to the intermediate member 4 later), and the transparent adhesive 5 is applied inside the spacer 51. A method of providing the spacer 51 is not particularly limited. For example, the following methods may be used: a method which applies a transparent resin having the same refractive index as the transparent adhesive 5 in a bead shape; and a method which attaches a tape. It is preferable to use the method which applies the transparent resin in order to improve flexibility in shape.

Figure 55C:
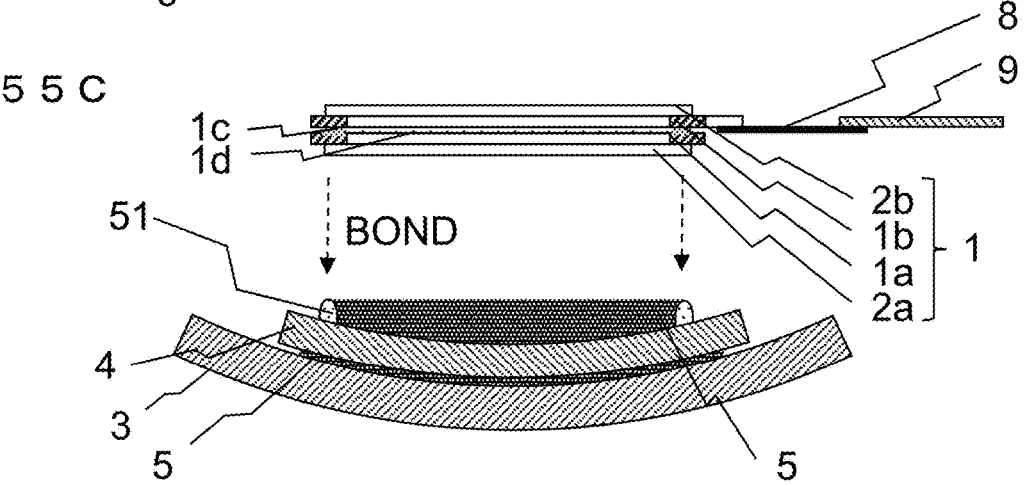

Then, as illustrated in FIG. 55C, the liquid crystal panel 1 is bonded to the front plate 3 to which the intermediate member 4 has been bonded. A method of bonding the intermediate member 4 and the liquid crystal panel 1 is not particularly limited, and the same method as that described in Embodiment 1 can be used.

Figure 56A:
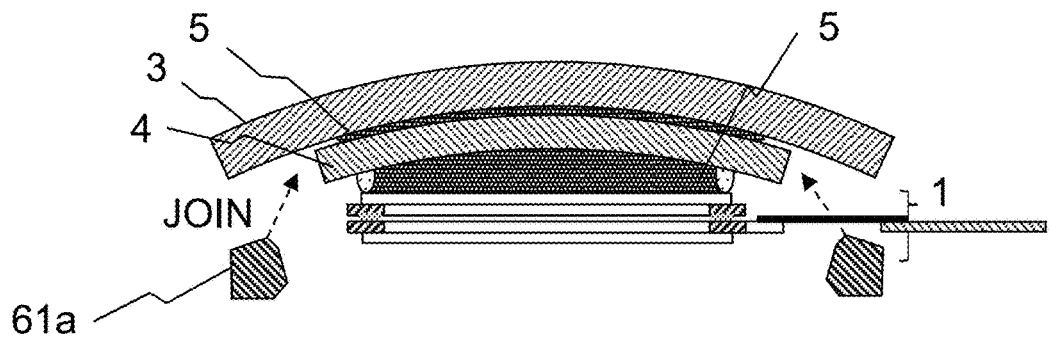
FIGS. 56A to 56C are diagrams schematically illustrating another example of the flow of the process for manufacturing the liquid crystal display device according to Embodiment 4.
Figure 56B:
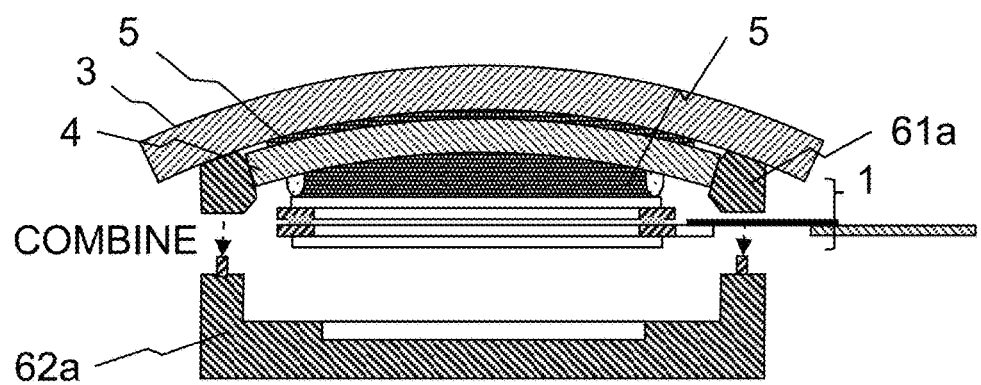
Figure 56C:
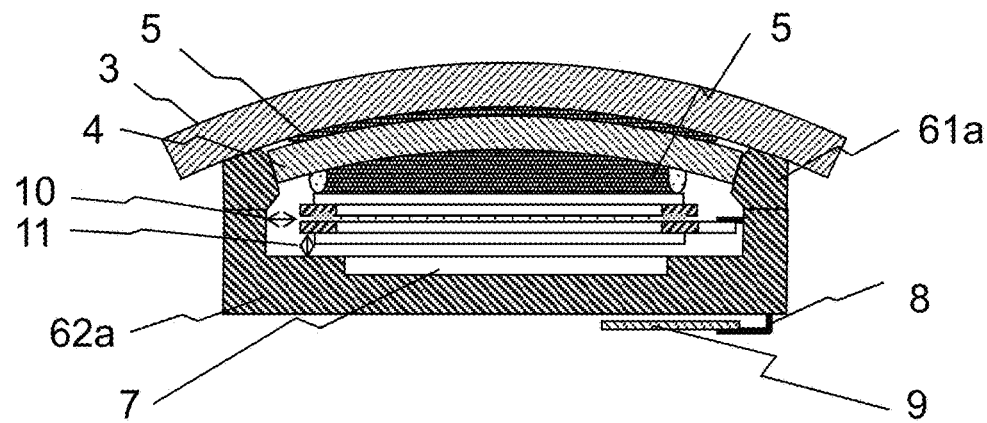

Then, the front plate 3, the intermediate member 4, and the liquid crystal panel 1 bonded to each other as illustrated in FIG. 55C are turned over. And then, the upper chassis 61*a* is joined to the side surface of the intermediate member 4, and the liquid crystal panel 1 is incorporated into the lower chassis 62*a*, as illustrated in FIGS. 56A to 56C. These processes illustrated in FIGS. 56A to 56C are the same as those illustrated in FIGS. 54B to 54D.

The method of manufacturing the liquid crystal display device illustrated in FIG. 51 has been described above. The liquid crystal display device illustrated in FIG. 52 can be also manufactured by the same process as that described in Embodiment 1 (FIGS. 8A to 8E). In this case, a spacer 51 is provided around a surface of the curved front plate 3 which faces the intermediate member 4 (a portion corresponding to the periphery of the intermediate member 4 to be bonded to the front plate 3 later), the transparent adhesive 5 is applied inside the spacer 51, and the intermediate member 4 is bonded to the front plate 3. In addition, the liquid crystal panel 1 is bonded to the intermediate member 4 and is incorporated into the chassis 6 after being turned over.

The structure in which the opening edge 6*b* of the backlight chassis 6 comes into contact with the front plate 3 and the opening edge 6*bb* thereof comes into contact with the intermediate member 4 as illustrated in FIG. 5 in Embodiment 1 can also be applied to Embodiments 2, 3, and 4. In addition, the structures in Embodiments 3 and 4 can also be applied to each example in Embodiment 2, in addition to Embodiment 1.

In Embodiments 1 to 4, the backlight is a direct type. However, the invention is not limited thereto. For example, the backlight may be an edge light type in which a light guide plate is provided and light is incident from the end surface of the light guide plate. In addition, in Embodiments 1 to 4, the display panel is the liquid crystal panel 1. However, the invention is not limited thereto. Display panels other than the liquid crystal panel may be used. For example, the display panel may be an organic electroluminescence (EL) panel.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

What is claimed is:
1. A display device, comprising:
a display panel;
an intermediate member;
a front plate that is disposed at a front surface side of the display panel and the intermediate member, and that holds the display panel and the intermediate member; and
a chassis that holds a backlight arranged so as to face a rear surface of the display panel,
wherein the intermediate member is disposed between the front plate and the display panel, and has smaller dimensions than the front plate, wherein the front plate and the intermediate member are bonded to each other with a first transparent adhesive, the display panel is bonded to a surface opposite to the front plate of the intermediate member with a second transparent adhesive, and the intermediate member holds the display panel with the second transparent adhesive, wherein the chassis has an opening at the front plate side, the display panel and the intermediate member are accommodated in the chassis along an inner side surface of the chassis from the opening of the chassis, and the display panel and the intermediate member accommodated in the chassis are suspended and held by the front plate and the chassis, wherein the inner side surface of the chassis comes into contact with at least a portion of a side surface of the intermediate member, wherein a side surface of the display panel is distanced in a horizontal direction from the inner side surface of the chassis and does not at all come into contact with the inner side surface of the chassis, and wherein the rear surface of the display panel has a gap between the backlight held by the chassis and the rear surface of the display panel.

2. The display device according to claim 1, wherein an upper surface of the chassis has the opening that has opening dimensions substantially equal to the dimensions of the intermediate member.

3. The display device according to claim 1, wherein:
the chassis is divided into an upper chassis and a lower chassis in a vertical direction, and
a distance between the intermediate member and the upper chassis is not more than a distance between the display panel and the lower chassis.

4. The display device according to claim 1, wherein:
the chassis is divided into an outer chassis, and an inner chassis positioned nearer to the display panel in a horizontal direction than the outer chassis, and
a distance between the intermediate member and the inner chassis is not more than a distance between the display panel and the inner chassis.

5. The display device according to claim 1, wherein the first transparent adhesive and the second transparent adhesive have at least one of a photo-curable function, a thermosetting function, and a moisture-curable function.

6. The display device according to claim 1, wherein the intermediate member has a touch input function.

7. The display device according to claim 1, wherein the front plate is an input device, a substrate, or a composite substrate.

8. The display device according to claim 1, wherein:
the chassis is divided into an upper chassis and a lower chassis in a vertical direction, and
an inner side surface of the upper chassis comes into contact with at least a portion of the side surface of the intermediate member.

9. The display device according to claim 8, wherein:
the front plate has a curved shape, and
the inner side surface of the upper chassis has a tapered shape.

10. The display device according to claim 1, wherein an upper surface of the chassis comes into contact with a portion of or the entire periphery of a lower surface of the front plate.

11. The display device according to claim 10, wherein the upper surface of the chassis further comes into contact with a portion of the surface opposite to the front plate of the intermediate member.

12. The display device according to claim 1, wherein the intermediate member is a polarizing plate.

13. The display device according to claim 12, wherein:
the display panel includes a color filter substrate and a touch sensor disposed on a surface of the color filter substrate, and
a touch panel flexible printed circuit (FPC) that extracts an output signal from the touch sensor is connected to the touch sensor in an outer periphery of a display region of the color filter substrate.

14. The display device according to claim 13, wherein a connection portion between the touch sensor and the touch panel FPC is covered with one of the first transparent adhesive and the second transparent adhesive.

15. The display device according to claim 1, wherein the front plate has a curved shape.

16. The display device according to claim 15, wherein a surface of the intermediate member which is bonded to the front plate is a curved surface.

17. The display device according to claim 16, wherein the surface opposite to the front plate of the intermediate member, which is bonded to the display panel, is a flat surface.

18. The display device according to claim 15, wherein the side surface of the intermediate member has a tapered shape.

19. The display device according to claim 15, wherein:
a spacer is disposed around the second transparent adhesive which bonds the display panel and the intermediate member,
the front plate is curved in a concave direction, and
a thickness of a portion of the second transparent adhesive corresponding to a central portion of the front plate is smaller than a thickness of a portion of the second transparent adhesive corresponding to a portion in the vicinity of the spacer.

20. The display device according to claim 15, wherein:
a spacer is disposed around the second transparent adhesive which bonds the display panel and the intermediate member,
the front plate is curved in a convex direction, and
a thickness of a portion of the second transparent adhesive corresponding to a central portion of the intermediate member is larger than a thickness of a portion of the second transparent adhesive corresponding to a portion in the vicinity of the spacer.

21. The display device according to claim 15, wherein:
a surface of the intermediate member which is bonded to the front plate, and the surface opposite to the front plate of the intermediate member which is bonded to the display panel, are flat surfaces,
a spacer is disposed around the second transparent adhesive which bonds the intermediate member and the front plate,
the front plate is curved in a concave direction, and
a thickness of a portion of the second transparent adhesive corresponding to a central portion of the front plate is smaller than a thickness of a portion of the second transparent adhesive corresponding to a portion in the vicinity of the spacer.

22. The display device according to claim 15, wherein:
a surface of the intermediate member which is bonded to the front plate, and the surface opposite to the front plate of the intermediate member which is bonded to the display panel, are flat surfaces, a spacer is disposed around the second transparent adhesive which bonds the intermediate member and the front plate, the front plate is curved in a convex direction, and a thickness of a portion of the second transparent adhesive corresponding to a central portion of the front plate is larger than a thickness of a portion of the second transparent adhesive corresponding to a portion in the vicinity of the spacer.

23. A method of manufacturing the display device according to claim 1, the method comprising:
bonding the front plate, the intermediate member, and the display panel;
performing positioning in a horizontal direction, using the inner side surface of the chassis and the side surface of the intermediate member;
performing positioning in a vertical direction, using a lower surface of the front plate or a lower surface of the intermediate member, and an upper surface of the chassis; and
incorporating the display panel into the chassis.

24. The method of manufacturing a display device according to claim 23, wherein:
the intermediate member is a polarizing plate,
the display panel includes a color filter substrate and a touch sensor disposed on a surface of the color filter substrate,
a touch panel flexible printed circuit (FPC) that extracts an output signal from the touch sensor is connected to the touch sensor in an outer periphery of a display region of the color filter substrate, and
the method further comprises:
bonding the polarizing plate to the front plate;
connecting the touch panel FPC to the display panel; and
bonding the front plate and the display panel.

25. The method of manufacturing a display device according to claim 23, wherein:
the front plate has a curved shape, and
the method further comprises:
bonding the intermediate member to the curved front plate while curving the intermediate member;
forming a spacer around the display panel or around a surface opposite to a surface of the intermediate member which is bonded to the front plate, an inner side of the spacer delimiting an interior;
applying the second transparent adhesive inside the interior formed by the spacer; and
bonding the display panel and the intermediate member bonded to the curved front plate.

26. The method of manufacturing a display device according to claim 23, wherein:
the front plate has a curved shape, and
the method further comprises:
bonding the intermediate member to the display panel;
forming a spacer around a surface opposite to a surface of the intermediate member which is bonded to the display panel, an inner side of the spacer delimiting an interior;
applying the first transparent adhesive inside the interior formed by the spacer; and
bonding the curved front plate to the intermediate member bonded to the display panel.

27. The method of manufacturing a display device according to claim 23, wherein:
the front plate has a curved shape, and
the method further comprises:
forming a spacer around the intermediate member, such that an inner side of the spacer delimits an interior;
applying the first transparent adhesive inside the interior formed by the spacer;
bonding the intermediate member to the curved front plate; and
bonding the display panel to the intermediate member bonded to the curved front plate.

28. A method of manufacturing the display device according to claim 1, the method comprising:
bonding the front plate, the intermediate member, and the display panel;
performing positioning in a horizontal direction, using a positioning member for positioning in the horizontal direction with the side surface of the intermediate member, and the inner side surface of the chassis;
removing the positioning member, after positioning the chassis in the horizontal direction;
performing positioning in a vertical direction, using a lower surface of the front plate or a lower surface of the intermediate member, and an upper surface of the chassis; and
incorporating the display panel into the chassis.

29. The method of manufacturing a display device according to claim 28, wherein:
the intermediate member is a polarizing plate,
the display panel includes a color filter substrate and a touch sensor disposed on a surface of the color filter substrate,
a touch panel flexible printed circuit (FPC) that extracts an output signal from the touch sensor is connected to the touch sensor in an outer periphery of a display region of the color filter substrate, and
the method further comprises:
bonding the polarizing plate to the front plate;
connecting the touch panel FPC to the display panel; and
bonding the front plate and the display panel.

30. The method of manufacturing a display device according to claim 28, wherein:
the front plate has a curved shape, and
the method further comprises:
bonding the intermediate member to the curved front plate while curving the intermediate member;
forming a spacer around the display panel or around a surface opposite to a surface of the intermediate member which is bonded to the front plate, an inner side of the spacer delimiting an interior;
applying the second transparent adhesive inside the interior formed by the spacer; and
bonding the display panel and the intermediate member bonded to the curved front plate.

31. The display device according to claim 1, wherein the front plate is located so as to cover the opening of the chassis formed in a dish shape.

32. The display device according to claim 31, wherein the front plate is located outside the chassis.

* * * * *